(12) United States Patent
Cho et al.

(10) Patent No.: US 7,224,906 B2
(45) Date of Patent: May 29, 2007

(54) METHOD AND SYSTEM FOR MITIGATING NONLINEAR TRANSMISSION IMPAIRMENTS IN FIBER-OPTIC COMMUNICATIONS SYSTEMS

(75) Inventors: Pak Shing Cho, Gaithersburg, MD (US); Nadejda Reingand, Baltimore, MD (US); Vladimir Grigoryan, Elkridge, MD (US); Alper Demir, Sariyer-Istanbul (TR); Aviv Salamon, Washington, DC (US); Isaac Shpantzer, Bethesda, M D (US)

(73) Assignee: CeLight, Inc., Silver Spring, MD (US)

( * ) Notice: Subject to any disclaimer, the term of this patent is extended or adjusted under 35 U.S.C. 154(b) by 481 days.

(21) Appl. No.: 10/084,057

(22) Filed: Feb. 28, 2002

(65) Prior Publication Data

US 2003/0058504 A1    Mar. 27, 2003

Related U.S. Application Data

(63) Continuation-in-part of application No. 09/962,243, filed on Sep. 26, 2001, and a continuation-in-part of application No. 09/962,339, filed on Sep. 26, 2001.

(60) Provisional application No. 60/352,991, filed on Feb. 1, 2002, provisional application No. 60/234,930, filed on Sep. 26, 2000.

(51) Int. Cl.
*H04B 10/04* (2006.01)
(52) U.S. Cl. ...................... 398/183; 398/185; 398/188; 398/189
(58) Field of Classification Search ................ 398/183, 398/185, 188, 189, 79, 98
See application file for complete search history.

(56) References Cited

U.S. PATENT DOCUMENTS

| | | | |
|---|---|---|---|
| 4,849,990 A | 7/1989 | Ikegami et al. | 375/40 |
| 5,610,940 A | 3/1997 | Durrant et al. | 375/208 |
| 5,627,856 A | 5/1997 | Durrant et al. | 375/209 |
| 5,629,956 A | 5/1997 | Durrant et al. | 375/208 |
| 5,648,982 A | 7/1997 | Durrant et al. | 375/206 |
| 5,659,574 A | 8/1997 | Durrant et al. | 375/206 |
| 5,680,414 A | 10/1997 | Durrant et al. | 375/206 |
| 5,692,007 A | 11/1997 | Durrant et al. | 375/206 |
| 5,754,584 A | 5/1998 | Durrant et al. | 375/206 |
| 5,754,585 A | 5/1998 | Durrant et al. | 375/206 |
| 5,757,847 A | 5/1998 | Durrant et al. | 375/206 |

(Continued)

OTHER PUBLICATIONS

Nakazawa et al. "Ultrahigh-Speed Long-Distance TDM and WDM Solition Transmission Technologies" *IEEE Journal of Selected Topics In Quantum Electronics*, vol. 6, No. 2 (Mar./Apr. 2000).
Wooten et al. "A Review of Lithium Niobate Modulators for Fiber-Optic Communications Systems" *IEEE Journal of Selected Topics In Quantum Electronics*, vol. 6, No. 1 (Mar./Apr. 2000).

(Continued)

*Primary Examiner*—Dalzid Singh

(57) ABSTRACT

The present invention relates to a method for transmitting data. An optical pulse stream comprising a plurality of return-to-zero optical pulses is prepared by modulating a phase of light output by an optical source to thereby encode data from a data source. The light of the optical pulse stream has a wavelength. The optical pulse stream is transmitted along an optical fiber of an optical network. Optical pulse streams of the invention enhance transmission performance at least in part by reducing noise at the receiver caused by fiber non-linearities.

23 Claims, 33 Drawing Sheets

U.S. PATENT DOCUMENTS

| | | | | |
|---|---|---|---|---|
| 5,832,028 | A | 11/1998 | Durrant et al. | 375/208 |
| 5,856,998 | A | 1/1999 | Durrant et al. | 375/208 |
| 5,872,647 | A * | 2/1999 | Taga et al. | 398/185 |
| 5,881,100 | A | 3/1999 | Durrant et al. | 375/208 |
| 5,946,119 | A | 8/1999 | Bergano et al. | 359/124 |
| 5,953,370 | A | 9/1999 | Durrant et al. | 375/208 |
| 5,963,586 | A | 10/1999 | Durrant et al. | 375/208 |
| 6,014,479 | A | 1/2000 | Darcie | 385/24 |
| 6,282,228 | B1 | 8/2001 | Monroe | 375/14 |
| 6,317,452 | B1 | 11/2001 | Durrant et al. | 375/130 |
| 6,542,280 | B2 * | 4/2003 | Walklin | 359/276 |
| 6,546,177 | B1 * | 4/2003 | Matsuo et al. | 385/123 |
| 6,577,800 | B2 * | 6/2003 | Sarchi et al. | 385/123 |
| 6,583,910 | B1 * | 6/2003 | Satoh | 398/182 |
| 6,671,079 | B2 * | 12/2003 | Fuller et al. | 359/264 |
| 6,694,081 | B2 * | 2/2004 | Bickham et al. | 385/123 |
| 2003/0007216 | A1 * | 1/2003 | Chraplyvy et al. | 359/161 |
| 2003/0030882 | A1 * | 2/2003 | Garrett et al. | 359/246 |
| 2003/0090768 | A1 * | 5/2003 | Liu et al. | 359/183 |
| 2004/0161245 | A1 * | 8/2004 | Bergano | 398/186 |

OTHER PUBLICATIONS

B. Bakhshi, "Comparison of CRZ, RZ and NRZ Modulation formats in a 64 × 12.3 Gb/s WDM transmission experiment over 9000 km" *Tycom Laboratories, 250 Industrial Way West*, Eatontown, NJ 007724, USA.

C. Casper et al. "RZ Versus NRZ Modulation Format for Dispersion Compensated SMF-Based 10-Gb/s Transmission with More Than 100-km Amplifier Spacing" *IEEE Photonics Technology Letters*, vol. 11, No. 4, (Apr. 1999).

D. Le Guen, et al. "25 Ghz spacing DWDM Soliton Transmission over 2000 km of SMF with 25 dB/span" *Corvis Algety*, Lannion, France (e-mail : laurent.billes@algety.com).

June-Koo Rhee et al. "DPSK 32 × 10 Gb/s Transmission Modeling on 5 × 90 km Terrestrial System" *IEEE Photonics Technology Letters*, vol. 12, No. 12 (Dec. 2000).

M. Rohde et al. "Robustness of DPSK Direct Detection Transmission Format in Standard Fibre WDM Systems" *Electronics Letters* vol. 336 No. 17 (17th Aug. 2000).

Hideyuki Sotobayashi et al. "Simultaneously Generated 3.24 Tbit/s (81 WDM × 40 Gbit/s) Carrier Suppressed Source" *Communications Research Laboratory, Independent Administrative Institution 4-2-1, Nukui-Kita*, Koganei, Tokyo 184-8795, Japan (soba@crl.go.jp).

Henrik Sunnerud et al. "A Comparison Between NRZ and RZ Data Formats with Respect to PMD-Induced System Degradation" *IEEE Photonics Technology Letters*, vol. 13, No. 3, (May 2001).

Eric A. Swanson et al. "High Sensitivity Optically Preamplified Direct Detection DPSK Receiver with Active Delay-Line Stabilization" *IEEE Photonics Technology Letters*, vol. 6, No. 2, (Feb. 1994).

J.J. Veselka et al. "Pulse Generation for Soliton Systems Using Lithium Niobate Modulators" *IEEE Journal of Selected Topics in Quantum Electronics*, vol. 2, No. 2, (Jun. 1996).

K. Yonenaga et al. "Reduction of Four-Wave Mixing Induced Penalty in Unequally Spaced WDM Transmission System by Using Optical DPSK" *Electronics Letters* vol. 32 No. 23 (7th Nov. 1996).

Yanjun Zhu et al. "16-Channel 40 Gb/s Carrier-Suppressed RZ ETDM/DWDM Transmission Over 720 km NDSF Without Polarisation Channel Interleaving" *Nortel Networks, Harlow Laboratories, London Road*, Harlow, Essex CM 17 9NA, UK.

* cited by examiner

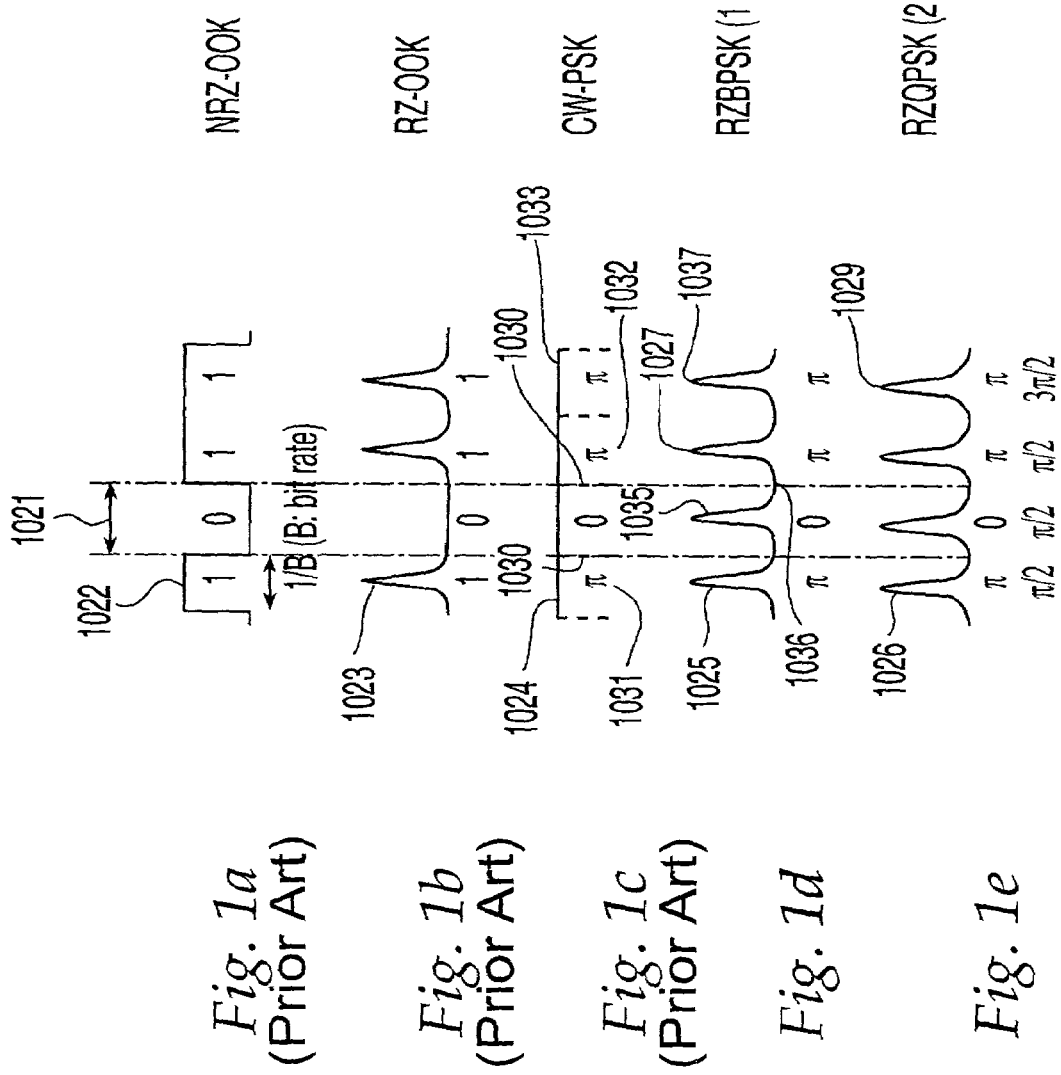

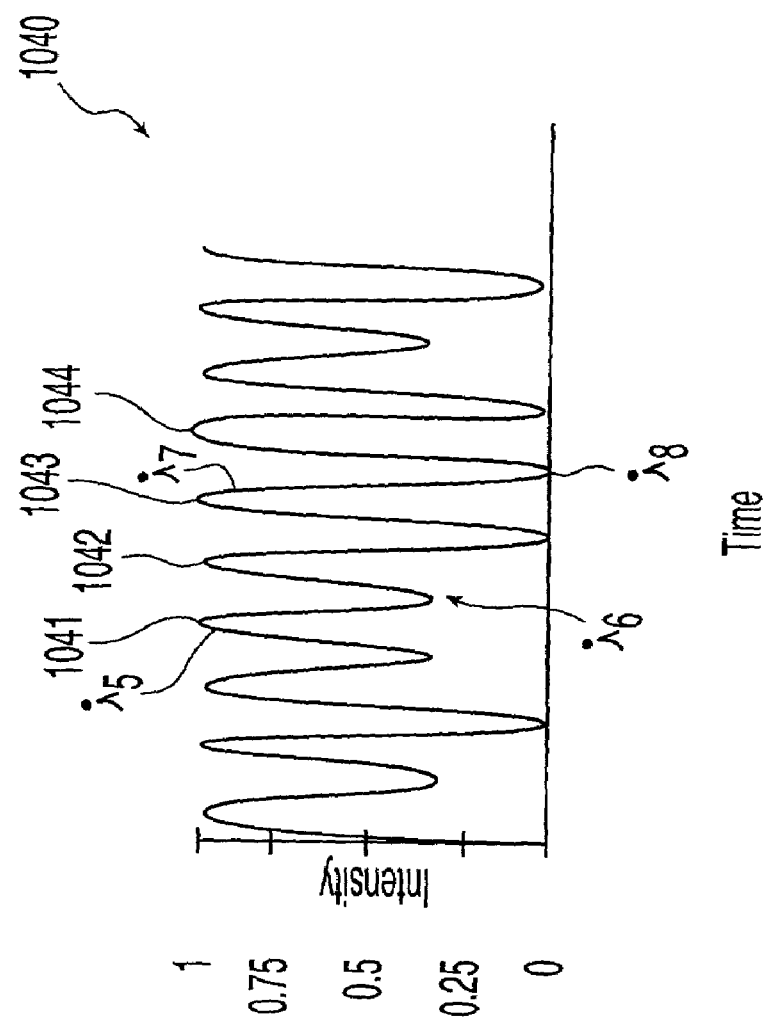

Chirped RZ-BPSK

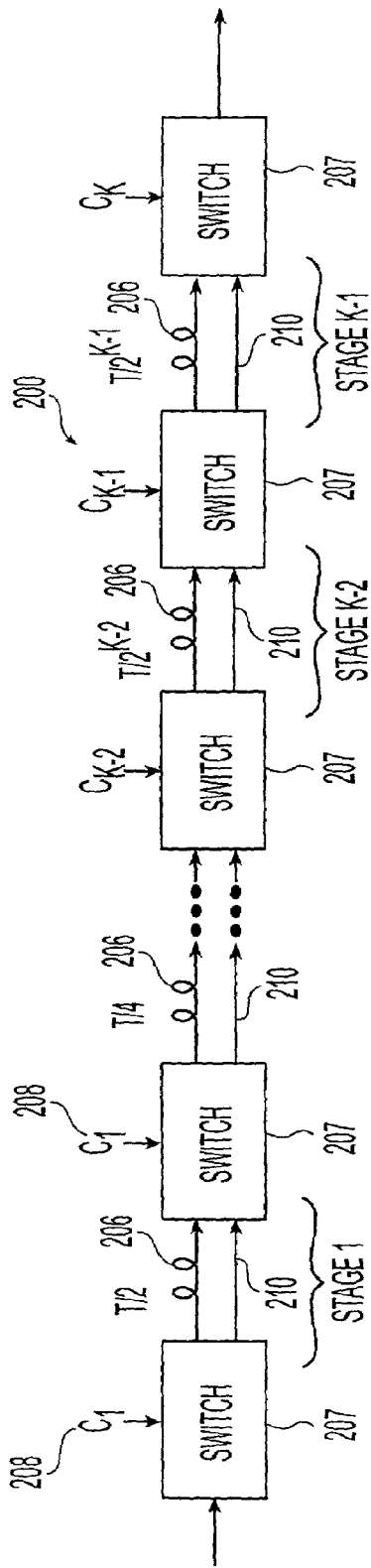
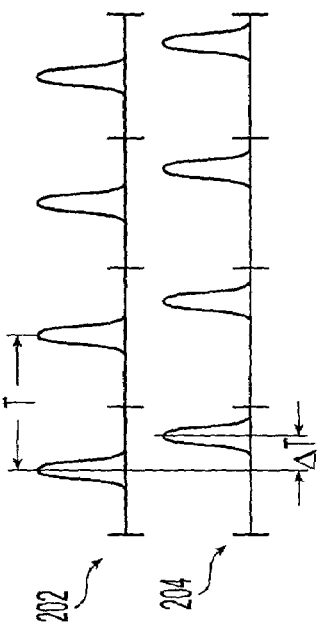
Fig. 17b
(Prior Art)
Fig. 17a

METHOD AND SYSTEM FOR MITIGATING NONLINEAR TRANSMISSION IMPAIRMENTS IN FIBER-OPTIC COMMUNICATIONS SYSTEMS

RELATED APPLICATIONS

This application is a continuation-in-part of prior application Ser. No. 09/962,243, filed Sep. 26, 2001, and is a continuation-in-part of prior application Ser. No. 09/962,339, filed Sep. 26, 2001, and claims the benefit of provisional application No. 60/234,930, filed Sep. 26, 2000, and claims the benefit of provisional application No. 60/352,991, filed Feb. 1, 2002.

FIELD OF THE INVENTION

The present invention relates to a method and system for transmitting and receiving optically encoded information within a fiber optic network.

BACKGROUND

High capacity fiber-optic transmission systems such as dense wavelength-division-multiplexed (WDM) and/or time-division multiplexed (TDM) systems with many closely spaced wavelength and/or time channels modulating at high data rate (>10 Gb/s) are required to meet the growing demand of Internet traffic bandwidth. For long distance fiber-optic links, accumulated optical noise from a chain of optical amplifiers and transmission impairments such as fiber nonlinearities and dispersion (chromatic and polarization mode) limits the practical transmission capacity-distance product. As the transmission distance improves with lumped and distributed optical amplifiers, accumulated nonlinear phase shift due to fiber Kerr nonlinearities becomes a primary concern for WDM/TDM channels with tight channel spacing. The detrimental nonlinearities include interaction of different channels through cross-phase modulation (XPM) and four-wave mixing (FWM). The maximum achievable transmission distance for a minimum bit-error-rate at the receiver typically balances the need to launch high optical power to reduce accumulated optical amplifier noise in order to achieve the required signal-to-noise ratio at the receiver with the need to constrain the optical power in order to mitigate fiber nonlinearities with a combination of dispersion and optical power management. Careful engineering design of the dispersion-managed transmission link with novel modulation techniques that resist fiber nonlinear impairments is essential.

Conventional modulation formats use amplitude shift keying or on-off keying (OOK) to encode binary information onto an optical beam. The result is an optical pulse pattern wherein the presence or absence of a pulse represents a logic ONE or logic ZERO. Currently, non-return-to-zero (NRZ) OOK is widely used in deployed commercial systems because it is relatively simple and low cost to implement and the technology is mature and compatible with industry standards. The width of an NRZ-OOK pulse is the same as the bit period. Another OOK data format is return-to-zero (RZ) that has a duty cycle less than 0.5 with a pulse width less than the bit period. The RZ data format is typically used in long- and ultralong-haul transmission systems, such as submarine systems.

Various forms of RZ-OOK format such as chirped RZ pulses with bit-synchronous sinusoidal phase modulation are described in U.S. Pat. Nos. 5,946,119 and 6,005,702. In U.S. Pat. No. 5,875,045, a technique is proposed to actively adjust the duty cycle of the RZ signal. U.S. Pat. No. 6,014,479 proposes to launch RZ-OOK pulses sequentially both in time and in wavelength.

The information capacity of DWDM systems can be enhanced by increasing the spectral efficiency. This can be achieved by reducing the channel spacing. This, however, increases the penalties for linear as well as nonlinear crosstalk between channels. The crosstalk can be mitigated using a spectrally efficient modulation format such as carrier-suppressed RZ-OOK format with reduced spectral width compared with conventional RZ-OOK format.

All of the above-mentioned RZ-OOK techniques, however, do not address effectively the critical problem of cross phase modulation impairment in fiber (intensity-dependent refractive index). As the FWM penalties are minimized by use of non-zero dispersion-shifted and standard single-mode fibers, the impact of XPM increases. The XPM effect coupled with chromatic dispersion of the fiber produces undesirable accumulated amplitude noise to the WDM/TDM channels from inter- and intra-channel interactions or crosstalk. One of the major noise components induced by XPM can be traced to the bit patterning effect of OOK format. Inherent to OOK format are missing pulses, which represent logic zeros, and due to the random nature of the data there are isolated pulse patterns and sequential pulse patterns. As different channels collide with each other, all channels may experience random pulse intensity pattern and therefore crosstalk noise induced by XPM.

The spectrum of a typical OOK optical signal contains a strong carrier component with weaker data sidebands. The strong carrier component provides very efficient FWM components with other channels. A carrier-suppressed signal has a reduced FWM effect. Further, the optical phase of the neighboring pulse of an OOK channel is typically the same (in-phase). As the neighboring pulses spread due to dispersion the trailing and leading edges of the neighboring pulses have different frequencies (colors). The neighboring pulse edges disperse and coincide in time and interact with each other, generating unwanted new frequencies through FWM. This intra-channel FWM effect tends to deplete and distort the pulses and generates unwanted noise-like pulses. The undesirable new frequencies contribute to amplitude noise of other channels.

It should be noted that the peak power of an OOK optical signal is equal to two times the average power of the signal divided by its duty cycle. The factor of two comes from the missing pulses of the OOK data sequence: there are on average 50% zeros. Since the nonlinear phase shift from the fiber Kerr nonlinearities increases with the peak power of the pulses the factor of two due to the missing pulses reduces the maximum launch power that could be used to reduce the accumulated optical amplifier noise. What is needed to mitigate the fiber impairments is therefore a method of transmission that is capable of suppressing the intra and inter-channel FWM, XPM, and bit patterning effects.

A phase shift key (PSK) optical signal is generated by sending a continuous-wave (CW) laser to a phase modulator driven by a source of electrical binary data. To demodulate and recover the PSK signal, the optical phase information is converted to amplitude modulation before detection by a photo-diode. For a PSK signal, homodyne or heterodyne detection is employed that requires a local laser oscillator at the receiver. The frequency and phase of the local oscillator needs to lock to the incoming PSK signal as well as matching the polarization states. A simplified approach is to use DPSK with a self-homodyne demodulator such as an apparatus described in U.S. Pat. No. 5,319,438. The self-homodyne detection does not require a local oscillator and therefore does not need for complex frequency, phase, and polarization tracking devices.

A major drawback of CW-modulated PSK and DPSK formats is the conversion of phase to amplitude modulation through fiber dispersion. Because of the continuous phase modulation of the CW optical beam by the electrical binary signal, fast transitions of the binary data produces undesirable phase modulation on the CW beam (frequency chirping) and therefore spectral spreading. As the phase modulated CW beam propagates through dispersive fiber, amplitude modulations at the transitions are generated. The amplitude modulation produces intra- and inter-channel crosstalk noise induced by intensity patterning effect as a result of XPM. Further, modulation instability of the CW-PSK signal in anomalous dispersive fiber can cause severe distortions of the PSK signal under high launching power. Transmission of PSK signal in low or zero dispersion fiber such as dispersion-shifted fiber reduces the phase-to-amplitude conversion impairment. This, however, limits the application of the CW-PSK signals since significant portions of deployed fibers are non-dispersion-shifted fibers. Further, CW-PSK signals can suffer large FWM penalties for DWDM transmission in low dispersion fiber. A recent experiment demonstrated OCDMA using quaternary PSK with RZ pulses. However, short optical pulses are required for coding. Because of the broad spectrum associated with short pulses the transmission distance is limited.

SUMMARY OF THE INVENTION

One embodiment of the present invention relates to a method for optically transmitting information using phase shift keyed (PSK) optical pulse train comprising a plurality of return-to-zero optical pulses. Adjacent return-to-zero optical pulses preferably have an extinction ratio therebetween of at least about 10 dB, such as at least about 15 dB or at least about 20 dB. As used herein, the term pulse train refers to a series of a plurality of pulses. An optical signal may include one or more optical pulse streams. An optical data stream is an optical signal.

Preparing the PSK optical pulse train comprises modulating an amplitude of a continuous wave (CW) light beam output by an optical source to thereby provide an optical pulse stream comprising a plurality of return-to-zero optical pulses. The light of the optical pulse train has a wavelength, such as between about 1500 and 1625 nanometers. An example of a preferred light source is a CW laser preferably emitting light in the infrared. An alternative preferred light source is a pulsed laser, such as a mode locked laser, also emitting light in the infrared. When a pulsed light source is used, the step of modulating an amplitude may be omitted.

The optical pulse train is accepted by a phase modulator, which encodes information from a data source by modulating a phase of optical pulses of the optical pulse train to thereby prepare the PSK optical pulse stream. The optical pulse train is transmitted along an optical fiber of an optical network. The optical network is preferably a long haul optical network. The pulse train is preferably transmitted over a distance of at least about 10 km, for example, at least about 100 km or at least about 1000 km.

As an alternative to first modulating the amplitude of the light, the phase of light from a CW light beam from a CW light source may be modulated to prepare a CW PSK modulated optical signal, which encodes information from a data source. The amplitude of the light output by the optical source may then be modulated to provide a PSK modulated optical signal comprising a plurality of return-to-zero pulses. Whether performed before, after, or concurrently with the phase modulation, the term amplitude modulation is not meant to be restricted to on-off modulation of the light output by the optical source. Rather amplitude modulation includes amplitude modulation that provides for modulation depths of less than 10 dB.

In one embodiment, the modulation depth between adjacent pulses depends on whether the pulses represent the same logic value. Pulses representing different logic values preferably have a relative phase difference of at least about $\pi/4$, for example, at least about $\pi/2$. The modulation depth between adjacent pulses that represent different bit values is preferably at least about 10 dB, such as at least about 15 dB, for example, at least about 20 dB.

The optical pulse train may include pulses for which the modulation depth between adjacent pulses is less than 10 dB. For example, an extinction ratio between adjacent pulses that have a relative phase difference of essentially zero is preferably less than about 8 dB. In this embodiment, the modulation depth between adjacent pulses that have a relative phase difference of essentially zero is preferably at least about 3 dB. Adjacent pulses for which the modulation depth is less than about 10 dB preferably represent the same logic value.

The optical fiber of the optical network has a zero dispersion wavelength, which zero dispersion wavelength preferably differs from the wavelength of the optical pulse train by at least about 50 nanometers, such as at least about 100 nm. For example, an optical pulse train having a wavelength of between about 1500 and 1625 nanometers differs from the zero dispersion wavelength of single mode dispersion fiber, which has a zero dispersion wavelength of about 1310 nanometers.

Yet another embodiment of the invention relates to a method for optically transmitting information. The method comprises preparing a first optical pulse train comprising first return-to-zero optical pulses by modulating a phase of first light output by a first optical source to thereby encode the first optical pulse train with information from a first data source and; preparing a second optical pulse train comprising second return-to-zero optical pulses by modulating a phase of second light output by a second optical source to thereby encode the second optical pulse train with information from a second data source. An optical signal is prepared by combining the first and second modulated optical pulse trains. The optical signal is transmitted along an optical fiber of an optical fiber network. The optical signal is preferably a quaternary phase shift keyed optical signal comprising return to zero optical pulses.

Another embodiment of the invention relates to a method for optically transmitting information. The method comprises preparing a plurality of PSK optical pulse streams each comprising a plurality of return-to-zero optical pulses. The pulses of each optical pulse stream encode information from a respective data source. Preferably, each pulse stream encodes information from a different data source. The PSK optical pulse streams are combined to prepare a time division multiplexed (TDM) optical signal. The TDM optical signal is transmitted along an optical fiber of an optical fiber network. In an preferred embodiment, the PSK optical pulse streams comprise a combination of return to zero and non-return to zero optical pulses. In a another embodiment, the PSK optical pulse streams are essentially free of non-return to zero optical pulses.

Yet another embodiment of the invention relates to a system for transmitting and receiving optically encoded information. The system includes a transmitter to modulate a phase of respective optical pulses of an optical pulse train to thereby prepare an optical signal that comprises return-to-zero optical pulses encoded with information from a data source. The transmitter is configured to transmit the optical signal along an optical fiber of an optical network. A receiver of the system is configured to demodulate the return-to-zero optical pulses to thereby decode the information from the optical signal.

Another embodiment of the invention relates to a fiber optic network for carrying optical signals. The network includes at least one optical fiber having embedded therein a return-to-zero binary phase shift keyed (RZ-BPSK) optical signal. A RZ-BPSK optical signal is an optical signal that comprises return-to-zero optical pulses. The RZ-BPSK optical signal may include one or more pulse trains. In a preferred embodiment, the embedded optical signal is essentially free of non-return to zero optical pulses.

Preferably, for the embedded optical signal, the modulation depth between adjacent pulses that represent different logic values is at least about 10 dB, such as at least about 15 dB. The embedded optical signal may include pulses for which the modulation depth between adjacent pulses is less than 10 dB. For example, an extinction ratio between adjacent pulses that have a relative phase difference of essentially zero is preferably less than about 8 dB. The modulation depth between adjacent pulses that have a relative phase difference of essentially zero is preferably at least about 8 dB.

Another embodiment of the invention relates to a method for optically transmitting information, comprising preparing a plurality of phase shift keyed (PSK) optical data streams. Each of the PSK optical data streams preferably has a different wavelength and encodes information from at least one respective data source. The PSK optical data streams are combined to prepare a wavelength division multiplexed (WDM) optical signal. An amplitude of the WDM optical signal is modulated to prepare a return-to-zero phase shift keyed wavelength division multiplex (RZ-PSKWDM) optical signal comprising a plurality of return-to-zero optical pulses. The RZ-PSKWDM optical signal is transmitted along an optical fiber of an optical fiber network.

Another embodiment of the present invention relates to a method for receiving optically encoded information. The method includes receiving an optical pulse train comprising return-to-zero optical pulses, pulses of the optical pulse train having been phase-modulated to encode information. Prior to being received, the optical pulse train will have traveled along an optical fiber of an optical network, such as a long haul optical network. The received optical pulse train is demodulated to thereby decode the information.

In one embodiment, the optical pulse train is a BPSK optical signal comprising return-to-zero optical pulses. In another embodiment, the optical pulse train is QPSK optical signal comprising return to zero optical pulses.

Another embodiment of the invention relates to a method for demodulating information phase encoded within a PSK optical signal comprising a plurality of return-to-zero optical pulses. The return-to-zero pulses have a bit period T. The demodulation is preferably a self-homodyne demodulation that converts phase encoded information to amplitude encoded information upon a recombination of the optical signals.

An optical signal to be demodulated is preferably split into first and second split optical signals using an optical splitter. The first split optical signal is delayed relative to the second channel by a time equivalent to an integral multiple of the bit period T. Preferably, one of the channels is delayed by a time T relative to the other channel. The two channels are recombined using a combiner to prepare a first and second combined optical signals.

The amplitude of pulses of the combined optical signals depend upon the optical phase of adjacent pulses present in the optical pulse stream to be demodulated. For example, out-of-phase adjacent pulses produce a zero amplitude in the first combined optical signal. In the second combined optical signal, the same out-of-phase adjacent pulses produce a maximum amplitude. In-phase adjacent pulses produce a maximum amplitude in the first combined optical signal. In the second combined optical signal, the same in-phase adjacent pulses produce a minimum amplitude. One or both of the combined optical signals is detected preferably by using a square law detector.

BRIEF DESCRIPTION OF THE DRAWINGS

The present invention is discussed below in reference to the accompanying drawings in which:

FIGS. 1a–1f shows examples of digital modulation formats for optical telecommunications systems;

FIG. 13a illustrates the demodulation of a PSK optical signal using an asymmetric Mach-Zehnder (AMZ) interferometer according to the invention;

FIG. 13b illustrates a relative delay imparted by the AMZ interferometer of FIG. 13a.

FIG. 16b shows optical pulse streams and electronic signals associated with the operation of the receiver of FIG. 4a;

FIG. 17a shows a time difference between two unsynchronized optical pulse streams;

FIG. 17b illustrates a tuneable time delay suitable for use with receivers of the present invention;

FIG. 19b shows a first embodiment of an electronic block for processing signals received by the receiver of FIG. 19a;

DETAILED DESCRIPTION OF THE INVENTION

Figure 2:
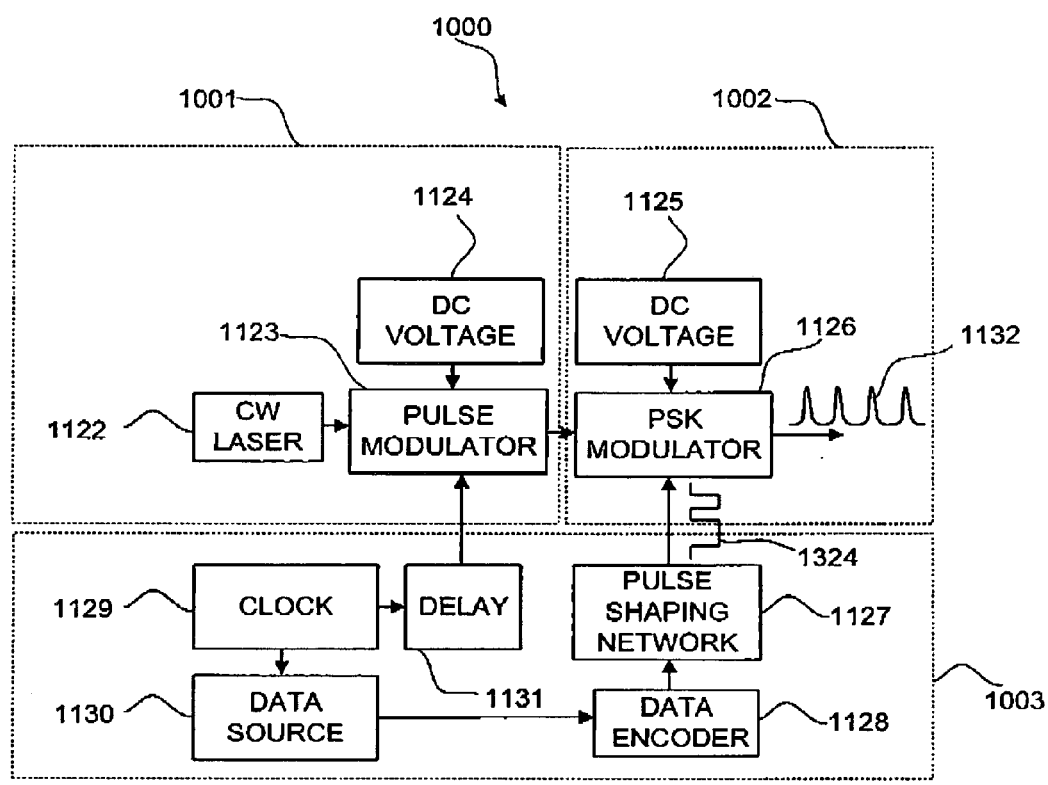
FIG. 2 shows an optical transmitter according to the invention.

The present invention addresses problems of fiber nonlinear impairments, such as those associated with the transmission of OOK and CW-PSK signals through optical fibers. The current invention provides a modulation format that effectively suppresses fiber nonlinearities by preparing a preferably continuous regular train of optical pulses that are phase modulated to encode information from a data source.

Referring to FIGS. 1a–1f, a binary phase-shift keying (PSK) optical pulse stream 1025 of the invention comprises return-to-zero optical pulses. A phase, such as 0 or π, of optical pulses 1027 represents information encoded from a data source. Pulse stream 1025 contains essentially no missing pulses and is transmitted into an optical fiber as a continuous pulse train. A quaternary PSK optical pulse stream 1026 also comprises return-to-zero optical pulses. Each pulse of pulse stream 1026 encodes 1 bit of information from a respective one of two data sources. For example, a pulse 1029 encodes includes a first underlying pulse having a phase of π and a second underlying pulse having a phase of 3π/2. Pulse stream 1026 is essentially free of missing pulses.

Adjacent out-of-phase pulses of pulse streams 1025 and 1026 include phase transitions that occur when the optical intensity is relatively small compared to the maximum optical intensity present in the pulse stream. For example, a phase transition between pulses 1035 and 1027 occurs at a point 1036, which has an intensity relatively smaller than a maximum intensity 1037 of optical pulse steam 1025.

Optical pulse streams prepared by the method of the invention are not limited to only return-to-zero optical pulses. For example, as shown in FIG. 1f, an optical pulse stream 1040 of the invention comprises both return-to-zero pulses and non-return-zero pulses. For example, pulses 1041 and 1042 are non-return-to-zero (NRZ) pulses. Pulses 1043 and 1044 are return-to-zero (RZ) pulses. The NRZ pulses and the RZ pulses are phase modulated to represent logic values provided by a data source. Thus, the NRZ and RZ pulses are part of the same optical pulse stream 1040. By NRZ pulse it is meant a pulse having an extinction ratio between an adjacent pulse of at least about 3 dB and less than about 8 dB. For example, expressed in dB, the extinction ratio between pulses 1041 and 1042 is given by 10 log10(i5/i6)=10 log10(1/.3125)=about 5 dB. Preferably, optical pulse streams of the invention comprise NRZ pulses where the adjoining pulses represent the same logic values. Because the NRZ pulses are phase modulated to encode the logic values from a data source, the NRZ pulses preferably have a relative phase difference of essentially zero so that they are demodulated as the same logic value.

By RZ pulse, it is meant a pulse having an extinction ratio between an adjacent pulse of at least about 10 dB. For example, expressed in dB, the extinction ratio between pulses 1043 and 1044 is given by 10 log10(i7/i8)≧10 dB. Preferably, optical pulse streams of the invention comprise RZ pulses where the adjoining pulses represent different logic values. Preferably, the relative phase of the RZ pulses differ by at least about π/N, where N is the number of logic values represented by the pulse. For example, N would be 1 for a BPSK optical pulse stream and 2 for a QPSK optical pulse stream.

A prior art CW-PSK optical data stream 1024 does not include missing pulses. For example, bit period 1021 of CW-PSK optical data stream 1024 includes optical intensity having a relative phase of 0. Transitions 1030 between the phase of the optical intensity present in bit period 1021 and the phase of the optical intensity present in adjacent bit periods 1031, 1032 occur when the optical intensity is essentially the same as the maximum optical intensity 1033 present in optical data stream 1024.

A prior art pulse stream 1022, which is a non-return-to-zero OOK pulse stream, includes a bit period 1021 having a missing pulse. A prior art return-to-zero OOK pulse stream 1023 also includes a missing pulse at bit period 1021. By missing pulse it is meant a bit period having essentially no optical energy present. For example, in an OOK optical signal, a logic value of 0 is typically represented by a missing pulse.

Because pulse streams of the present invention have essentially no missing pulses, there is no pulse patterning effect and the XPM degradation is therefore significantly reduced. By "essentially free of missing pulses" it is meant that less than 10%, such as less than about 5%, for example less than about 1%, of the bit periods have missing pulses where no amplitude is present. Pulse-to-pulse consistency is maintained. For the same average power, the peak power of a pulse stream of the present invention is preferably at least two times less than that for the RZ OOK format. Lower pulse peak power further reduces nonlinear effects in the fiber.

The present modulation format also reduces the intrachannel FWM nonlinear effects caused by out-of-phase neighboring pulses that occurs approximately half of the time for random data sequences. The PSK optical pulse streams of the invention also have a higher stimulated Brillouin scattering (SBS) threshold power compared with OOK signals. Stimulated Brillouin scattering is a nonlinear process that attenuates optical signal propagation in fiber. Higher launch power to the fiber is therefore possible with a pulse stream of the present invention without significant degradation of the pulse integrity from fiber nonlinearities. Accumulation of noise from optical amplifier is therefore reduced with better signal-to-noise level as a result of higher launch power.

The present modulation scheme is readily compatible with existing fiber-optic transmission links in submarine and long-haul terrestrial systems. The present invention offers a cost-effective solution to increase the transmission distance, repeater spacing, and/or capacity of existing and future long-haul fiber-optic links. Detail of the present invention is described next.

A preferred embodiment of the system of the invention includes a typical fiber-optic transmission system link with a transmitting terminal and a receiving terminal connected with the transmission fiber link. The transmitting terminal preferably comprises one or more transmitters that generate data modulated optical pulse streams (pulse streams that have been phase modulated to encode information) and an element such as a combiner to combine all the channels into a single fiber before launching into the transmission fiber link. Multiple optical information channels can be multiplexed into a single fiber by combining a plurality of optical pulse streams with different wavelengths or with time-division multiplexing.

The receiving terminal consists of a plurality of receivers that retrieve information of the respective transmitted channels and a mean to separate the individual channels and direct them to their designated receivers. The transmission and reception of optical signals of the present invention is discussed below.

Preparation and Transmission of Optical Signals Comprising PSK RZ Pulses

Referring to FIG. 2, a transmitter 1000 comprises a pulse generator portion 1001 and a phase-shift keying (PSK) modulator portion 1002. An electronics package 1003, includes timing electronics and a data source 1130. Pulse generator portion 1001 produces an optical pulse stream 1222 (see FIG. 3) having a repetition rate, which is preferably the same as a bit rate of an electrical binary signal provided by data source 1130. PSK modulator portion 1002 encodes information from the electrical binary signal by modulating the phase of the optical pulses of the pulse stream output by pulse generator portion 1001. Pulse generator portion 1001 and PSK modulator 1002 may be integrated on a single lithium niobate substrate and thereby combined in a single package thus reducing the size.

The output of PSK modulator portion 1002, a PSK optical pulse stream 1132, is preferably input to an optical fiber of a fiber optic network for transmission to a remote receiver. Alternatively, the PSK optical pulse stream may be combined with a plurality of other PSK optical pulse streams to prepare a wavelength multiplexed or time multiplexed optical signal, which is input into the optical fiber of the fiber optic network. Optical pulse stream 1132 preferably comprises return-to-zero optical pulses. Optical pulse stream 1132, like any optical pulse stream of the invention may further comprise a plurality of non-return-to-zero optical pulses.

Whether transmitted individually or as a multiplexed optical signal, the PSK optical pulse streams of the present invention resist signal distortions associated with, for example, the fiber optic transmission of OOK and CW-PSK optical signals.

Each pulse of optical signal 1132 represents at least 1 bit, i.e., there is at least one information channel per pulse. Where each pulse represents 1 bit, the optical signal 1132 is a binary phase shift keyed (BPSK) optical signal comprising a plurality of return-to-zero optical pulses. Alternatively, pulses of optical signal 1132 may comprise more than one bit per pulse. For example, a quaternary PSK (QPSK) optical signal of the invention includes 2 bits per pulse, i.e., there are two information channels per pulse. The QPSK optical signal comprises a plurality of return-to-zero optical pulses.

It should be understood that a transmitter of the invention may be configured to phase modulate a CW optical light beam to encode information from a data source. Subsequently, the phase modulated CW optical light is amplitude modulated to prepare an optical signal comprising phase modulated return to zero optical pulses. In such a transmitter, a PSK modulator would accept an optical light beam from a CW light source to prepare a CW-PSK optical data stream. A pulse modulator would accept the CW-PSK optical data stream output by the PSK modulator. Preferably, the pulse modulator would reduce the optical intensity associated with rapid phase transitions present in the CW-PSK data stream to thereby prepare a PSK optical signal comprising return-to-zero optical pulses.

Pulse generator 1001 includes a light source, such as a laser 1122, and a pulse modulator 1123. Laser 1122 may be, for example, a distributed feedback semiconductor diode laser suitable for fiber-optic communications and having a linewidth of about 5 MHz or less. Laser 1122 preferably outputs a CW laser beam, which is received by pulse modulator 1123, which prepares an optical pulse stream from the CW laser beam. Pulse modulator 1123 preferably includes an amplitude modulator such as an electro-optic modulator or an electroabsorption modulator. An example of a preferred electro-optic modulator is a lithium niobate Mach-Zehnder modulator. As an alternative to pulse generator 1001, a pulsed laser, such as a mode-locked laser, can also be used to provide an optical pulse stream to PSK modulator 1126.

Pulse modulator 1123 is driven by an electrical sinusoidal radio frequency (RF) signal output by a clock 1129, which also drives data source 1130. Thus, the RF signal has a frequency identical to the bit rate of the data source. For example, the RF signal is 12.5 GHz for a 12.5 Gb/s bit rate. A DC voltage source 1124 inputs a DC voltage to bias pulse modulator 1123, as discussed below. A variable delay 1131 assures that the RF signal driving pulse modulator 1123 remains synchronous with a signal from a pulse shaping network 1127, which drives PSK modulator 1126.

Figure 3:
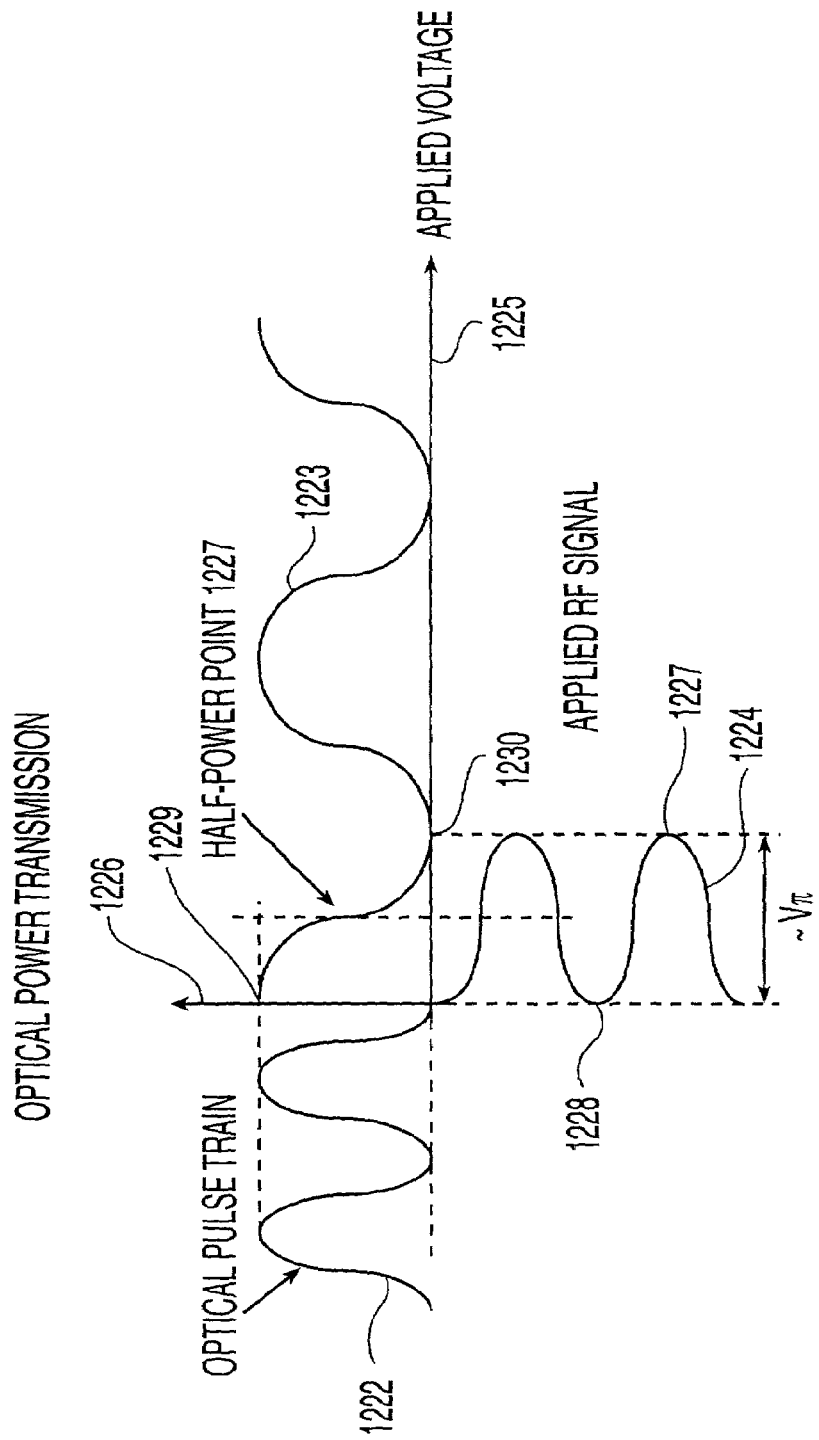
FIG. 3 illustrates optical pulse train generation using a Mach-Zehnder (MZ) amplitude modulator.

Referring to FIG. 3, the optical power transmission of a lithium niobate electro-optic modulator having a Mach-Zehnder (MZ) interferometer is shown. Optical power transmission of the modulator is shown along an axis 1226. Axis 1226 also represents the intensity of an optical pulse stream 1222 output by the modulator. The total voltage applied to the modulator is shown along an axis 1225. The total applied voltage is given by the sum of the voltage from voltage source 1124 and an RF signal 1224 accepted from clock 1129. A sinusoidal curve 1223 represents the optical power transmission of the modulator as a function of the total applied voltage.

The DC bias voltage from voltage source 1124 is applied to the modulator to maintain, in the absence of the RF signal 1224, a half-power (quadrature) point 1227 of the modulator's optical power transmission response. The voltage of RF signal 1224 has a peak-to-peak close to the half-wave voltage ($V_\pi$) of the modulator. The RF signal from clock 1129 may be input to an RF amplifier provide the required half-wave voltage, which is typically at least 6 volts at 12.5 GHz for commercial lithium niobate modulator.

The half-wave voltage of the modulator corresponds to a differential optical phase shift of $\pi$ between the two arms of the MZ interferometer of the modulator. Thus, a peak voltage 1227 of RF signal 1224 corresponds to a minimum 1230 of the modulator optical transmission. A minimum voltage 1228 of RF signal 1224 corresponds to a maximum 1229 of the modulator optical transmission. This produces a near 50% duty cycle optical pulse stream 1222. A preferred extinction ratio of the output pulse at high frequency is at least 10 dB. The extinction ratio is the ratio of the peak optical power transmission 1229 to the minimum optical power transmission 1230.

In addition to the duty cycle of pulse stream 1222, other characteristics such as the temporal shape and extinction ratio of pulses can be adjusted through control of the DC bias and the RF drive voltage applied to the modulator. It is preferred that the pulse be a smooth sinusoidal or bell-shaped type function with a duty cycle of less than about 70% such as about 50% to minimize spectral spreading.

An optimal pulse shape and extinction ratio of the pulse can be obtained by controlling the DC bias and the RF driving voltage. Lithium niobate MZ modulators are commonly used in high-speed fiber-optic communications and are well understood for those who are skilled in the art. A chirp-free push-pull type MZ modulator can also be used to minimize spectral spreading of the pulse.

Preparation of a BPSK Modulated Signal

Referring back to FIG. 2, PSK modulator 1126 accepts the pulse stream prepared by pulse generator 1001 or chirped pulse stream produced by a chirped pulse generator and encodes information from the electrical binary signal output by data source 1130. The output of PSK modulator 1126 is a pulse stream 1132 having return-to-zero pulses that are phase modulated to encode the information. Values of logical 1 and logical 0 are preferably represented by return-to-zero (RZ) pulses having a substantially identical peak amplitude but with a relative phase shift of $\pi$. There is preferably a relative phase shift of zero between pulses representing the same logic state.

PSK modulator 1126 preferably includes a push-pull MZ modulator, such as a broadband single-drive push-pull MZ modulator based on x-cut lithium niobate having a modulation bandwidth from DC to at least up to the bit rate of data source 1130. As used herein, the term MZ interferometer is synonymous with MZ modulator. In a MZ interferometer, light is split into two optical paths (arms) that are optically isolated from one another. Each optical path is preferably defined by a light guiding structure such as a waveguide. An applied electric field (voltage) from an electrode along the arms of the MZ modifies the relative velocities of the two optical beams via the electro-optic effect. Recombination of the two beams at the output coupler results in variable interference that depends upon the relative phase shift of the recombined beams. A push-pull MZ modulator is a modulator configuration in which voltages are applied to the optical waveguide in each of the two arms of the modulator such that the phase shift in the two waveguides are equal and with opposite signs. The phase shift introduced by the MZ modulator is a function of the total applied voltage.

PSK modulator 1126 accepts a DC bias voltage from a DC voltage source 1125 and an electrical signal 1324, which is representative of binary data from data source 1130, is input to the modulator. During operation, changes in the amplitude of electrical signal 1324 introduce a change in the sign of the optical electric field output by the MZ interferometer.

Figure 5:
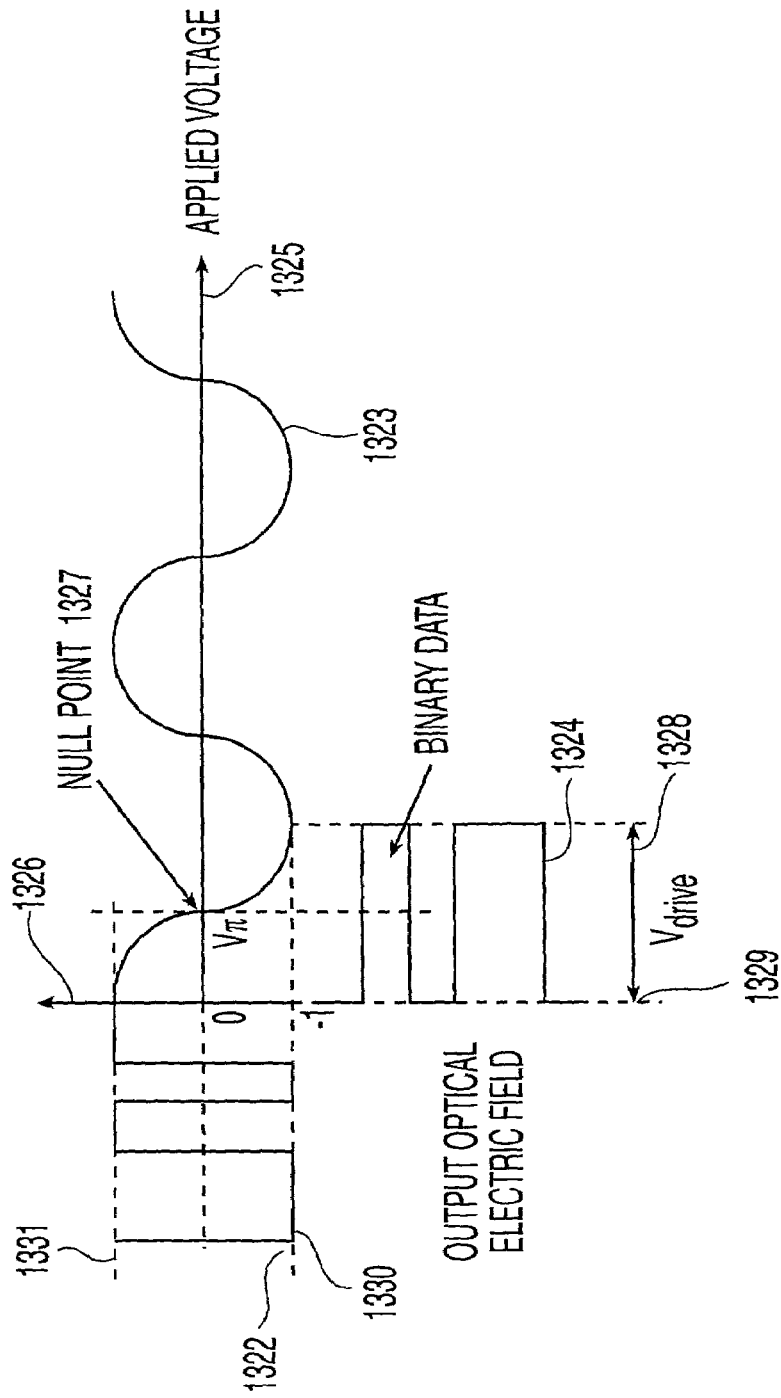
FIG. 5 illustrates the optical electric field transmission response of a push-pull MZ modulator biased at its null point.

Referring to FIG. 5, an optical electric field transmission function 1323 of a push-pull MZ modulator versus applied voltage, V, is given by $\cos[(p/2)(V/V_\pi)]$. This assumes an ideal push-pull MZ modulator having balanced waveguides and 50/50 directional couplers. The optical electric field transmission of the push-pull MZ modulator is shown along an axis 1326 as a function of the applied voltage V, which is shown along an axis 1325. Electrical signal 1324 varies between a first voltage 1328 and a second voltage 1329. First voltage 1328 is representative of a first logic value, for example logical 1. Second voltage 1329 is representative of the other logic value, for example logical 0.

The DC voltage from a DC voltage source 1125 is preferably set to bias the MZ interferometer of the PSK modulator at its electric field null point $V_\pi$ 1327. When the MZ modulator is DC-biased at its electric field null point 1327, a change in the amplitude of the voltage of electrical signal 1324 produces a change in the sign of the output optical electric field 1322. For example, a change from a voltage 1328 to a voltage 1329 causes the sign of the optical electric field to change from −1 to +1, which is equivalent to a relative phase change of $\pi$ in the output of the MZ interferometer.

Figure 6:
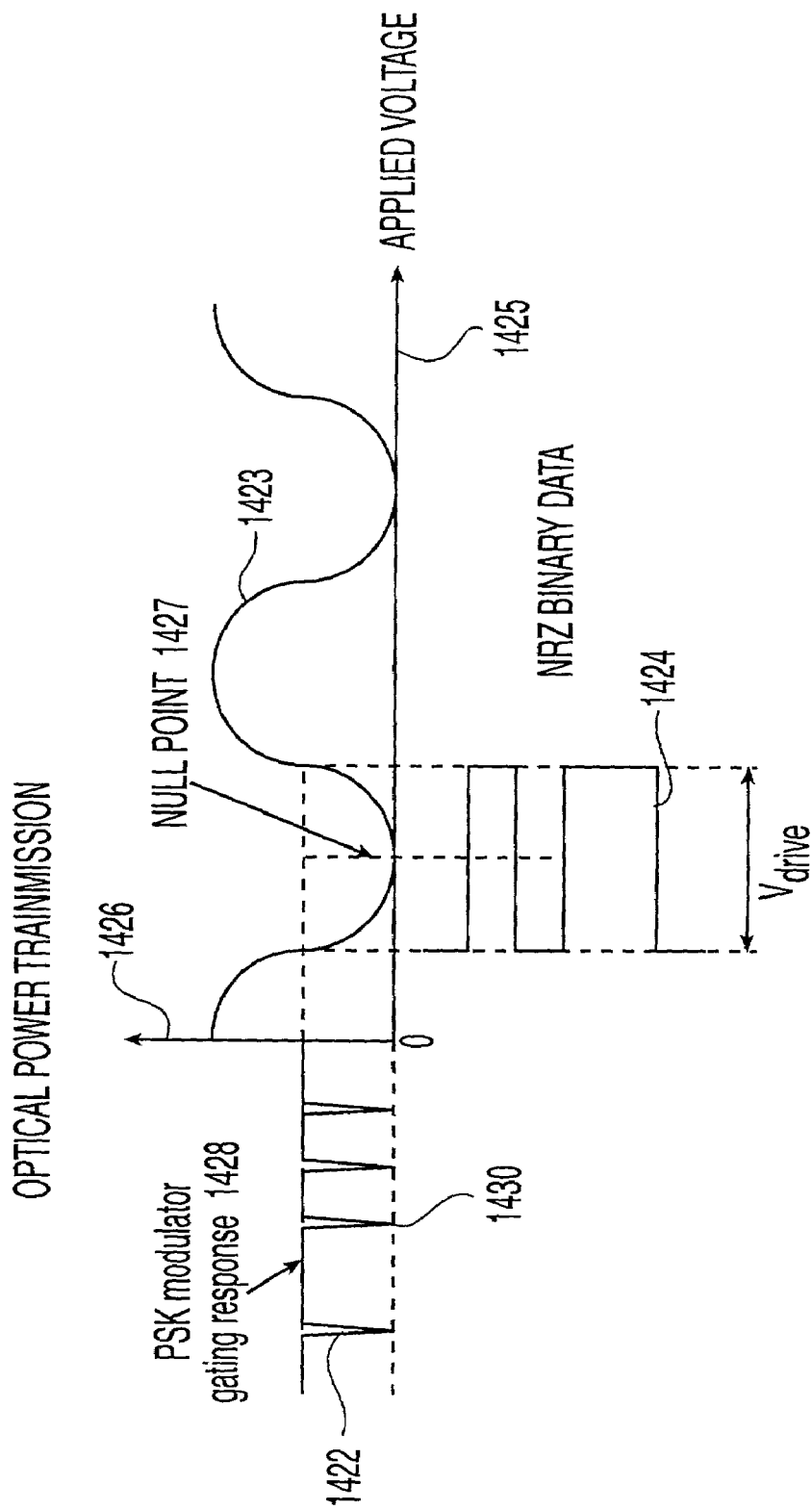
FIG. 6 illustrates the optical power transmission response of a push-pull MZ modulator biased at its null point.

Referring to FIG. 6, the optical power transmission 1423 is shown along an axis 1426 as a function of the total voltage applied to the MZ interferometer. An optical transmission null point 1427 represents a minimum in the optical power transmission as a function of applied voltage. The PSK modulator gating response 1428 is equivalent in shape to the optical output of the PSK modulator that would be observed for a CW laser input. As the voltage of electrical signal 1324 passes through null point 1427, the optical power transmission of the PSK modulator, that is the PSK modulator gating response 1428, may exhibit rapid transitions 1422. When the voltage is at the null point 1427, the gating response 1428 exhibits a minimum 1430 in optical power transmission. Otherwise, the optical power transmission has a nearly constant power level. As discussed below, it is preferable to reduce or eliminate rapid transitions 1422 from a phase modulated optical pulse stream output by the PSK modulator.

The transmission loss of the optical signal is reduced as the applied peak-to-peak voltage is increased. Individual channel power can be adjusted by controlling the RF drive voltage for channel power equalization or pre-emphasis. A RF amplifier is preferably used to produce the required drive voltage.

Figure 7:
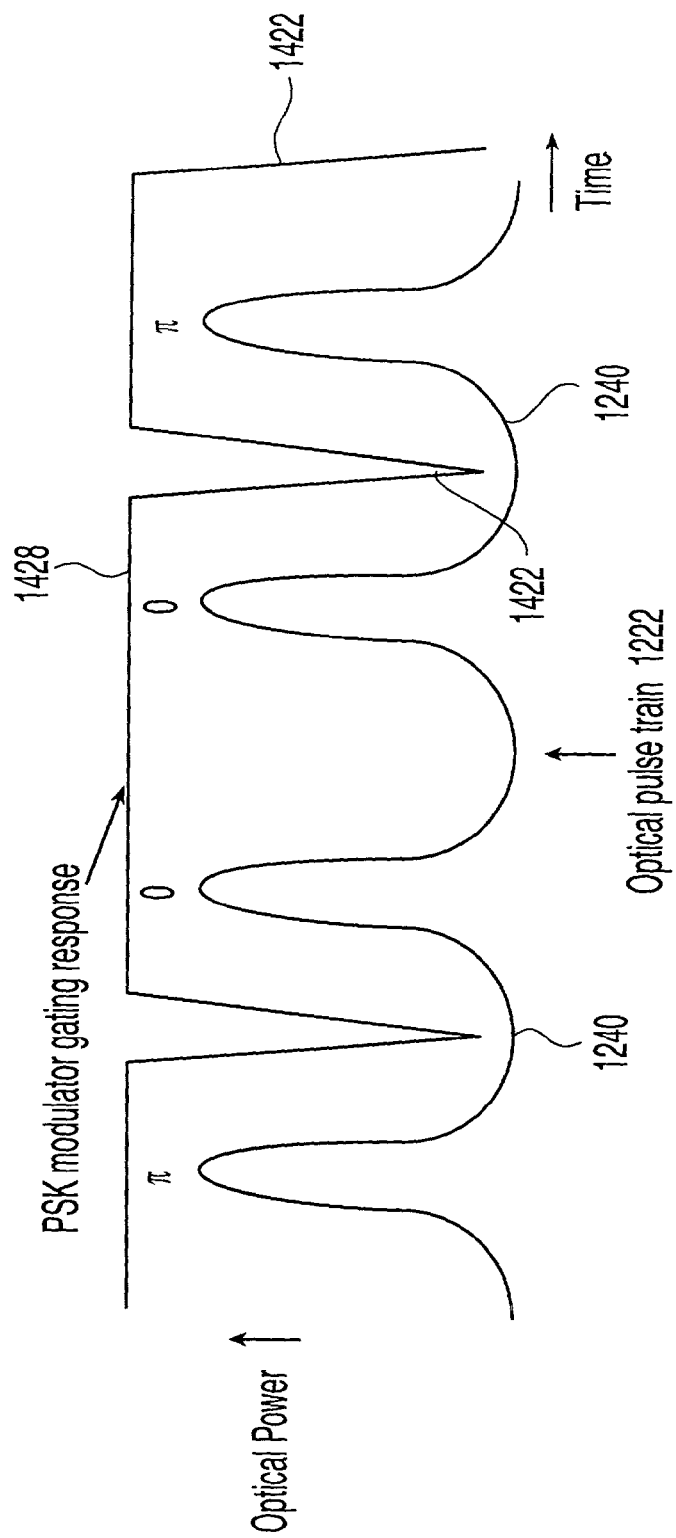
FIG. 7 shows the timing relationship between an RZ optical pulse and a PSK modulator gating response according to the invention.

Referring to FIG. 7, the PSK modulator gating response is preferably synchronized with respect to the optical pulse stream 1222 to thereby minimize the effect of rapid transitions 1422 on the amplitude of the pulse stream. Recall that clock 1129 determines the bit rate of data source 1130, which drives data encoder 1128 and pulse shaping network 1127, which provide electrical signal 1324 to PSK modulator 1126. The occurrence of rapid transitions 1422 corresponds to changes in the voltage of electrical signal 1324. Clock 1129 also drives, through delay 1131, pulse modulator 1123, which prepares optical pulse stream 1222. By adjusting the delay imparted by delay 1131, optical pulse stream 1222 and electrical signal 1324 are synchronized so that the rapid transitions 1422 are aligned with amplitude minima 1240 of optical pulse stream 1222. Because rapid transitions 1422 in the optical power transmission of PSK modulator 1126 coincide with amplitude minima of optical pulse stream 1222, the optical power of pulse stream 1132 output by PSK modulator 1126 is similar to optical pulse stream 1222. Synchronizing the input optical pulse stream 1222 with the gating response 1428 provides the maximum optical transmission through the modulator and also reduces the amount of undesirable spectral spreading that would otherwise be caused by rapid amplitude transitions in the transmitted signal. Such rapid transitions are present in CW-PSK optical signals.

A phase modulator such as a straight waveguide lithium niobate device can also be used as a PSK modulator. In this case no bias is required. An x-cut single or an z-cut dual-drive MZ modulator may be used as a push-pull modulator. Here, the terms single and dual drive refer to the number of electrical inputs required to drive the modulator. Suitable x-cut and z-cut modulators are described in E. Wooten, "A review of lithium niobate modulators for fiber-optic communications systems", *IEEE J. Selected Topics in Quantum Electronics*, vol. 6, p. 69, January/February, 2000, which is incorporated herein to the extent necessary to understand the present invention.

Referring back to FIG. 2, data encoder 1128 accepts data from data source 1130 and differentially encodes the data. Preferably, data encoder 1128 includes an exclusive OR logic gate with a one bit delay between the two inputs. Data encoder 1128 may also include error correction coding such as forward error correction (FEC). At the receiver, data are differentially decoded using an exclusive OR gate to recover the original data. However, the differential decoder at the receiver can be eliminated by using a precoder at the transmitter. Such a precoder can be implemented by a logic AND gate with inputs from the clock and NRZ data followed by a T-flip-flop as described in the reference: M. Nakazawa et at., "Ultrahigh-speed long-distance TDM and WDM soliton transmission technologies" *IEEE Journal of Selected Topics in Quantum Electronics*, vol. 6, no. 2, March/April 2000, p. 363. Data encoder 1128 may, therefore, include a precoder, or an exclusive OR gate. The precoder adds another level of encoding at the transmitter such that the receiver does not require a decoder.

Transmitter 1000 may also include pulse shaping network 1127, which accepts a signal from data encoder 1128 and outputs electrical signal 1324, which is received by PSK modulator 1126. In the event that the transmitter does not include the pulse shaping network 1127, PSK modulator 1126 accepts an electrical signal from data encoder 1128. The pulse shaping network conditions and optimizes the shape of the electrical signal that will be received by the PSK modulator. This can include tuning the rise and fall times of the electrical pulses and suppression of unwanted oscillations or ringings of the pulse caused by parasitics and impedance mismatch. This in turns ensures the optimal PSK modulation of the optical pulse for the best transmission performance and spectral efficiency.

Preparation of a QPSK Optical Signal

Figure 8:
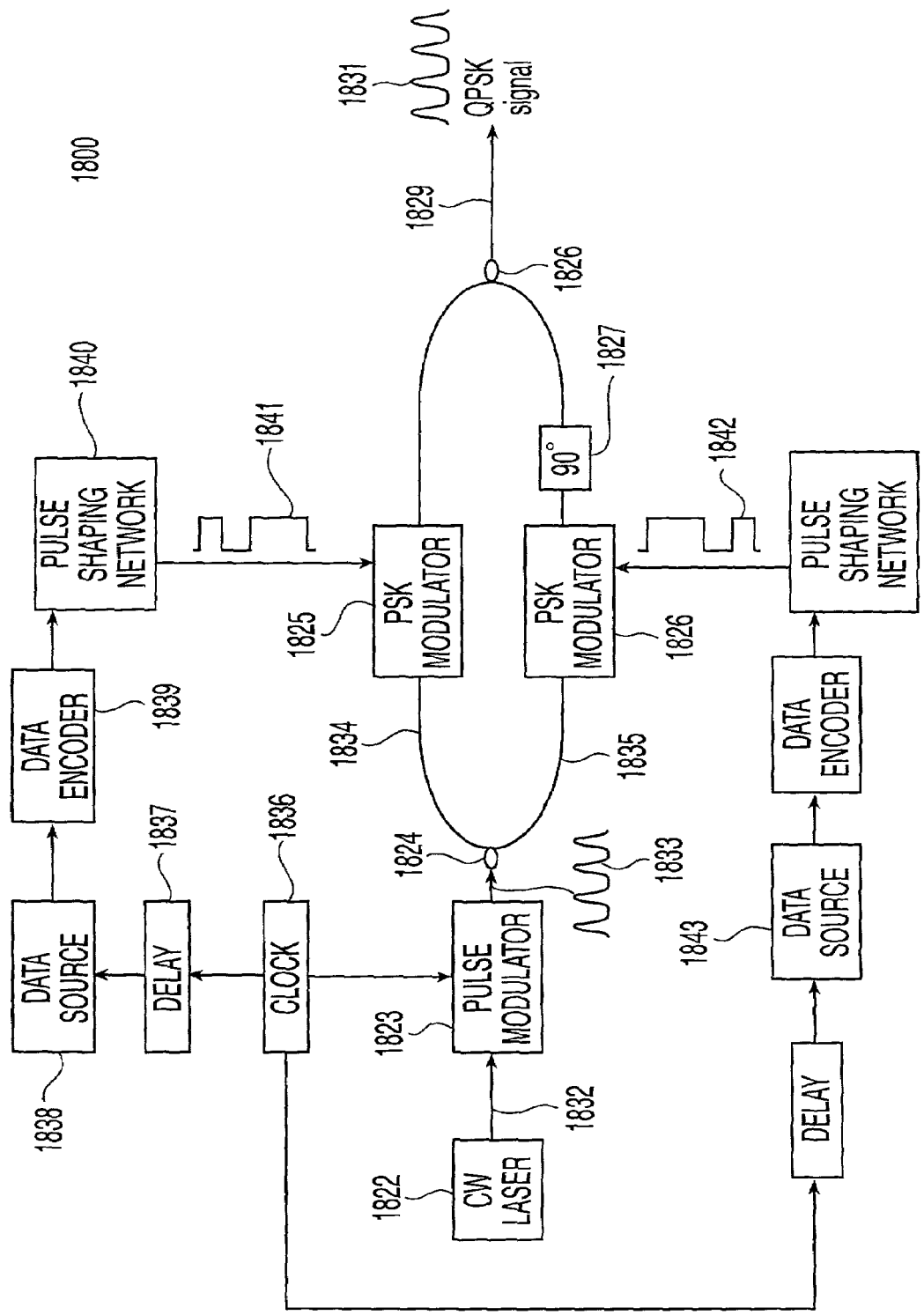
FIG. 8 shows a third embodiment of a transmitter according to the invention.

Referring to FIG. 8, a transmitter 1800 prepares a QPSK optical signal 1831 having return-to-zero pulses. A pulse modulator 1823 prepares an optical pulse stream 1833 from a CW-laser beam 1832 output by a CW laser 1822. Pulse modulator 1823 and CW laser 1822 may be identical to pulse modulator 1123 and laser 1122 discussed above. Pulse modulator 1823 is driven by a clock 1836 at a frequency preferably identical to a bit rate of data sources 1838 and 1843, as discussed below. Optical pulse stream 1833 may also be obtained directly from a pulsed laser, such as a mode-locked laser.

A 50/50 power splitter 1824 divides optical pulse stream 1833 into first and second optical pulse streams along first and second optical paths 1834 and 1835. The first and second paths include respective PSK modulators 1825 and 1826, which maybe identical to PSK modulator 1126 of transmitter 1000. Each PSK modulator prepares a BPSK optical pulse stream, which are then combined into an optical fiber 1829 using a directional coupler 1828 to thereby prepare the QPSK optical signal 1831 having return-to-zero optical pulses.

The PSK modulators 1825, 1826 are driven by respective electrical signals 1841, 1842, each of which is representative of information from a respective data source 1838, 1843. For example, PSK modulator 1825 operates as follows. Data source 1838 is driven at a bit rate by a clock signal from clock 1836. The clock signal may be delayed by a delay 1837. Data from the data source 1838 is accepted by a data encoder 1839 and optional pulse shaping network 1840 to prepare electrical signal 1841 for driving PSK modulator 1825. Data encoder 1839 and optional pulse shaping network 1840 may be identical to data encoder 1128 and pulse shaping network 1127 discussed above. Electrical signal 1841 causes PSK modulator 1825 to encode information from data source 1838 onto the phases of pulses of the optical pulse stream of first path 1834.

Information from a data source 1843 is encoded by PSK modulator 1826 onto the phases of pulses of the second optical pulse stream, which propagates along second path 1835. One of the optical paths includes a phase shifting device, such as a phase modulator 1827, to produce a 90° relative optical phase shift between the two BPSK signals output by PSK modulators 1825, 1826. Upon combination by combiner 1828 the QPSK optical signal is accepted by optical fiber 1829 for transmission via an optical fiber network to a remote receiver.

An alternative method for preparing a QPSK signal having return-to-zero pulses is to produce an optical beam with a four-level relative phase shift of 0°, 90°, 180°, and 270°. The four phase shift states represent the four possible combinations of bit sequences: 00, 01, 10, and 11 for the two binary information channels. This can be achieved with a phase modulator driven by a four-level or a quaternary signal with a range of $3V_\pi/2$ and a step size of $V_\pi/2$.

Comparing PSK optical pulse streams of the invention with an optical signal output by conventional PSK modulation of a CW laser beam it is found that the latter suffers from excessive frequency chirping due to rapid optical phase transitions. The rapid optical phase transitions can lead to spectral spreading, unacceptable inter-channel interference, and increased dispersion penalties. For a PSK pulse stream of the invention, the phase transitions preferably occur when the optical field is minimal and hence the transition-induced amplitude and phase modulation is negligible. The optical carrier of the PSK pulse stream is suppressed. The SBS and FWM effects are, therefore, also reduced. The preferred PSK pulse signal is tolerant to fiber nonlinearities compared with conventional on-off keying (OOK) as described in the next section.

Preparation of an Optical Signal Comprising Chirped RZ Optical Pulses

Figure 4:
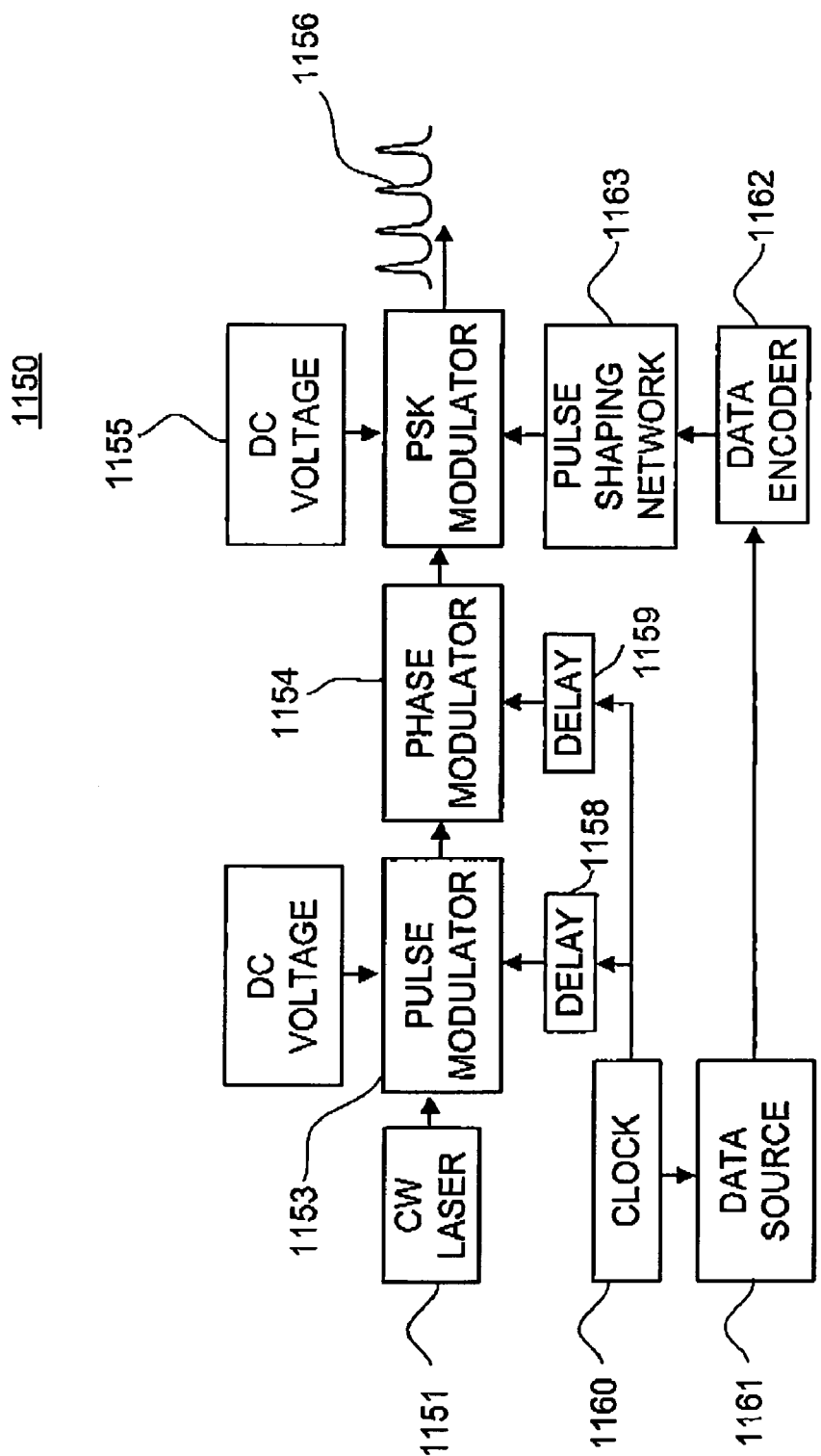
FIG. 4 shows a second embodiment of an optical transmitter according to the invention.

Referring to FIG. 4, a transmitter 1150 transmits an optical signal 1156 comprising chirped return-to-zero pulses, which may enhance transmission performance in certain fiber optic networks, such as submarine transmission systems. A suitable system for preparing an optical pulse stream comprising chirped pulses is described in U.S. Pat. No. 5,946,119, which is hereby incorporated by reference to the extent necessary to understand the present invention. A CW-laser 1151 outputs a CW laser beam, which is accepted by pulse modulator 1153, which may be identical to pulse modulator 1123. Pulse modulator 1153 outputs an amplitude modulated optical pulse stream that is accepted by a phase modulator 1154, which is preferably a lithium niobate electro-optic modulator with a straight waveguide. Phase modulator 1154 outputs an optical pulse stream comprising chirped RZ pulses.

Pulse modulator 1153 and phase modulator 1154 are driven by a preferably sinusoidal signal from a clock 1160. Variable delays 1158 and 1159 allow the relative synchronization between pulse modulator 1153 and phase modulator 1154 to be varied. The amount of chirp of the RZ pulses output by phase modulator 1154 is determined by the amplitude of the driving clock signal as well as the relative timing between the RZ pulse at the phase modulator and the applied clock signal. The pulse stream output by phase modulator 1154 is accepted by a PSK modulator 1155, which further phase modulates pulses of the pulse stream to prepare pulse stream 1156. PSK modulator is driven by a pulse shaping network 1163 and data encoder 1162, as discussed above for PSK modulator 1126. Optical signal 1156 is transmitted to an optical fiber of a fiber optic network for reception by a remote receiver.

Preparation of Multiplexed Optical Signals Comprising PSK RZ Pulses

DWDM Optical Signals

Figure 9:
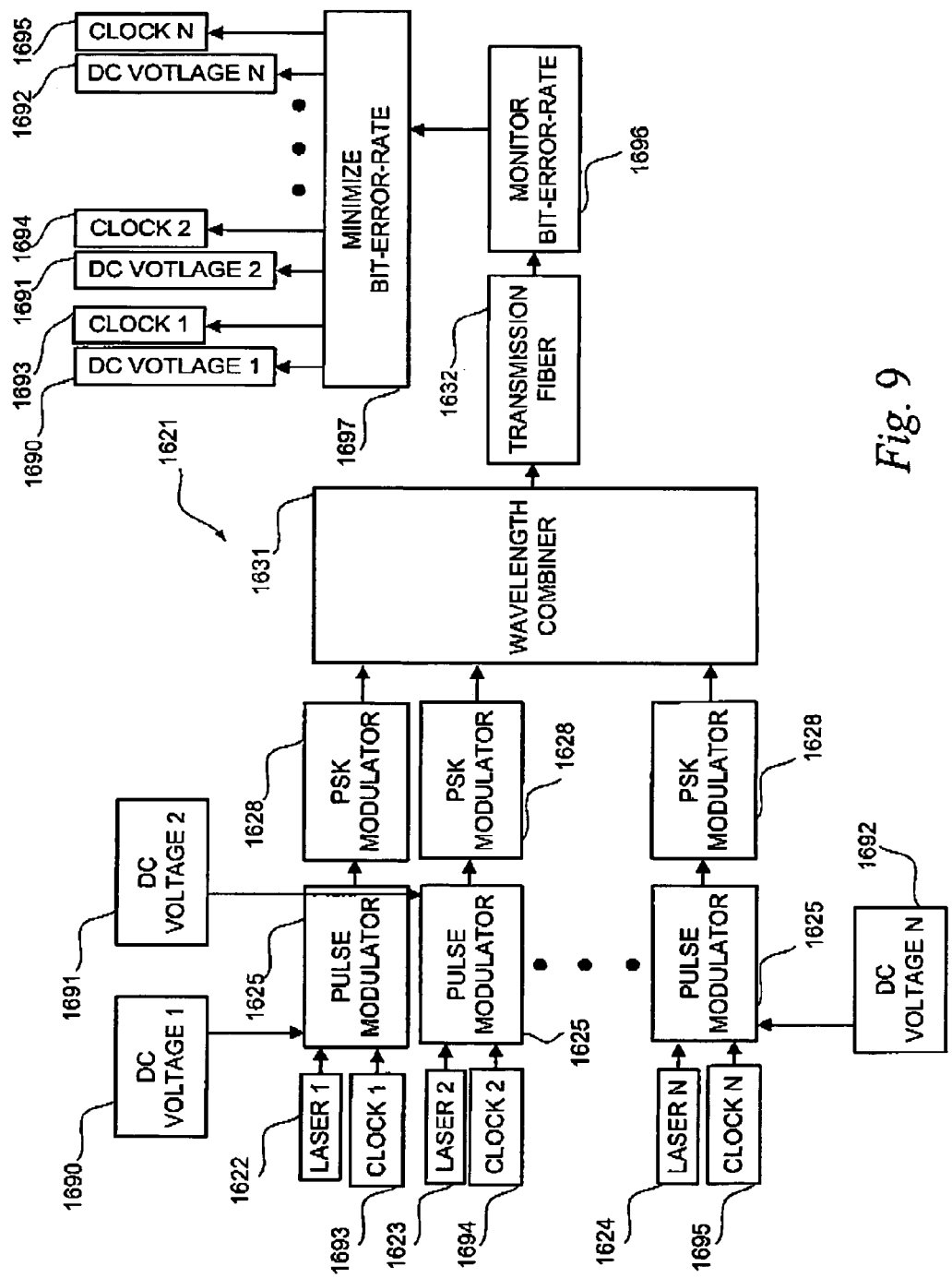
FIG. 9 shows a DWDM transmitter for generating N channels of PSK modulated optical pulse streams according to the invention.

Referring to FIG. 9, a transmitter 1621 combines a plurality of PSK optical pulse streams, each having a different wavelength, to prepare a DWDM optical signal. Transmitter 1621 includes a plurality of pulse generators and PSK modulators having features identical to pulse generator 1001 and PSK modulator 1002, discussed above. Each pulse generator-PSK modulator of transmitter 1621 is associated with an electronics package including data source identical to electronics package 1003. Pulse generators of transmitter 1621 preferably include a laser and a pulse modulator 1625. Lasers 1622, 1623, and 1624 output CW-laser beams at first, second, and third wavelengths, respectively, to allow PSK pulse streams prepared from the beams to be separated at a receiver. Transmitter 1621 includes a number N lasers, such as at least about 12, 16, 32, or more lasers. Pulse modulators 1625 prepare optical pulse streams from each CW laser beam as described above. Optical pulse streams from pulse modulators 1625 are accepted by respective PSK modulators, which encode information from a respective data source, as discussed above.

The PSK modulators of transmitter 1621 output a respective PSK modulated pulse stream or channel, which are accepted by a wavelength combiner, which is preferably a wavelength division multiplexer 1631, to thereby prepare a DWDM optical signal. The DWDM optical signal output by transmitter 1621 is accepted by an optical fiber 1632, which is preferably a fiber of a fiber optic network for transmission of the DWDM signal to a remote receiver. The bit-error-rate of the DWDM signals at the remote receiver are monitored 1698, for example, via a bit-error-rate detector. The dc bias voltages 1690–1692 and clock drive voltages 1693–1695 to the pulse modulators 1625 are selected to minimize the bit-error-rate 1697 of the DWDM signals monitored at the remote receiver 1696 after the transmission fiber 1632.

Figure 10:
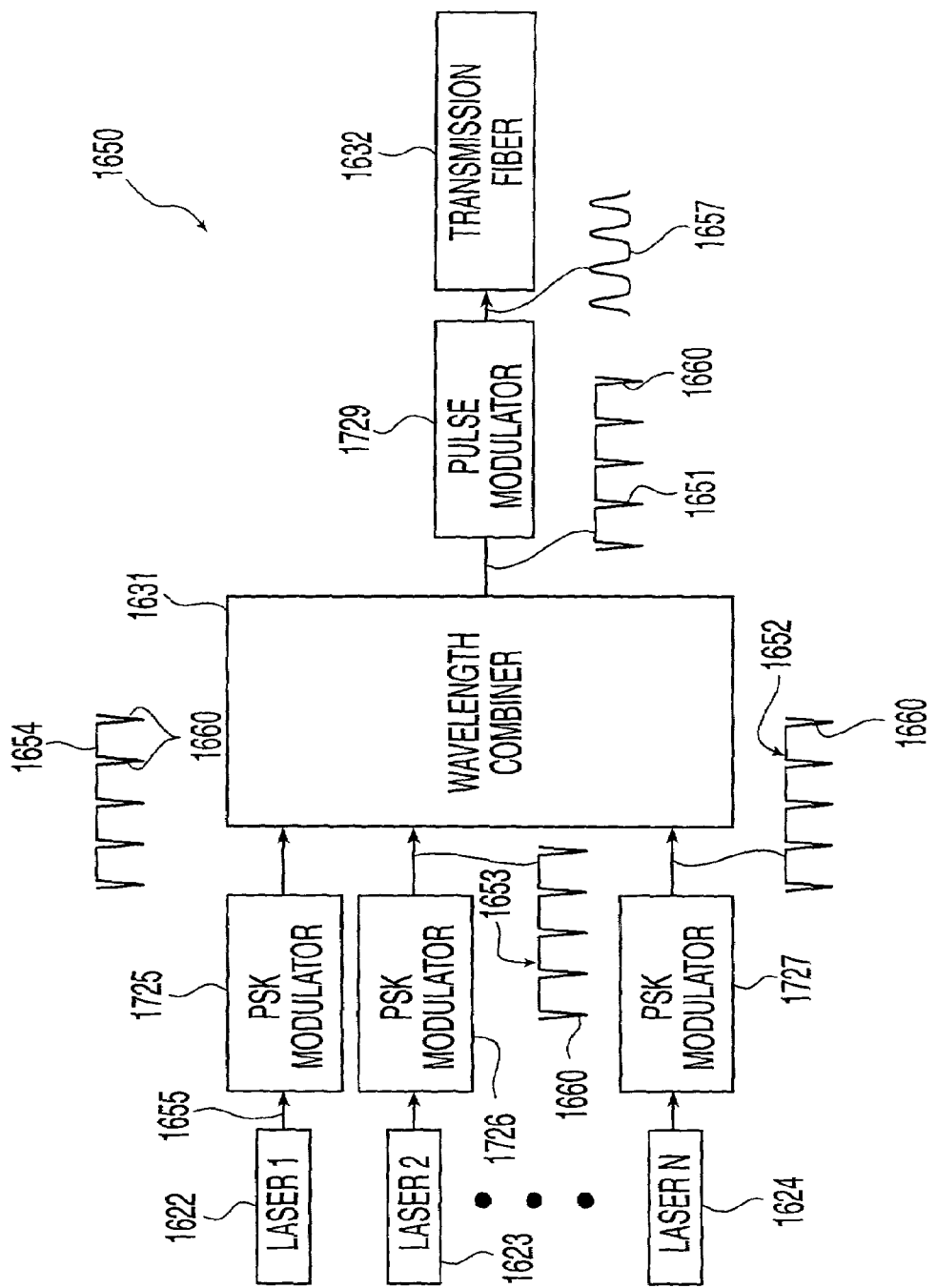
FIG. 10 shows a DWDM transmitter for generating N channels of PSK modulated optical pulse streams using a single RZ pulse modulator according to the invention.

Referring to FIG. 10, a transmitter 1650 includes a single pulse modulator 1729 to amplitude modulate a CW-PSK DWDM optical signal 1651 comprising a plurality of CW-PSK modulated optical data streams 1652, 1653, and 1654. Amplitude modulation of CW-PSK DWDM optical signal 1651 prepares a PSK-DWDM optical signal 1657, which comprises return-to-zero optical pulses. Optical signal 1657 is accepted by an optical fiber 1632, which is preferably a fiber of a fiber optic network for transmission of the optical signal to a remote receiver.

Transmitter 1650 includes a number N lasers 1622, 1623, and 1624, such as at least about 12, 16, 32, or more lasers. Each PSK modulated data stream is prepared from a respective laser as described below. Each laser outputs a laser beam having a different wavelength to allow the PSK modulated data streams to be separated from the DWDM optical signal 1651 by a receiver.

Each optical data stream 1652–1654 is prepared by phase modulation of a preferably CW laser beam output by a respective laser. For example, a PSK modulator 1725 accepts a laser beam 1655 from a laser 1622. PSK modulator 1725 encodes data received from a data source (not shown) onto the phase of laser beam 1655 to thereby prepare CW-PSK modulated data stream 1654 including rapid phase transitions 1660. In an identical fashion, PSK modulators 1726 and 1727 prepare CW-PSK optical data streams. Each data stream can be referred to as a channel.

Once prepared, the CW-PSK modulated data streams are combined using a wavelength combiner 1631 to prepare CW-PSK DWDM optical signal 1651, which also includes rapid phase transitions 1660. Pulse modulator 1729 modulates the amplitude of CW-PSK DWDM optical signal 1651 to thereby prepare optical signal 1657 having return-to-zero optical pulses. Preferably, pulse modulator 1729 reduces the optical intensity associated with rapid phase transitions 1660 present in CW-PSK DWDM optical signal 1651.

Pulse modulator 1729 is preferably constructed of a material having a broad wavelength response. A preferred modulator is formed of lithium niobate modulator. Wavelength combiner 1631 may be a polarization maintaining wavelength combiner if the following pulse modulator is sensitive to the polarization state of the CW-PSK DWDM optical signal output by the combiner.

The timing alignment between the PSK signal and the optical pulse can be controlled by electronic delays for each PSK channel accordingly to maximize the output optical power. The optical power of individual channel can be conveniently adjusted by controlling the drive voltage of the NRZ signal to the PSK modulator. This is useful for dynamic channel power equalization for optical amplifier gain control or channel power pre-emphasis in some cases.

Transmitter 1650 reduces the number of amplitude modulators from N, as preferred for transmitter 1621, to only 1. Including both amplitude and phase modulators, transmitter 1650 uses only N+1 compared to the 2N modulators of transmitter 1621.

Polarization interleaving of odd and even groups of wavelength channels can also be implemented. Suitable polarization interleaving techniques are described in D. Le Guen et al., "25 GHz spacing DWDM soilton transmission over 2000 km of SMF with 25 dB/span", Proc. $27^{th}$ ECOC 2001, Amsterdam, paper We.F.1.5, p. 244, which is incorporated herein to the extent necessary to understand the present invention. This can be achieved with a polarization beam combiner to multiplex the odd and even wavelength channels groups into a single fiber. Each PSK wavelength channel requires a pulse modulator and a PSK modulator so that N channels will require a total of 2N modulators.

Time Division Multiplexed Optical Signals

In one embodiment of the invention, a plurality of PSK optical pulse streams are combined to prepare an optical time division multiplexed (OTDM) optical signal. The duty cycle for the pulses of each optical pulse stream is preferably less than about 50% or 1/(2N) where N is the number of channels to be time-multiplexed. Suitable OTDM systems are discussed in co-pending application Ser. No. 09/962,339 filed Sep. 26, 2001, which application is incorporated herein.

Figure 11:
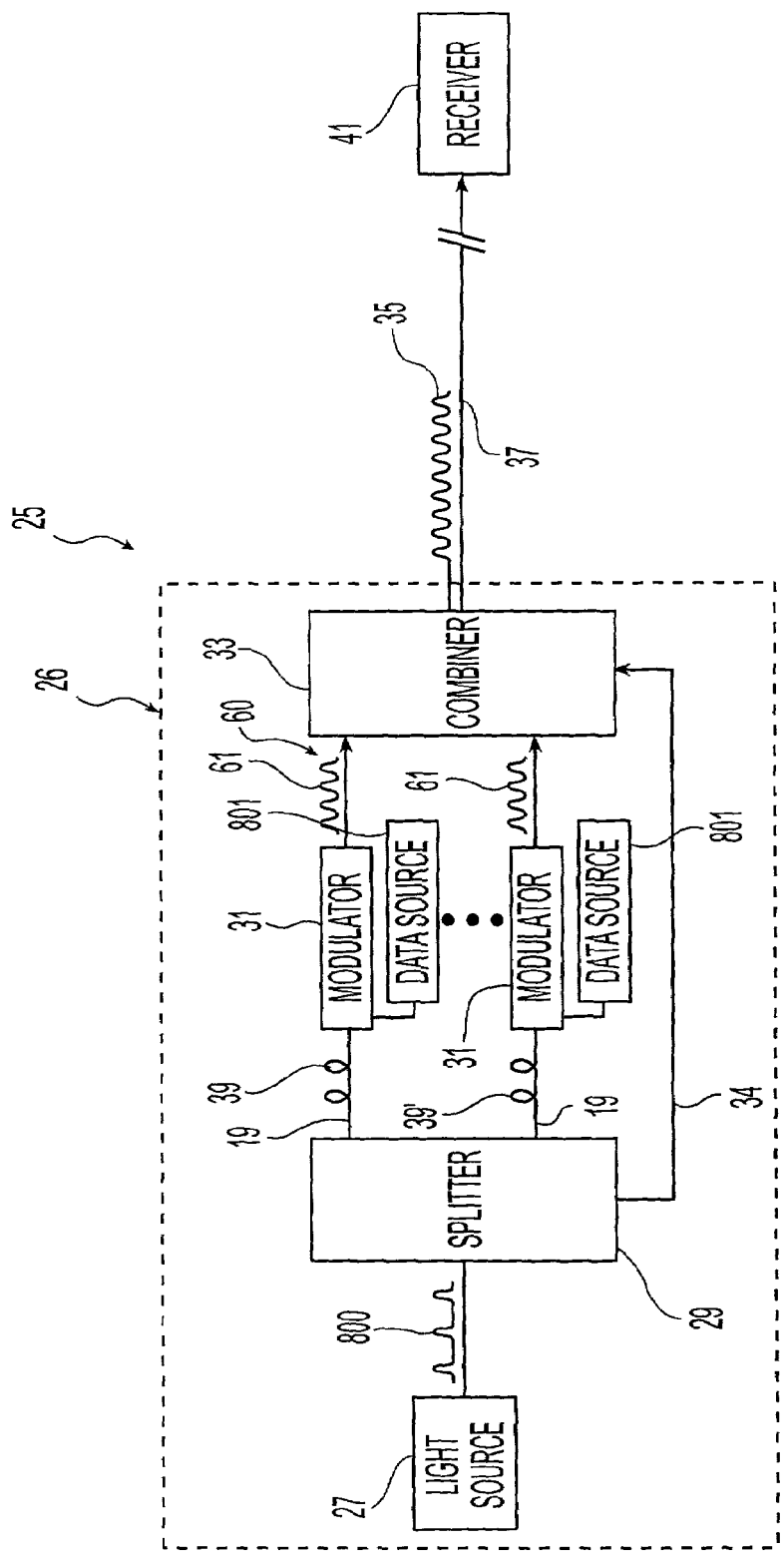
FIG. 11 is a schematic of an optical communication system of the present invention.

Referring to FIG. 11, a system 25 transmits and receives an OTDM optical signal 35 comprising a plurality of PSK optical pulse streams 60. Each PSK optical pulse stream comprises a plurality of return-to-zero optical pulses. As discussed below, a phase of pulses 61 of PSK optical pulse streams 60 encode information from a respective data source 801. A transmitter 26 of system 25 includes a light source 27, which outputs an optical pulse stream 800 formed of optical pulses. Pulses of pulse stream 800, as output by light source 27, are preferably not phase modulated to encode data from a data source. An optical splitter 29 splits the light source output into a plurality of channels 19. Each channel carries an optical pulse stream, which preferably has pulses of substantially the same shape and spacing as the optical pulse stream 800. Each of a plurality of modulators 31 receives a respective one of the optical pulse streams output by splitter 29. Modulators 31 modulate a phase of respective pulses of each optical pulse stream to represent information carried by a respective data source 801. Modulators 31 are phase modulators and may be identical to PSK modulator 1126 discussed above.

To encode information for transmission in optical time division multiplexed signals suitable for use with the present invention, the phase of pulses of the invention are preferably modulated by modulators 31. Phase shift keyed (PSK) encoding is implemented by modulating the phase of pulses in a pulse stream. As discussed above for PSK modulator 1126, phase modulation can be performed by, for example, using an electro-optic phase modulator to modulate the phase of different pulses. In a PSK signal, logic values of 1 are encoded by pulses having a first phase state, such as 0, and logic values of 0 are encoded by pulses having a second, relatively different phase state, such as 180°.

Differential phase shift keyed (DPSK) encoding is a variation of PSK in which, the information is encoded in such a way that 1 corresponds to the change of phase between the current bit and the previous bit. The change of phase state gives logical 1, while 0 corresponds to no change of state. The comparison is performed in the electrical signal domain.

In quarternary phase shift keying (QPSK), each pulse has one of four phases, with each phase being separated by 90°. The four states can be described, for example, as 0°, 90°, 180°, and 270°, or as 45°, 135°, 225°, and 315°.

An optical pulse stream output by splitter 29 and carried by a channel 34 is preferably not modulated or delayed with respect to the optical pulse streams of the other channels. The non-modulated channel 34 provides a framing pulse stream, as discussed below. The modulated pulse streams and the framing pulse stream are received by a combiner 33.

Combiner 33 combines the PSK optical pulse streams and the framing pulse stream to form an OTDM signal 35. OTDM signal 35 is preferably transmitted, such as by at least one fiber optic cable 37 into an optical network, as understood in the art. Receiver 41 recovers information from the transmitted signal, as discussed below. System 25 can also include other elements, such as, for example, couplers, isolators, add/drop elements, amplifiers, regenerators, and the like.

Light source 27 generates periodic stream 800 of optical pulses spaced apart by a period T of about 50 to about 500 ps. The pulse width is less than about 25 ps, preferably less than about 5 ps, and most preferably less than about 3 ps. In one embodiment, the pulse width is less than about 1 ps. The light source is preferably a laser, such as a mode locked semiconductor laser or mode locked fiber laser. Examples of suitable light sources include actively-mode-locked fiber lasers, such as those of the UOC and UOC-E Series of Ultrafast Optical Clocks manufactured by PriTel, Inc., Naperville, Ill., USA. An alternative light source may be provided by a CW laser and pulse modulator as discussed above.

Figure 12:
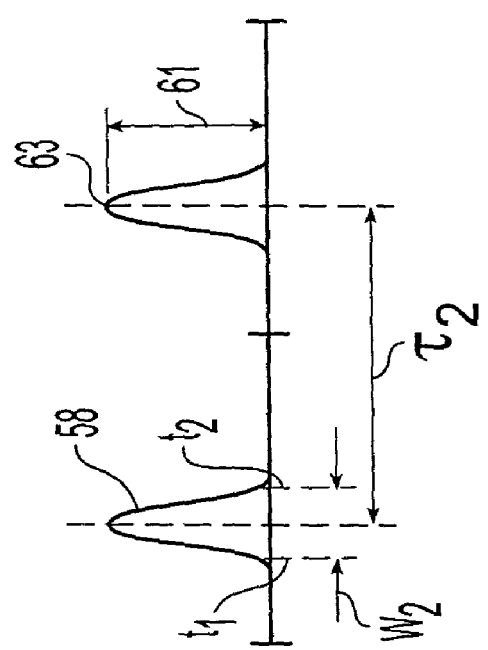
FIG. 12 shows an example of pulse configuration suitable for use with the present invention.

Referring to FIG. 12, a non-limiting example of an amplitude-time plot of a pulse type suitable for use with the present invention is shown. Return-to-zero (RZ) pulses 58 have a width $w_2$, which is significantly narrower than a bit period $\tau_2$. Width $w_2$ of pulses 58 can be measured between $1/e^2$ points $t_1$, $t_2$, which are the points at which a pulse amplitude falls to about 13% of a maximum pulse amplitude (A). Width $w_2$ of pulses 58 is less than about 50%, preferably less than about 20%, and most preferably less than about 10% of the bit period $\tau_2$.

Pre-chirping of the PSK pulse WDM/TDM channels before fiber launch can be employed to enhance the transmission performance for some cases. This can be achieved by using phase modulators or a length of fiber with a pre-determined dispersion profile.

Fiber Transmission Link

The present invention has several advantages over conventional high-bit rate systems, which suffer signal distortion caused by fiber nonlinearities, inter-channel cross-phase modulation (XPM) effects in DWDM systems, and intra-channel four-wave mixing (FWM) in both WDM and TDM systems. For example, degradation of the conventional on-off keying system performance due to the XPM occurs because of the pulse-pattern effect. That is, signal pulses in different bits of a target channel experience nonlinear refractive index changes caused by signal pulses present in the adjacent channels. Because of the dispersion, different channels propagate with different velocities. Thus, signal pulses in the target channel collide with signal pulses in the adjacent channels. In the on-off key modulation format, the logical 1 corresponds to a signal pulse whereas the logical 0 corresponds to an empty space. Consequently, different signals in the target channel experience different number of collisions depending on how many pulses they pass through. As a result, XPM-induced degradation varies from pulse to pulse and is an inherent drawback of the on-off key modulation format. On-off key RZ modulation formats also suffer from the pulse-pattern effects.

According to the present invention, PSK modulated optical pulse streams comprising return-to-zero optical pulses are used as the bit carriers. Thus, the data are encoded by phase shift keying of pulses instead of on-off keying of pulses. XPM-induced pulse-pattern effects are substantially reduced because all the pulses in the target channel experience essentially the same number of collisions with pulses in adjacent channels. Additionally, the effect of SPM distortions are also reduced in the present modulation format.

Furthermore, by using the present modulation format, intra-channel four-wave mixing is also reduced as the number of overlapping pulses, that occurs due to the dispersive spreading, is preferably at least about 50% less as compared to an OOK pulse stream because about half of the pulses will be in-phase and another half will be in counter-phase. Thus, the present modulation, which combines RZ modulation with the phase shift keying encoded data is advantageous with respect to the fiber nonlinearity.

Demodulating Optical Signals Comprising PSK RZ Optical Pulses

In order retrieve the binary information from the transmitted PSK optical signal, a demodulation step preferably converts the optical phase coded signal into amplitude information before the resulting amplitude modulated signal is detected using a square-law detector, such as a photo-diode.

Figures 13A, 13B:
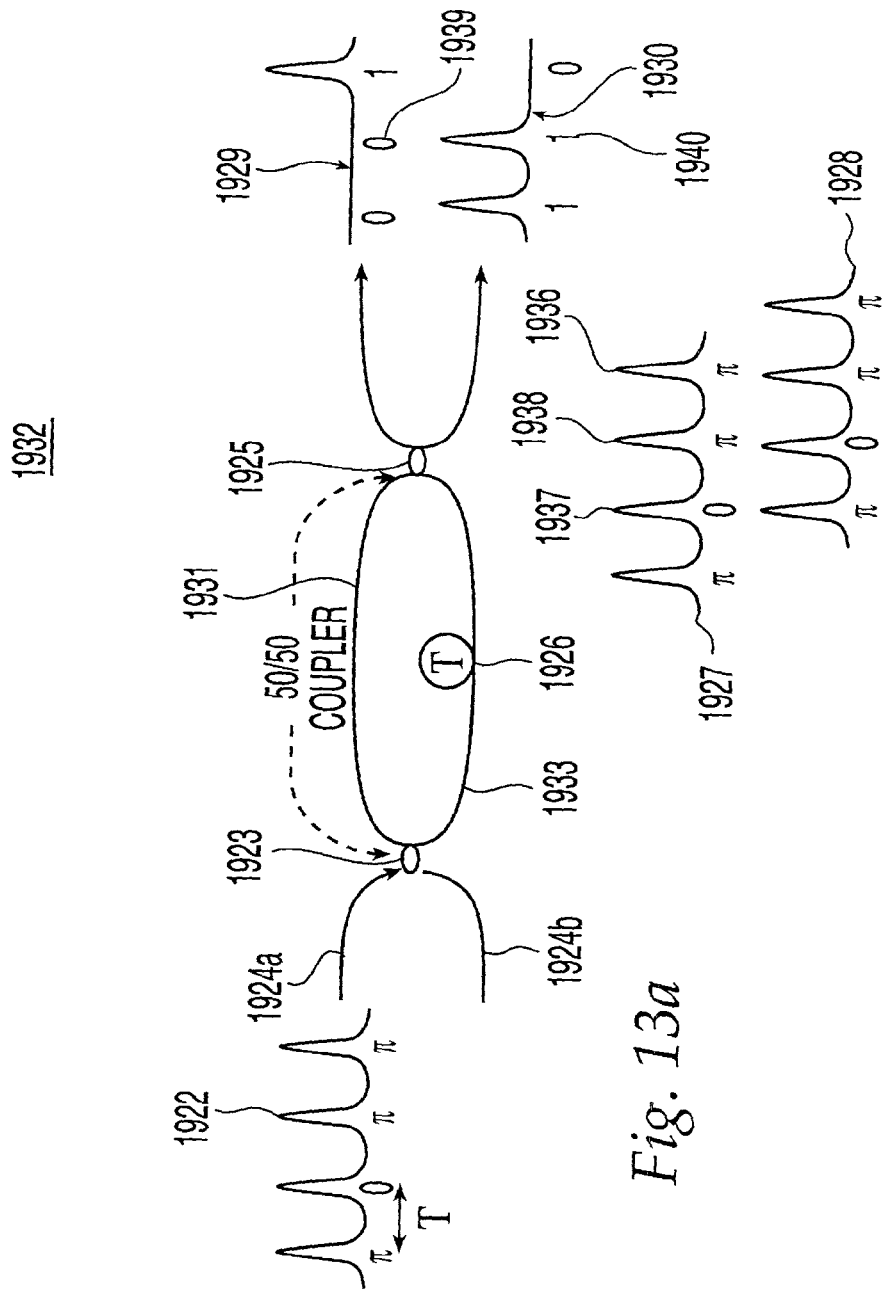

Referring to FIG. 13, a transmitted PSK signal 1922 is demodulated using an asymmetric Mach-Zehnder (AMZ) interferometer 1932 having a differential delay 1926 of one bit period T. AMZ 1932 may accept an optical signal at either of two inputs 1924a and 1924b. The AMZ 1932 includes two cascaded 50/50 directional couplers 1923, 1925 and two optical paths 1931, 1933. An optical pulse stream received at either input 1924a or input 1924b is split along optical paths 1931, 1933. Light propagating along optical path 1933 experiences a differential path length of $c \times \Delta\tau/n$ where c is the speed of light, n is the refractive index of the optical waveguide and $\Delta\tau$ is the differential delay, which is an integer multiple of the bit period T of the PSK signal. For example, given a differential delay time $\Delta\tau = T$ for a bit rate of 12.5 Gb/s in silica waveguide, the differential path length may be about 1.6 cm. This assumes a refractive index n of 1.5. The coupling ratio of the two couplers 1923, 1925 is preferably 50%. Because of the differential nature of the AMZ, the PSK signal is may be referred to as differential PSK (DPSK).

A delayed self-homodyne method of the invention uses the AMZ 1932 interferometer to convert the encoded phase information into amplitude information. The PSK optical pulse stream 1922 is launched into AMZ 1932, which splits the optical pulse stream into first and second optical pulse streams propagating within a respective arm 1931 and 1933 of AMZ 1932. One of the arms is configured to impart a relative delay of T=1/B, where B is the pulse stream repetition rate, to an optical pulse stream propagating therein. Thus, optical pulse streams accepted by direction coupler 1925 are offset by one bit period. For example, a pulse stream 1927 represents the optical pulse stream accepted by directional coupler 1925 from arm 1931. A pulse stream 1928 represents the optical pulse stream accepted by directional coupler 1925 from arm 1933. The relative phases of pulses of optical pulse streams 1927, 1928 are shown in FIG. 13. For example, a pulse 1936 has a relative phase of $\pi$ compared to a pulse 1937, which has a relative phase of 0.

For an ideal AMZ device with balanced optical path losses and perfect 50/50 couplers, the optical fields at the two outputs of the AMZ can be expressed as: $e^{i\phi}(E_i(t)+E_i(t+T)e^{i\Delta\phi})/2$ and $e^{i\phi}(E_i(t)-E_i(t+T)e^{i\Delta\phi})/(2i)$ where $E_i$ is the input optical field of the PSK signal, T is the differential time delay and corresponds to one pulse period, $\Delta\phi$ is the relative phase shift between the two arms of the AMZ, and $\phi$ is the phase shift of the optical field in one of the AMZ arms. AMZ 1932 will, therefore, provide two complementary outputs 1929, 1930.

The differential phase shift $\Delta\phi$ is preferably set to 0 or $\pi$ to achieve maximum contrast ratio of the signal at the output. This is achieved by tuning the center of the peak or trough of the transmission response of the AMZ to match the center wavelength of the PSK signal. The tuning can be performed by varying the refractive index of the AMZ through, for example, temperature control.

The AMZ device has a sinusoidal spectral response with a free spectral range (FSR) equal to the inverse of the differential delay. The spectral transmission peak or trough of the AMZ is preferably aligned to the center wavelength of the PSK pulse signal to within 10% of the pulse rate to maximize the conversion efficiency or eye opening. For example, the center wavelength of a 12.5 Gb/s binary PSK pulse signal should be aligned to the center of the peak or trough of the AMZ transmission response to within 1.25 GHz. The AMZ can be a passive fiber-based device or a silica planar lightwave circuit (PLC) type device. A suitable fiber-based AMZ device is available from ITF Optical Technologies. A suitable silica PLC based device is available from NEL.

Because directional coupler 1925 accepts optical pulse streams offset by one bit period, the optical outputs 1929, 1930 of AMZ 1932 depends on the optical phase of the neighboring pulses. Considering optical output 1929, for example, out-of-phase neighboring pulses, such as pulses 1937, 1938 produce a zero output 1939 because of destructive interference. Because optical outputs 1929, 1930 are complementary, zero output 1939 corresponds to a maximum output 1940 of optical output 1930. Referring back to optical output 1929, maximum output is achieved with in-phase neighboring pulses 1936, 1938 because of constructive interference. A square law detector, such as a photo-diode can be connected to either one of the AMZ outputs 1929, 1930 to detect the amplitude-modulated optical signals. It should be noted that if optical signal 1922 had been accepted by input 1924b rather than input 1924a, the complementarity of outputs 1929 and 1930 would be reversed.

As an alternative to a single photodiode connected to one of the outputs 1929, 1930, a pair of balanced photodetectors may be connected to the two outputs. The differential output of the balanced photodetectors produce positive and negative electrical pulses that represents the two binary states. The decision level can then be set at the zero level to distinguish the two transmitted binary states. A balanced photodetector accepting the output of an AMZ is described in U.S. Pat. No. 5,319,438, which is incorporated herein by reference to the extent necessary to understand the present invention.

Decoding of BPSK Optical Signals Having RZ Pulses

Figure 14:
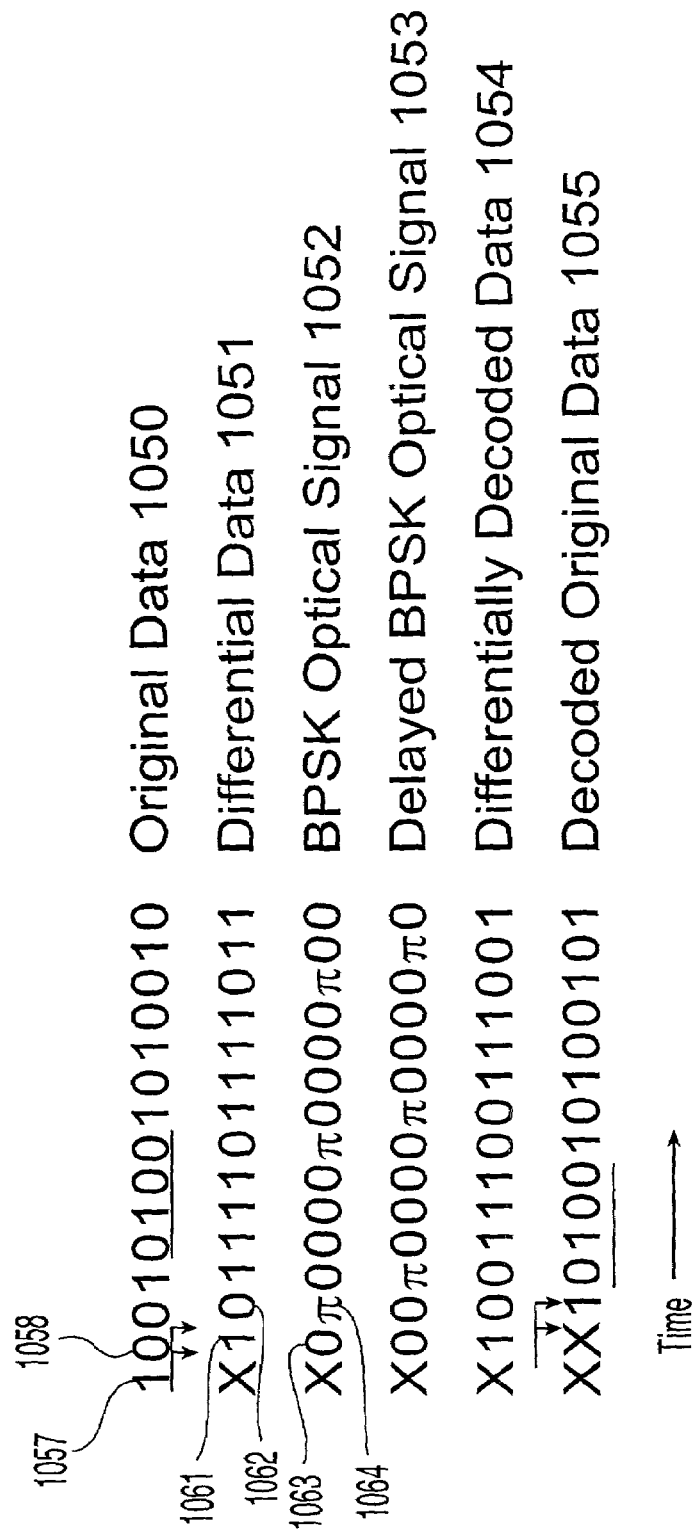
FIG. 14 illustrates differential encoding/decoding PSK optical pulse streams and self-homodyne demodulation of PSK optical pulse streams according to the invention.

Referring to FIG. 14, data encoding and decoding operations are shown. Encoding takes place at the transmitter. Original data 1050 is differentially encoded as a differential data 1051. For example, logic values at bit periods 1057 and 1058 of original data 1050 are encoded as logical 1 and 0, respectively, at bit periods 1061 and 1062 of differentially encoded data 1051. A BPSK optical signal 1052 is prepared by phase encoding logic values of differentially encoded data 1051. For example, logic values from bit periods 1061 and 1062 may be encoded as pulses having a relative phase of 0 and π, respectively, of bit periods 1063 and 1064. The BPSK optical signal 1052, which comprises return-to-zero optical pulses, is transmitted within a fiber optic network to a remote receiver.

Decoding takes place at the receiver. For example, upon self homodyne detection, such as by using AMZ 1932, the BPSK optical signal 1052 is split and compared to a delayed BPSK optical signal1053, which is delayed in time by one bit period T from BPSK optical signal 1052. Direct detection of the optical BPSK optical signal 1052 and delayed BPSK optical signal 1053 provides differentially decoded data 1054, which is a binary electrical signal. Decoded original data 1050, which is also an electrical signal, is prepared from differentially decoded data 1054 using a differential decoder. For example, the differential decoder may be implemented using an exclusive OR logic gate (XOR) with a one bit period time delay between the two inputs. An example of a differential coding rule can be expressed as follows: 00 or 11 at the input are coded as 0, and 01 or 10 at the input are coded as 1.

Electronic clock recovery can be performed as well. As described earlier in the transmitter section the differential decoder at the receiver may be eliminated if a precoder is implemented at the transmitter.

Decoding of QPSK Optical Signals Comprising RZ Pulses

Figure 15:
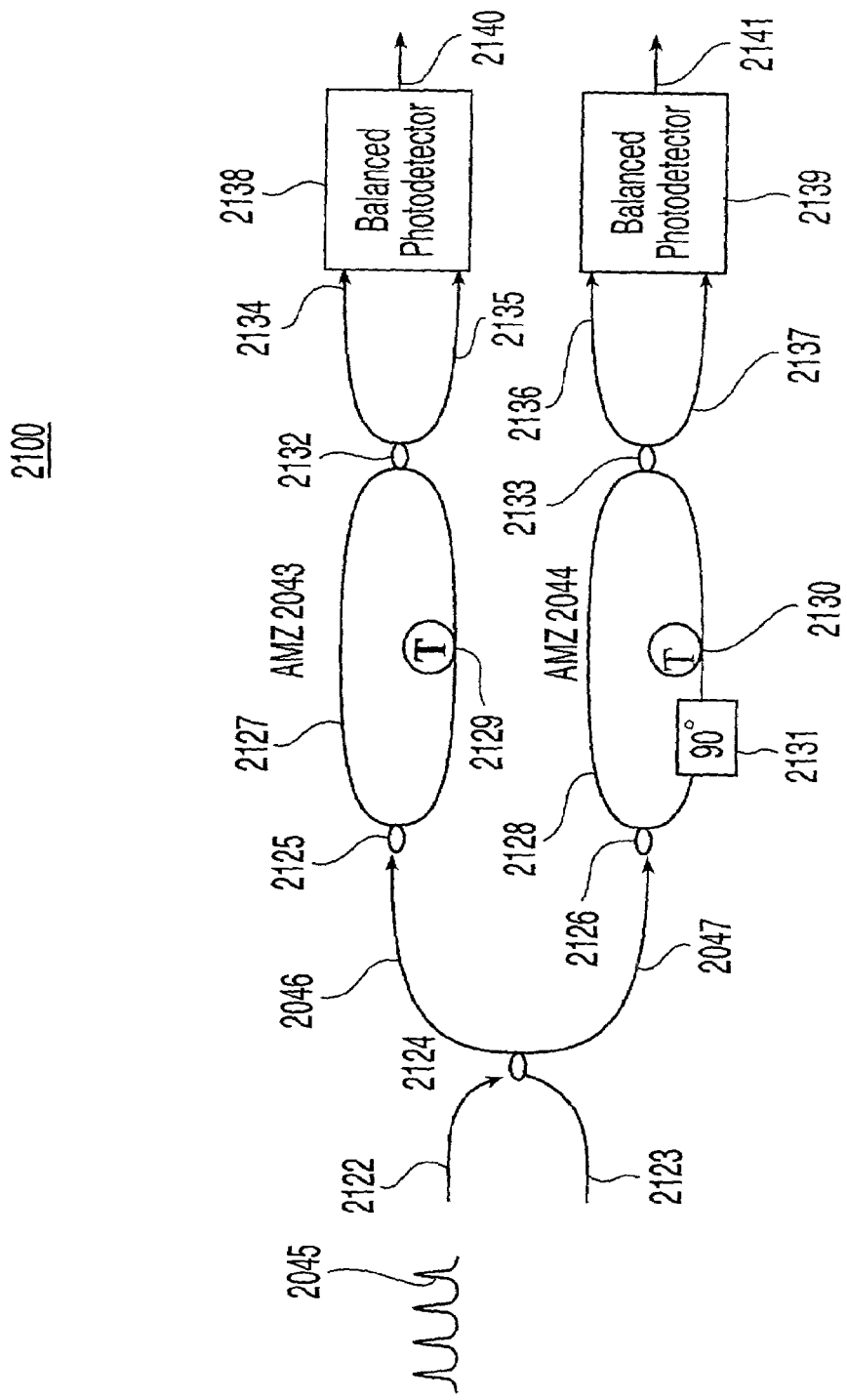
FIG. 15 shows a QPSK demodulator according to the invention.

Referring to FIG. 15, a demodulator 2100 for demodulation of QPSK signals includes first and second AMZ interferometers 2043, 2044. An incoming QPSK signal 2045 accepted by one of input channels 2122 or 2123 and divided into first and second paths 2046, 2047 paths by a 50/50 power splitter (directional coupler) 2124. The QPSK signals of the first and second paths are launched to a respective one of AMZ interferometers 2043, 2044. One of the AMZ interferometers, for example, AMZ 2044, maybe identical to AMZ interferometer 1932. AMZ interferometer 2044 includes a phase shift element 2131, such as a phase modulator, in one of its arms to produce a relative phase shift of 90° in the optical signal propagating through that arm. AMZ interferometer 2043 is identical to AMZ interferometer 1932 except that AMZ interferometer 2043 preferably does not have the phase shift element.

The outputs of the AMZ are connected to a respective balanced photo-detector 2138, 2139. The two balanced photo-detectors produce positive and negative electrical pulses that can be used to determine the states of the transmitted QPSK signal. The advantage of this configuration is that the two AMZ devices are completely independent and can be controlled separately. The demodulator can be constructed using all-fiber based components such as fiber fused couplers and fiber AMZ devices available from ITF Optical. The AMZ device can be stabilized and tuned via temperature control.

Decoding of OTDM Optical Signals Comprising RZ PSK Optical Pulses

Returning to FIG. 11, receiver 41 of system 25 recovers data from the information carrying optical pulse streams. The recovered information is preferably expressed as an electrical signal. To recover information from a particular optical pulse stream, receiver 41 operates to perform an AND operation between the optical pulse stream and a second optical pulse stream, which is preferably the framing pulse stream 34. In performing the AND operation, the information-carrying optical pulse stream is simultaneously demodulated to obtain the information carried thereby. Thus, the receiver of the present invention does not require a separate device to demodulate information from the optical pulse stream. Preferably, the AND operation and demodulation are performed simultaneously by coherent detection.

The receiver 41 is configured to receive optical time division multiplexed (OTDM) signals. The OTDM signal preferably includes at least one optical pulse stream, which operates as a framing pulse stream. The framing pulses preferably have an optical property, such as an amplitude, phase, or polarization, that allows the framing pulses to be distinguished or isolated from the other pulses. For example, in one embodiment, the amplitude of the framing pulses exceeds that of the other optical pulses by an amount sufficient to allow the framing pulses to be distinguished by performing a threshold operation. The framing pulses are preferably unmodulated.

Figure 16A:
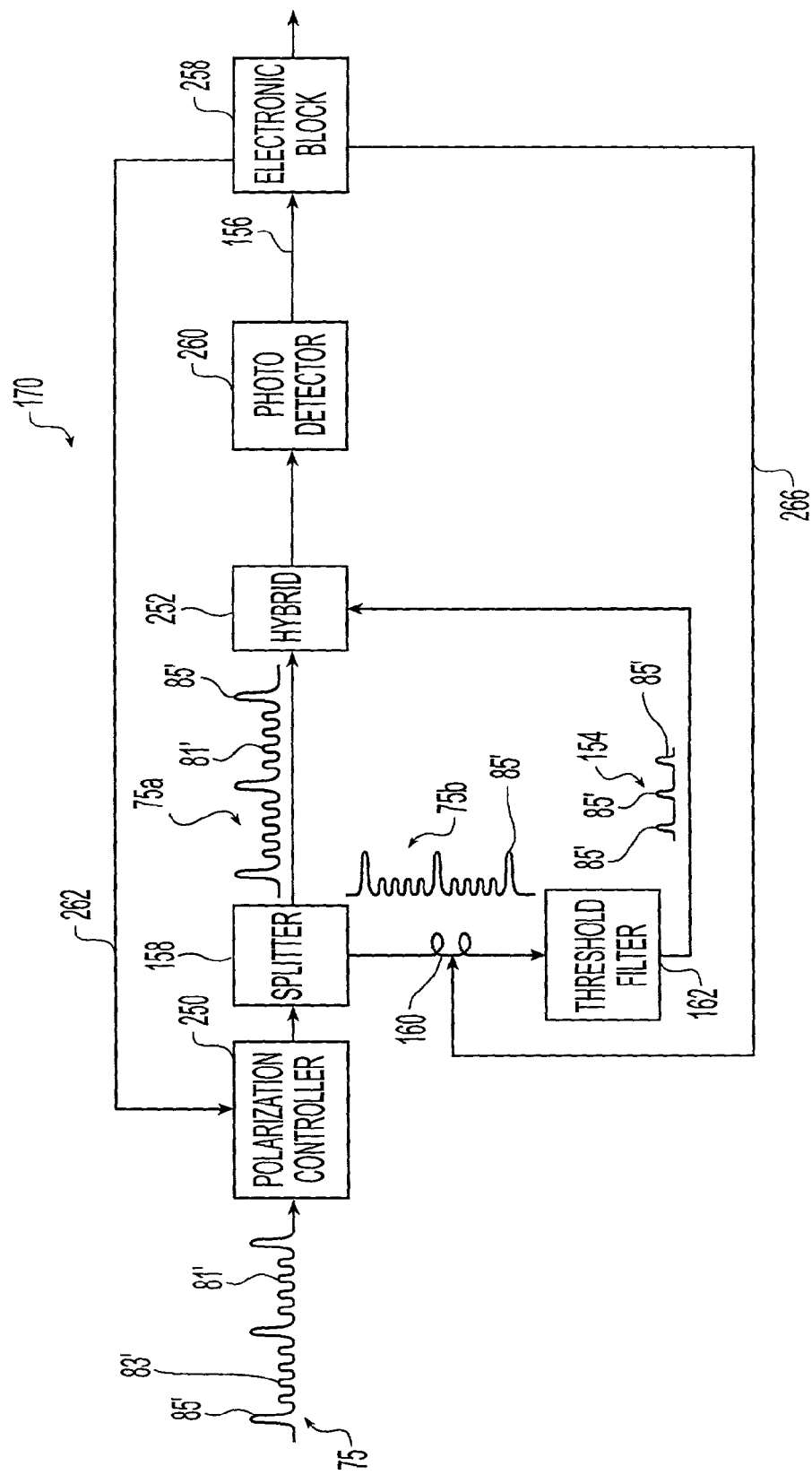
FIG. 16a illustrates an embodiment of a receiver according to the present invention.
Figure 16B:
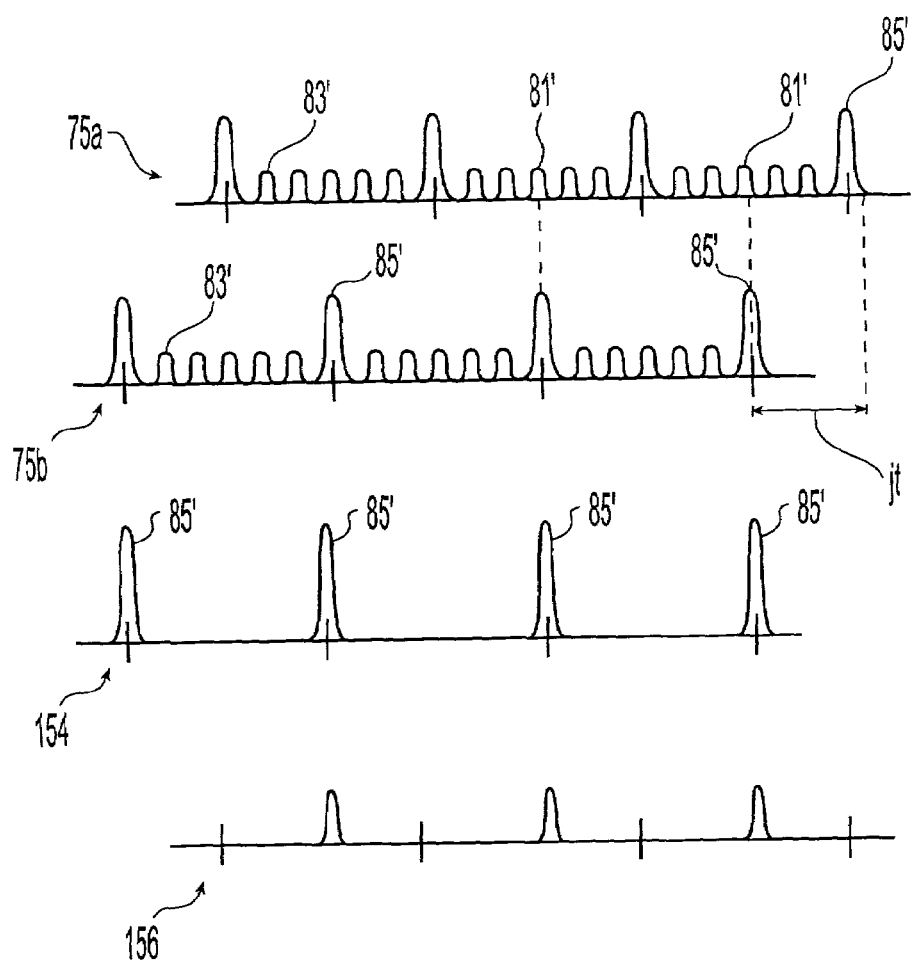
Figure 18:
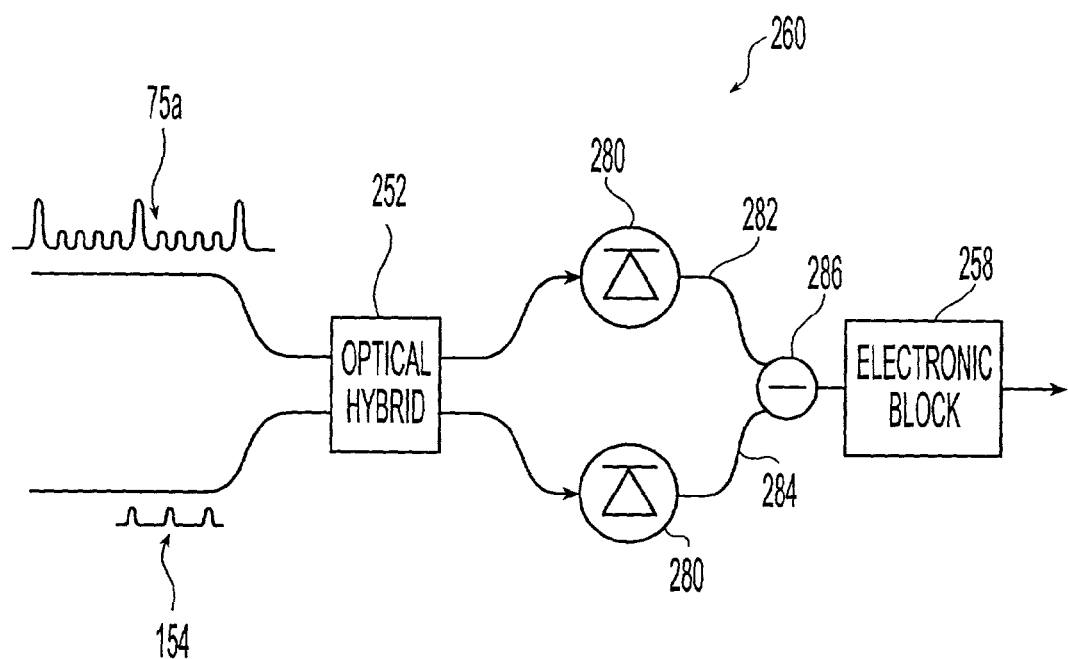
FIG. 18 shows a balanced photoreceiver according to the invention.

Referring to FIGS. 16a and 16b, a receiver 170 is configured to recover information from a bit-interleaved OTDM stream, such as optical signal 75, which comprises a plurality of PSK optical pulse streams, each PSK optical pulse stream comprising a plurality of return to zero optical pulses. Receiver 170 preferably includes a polarization controller 250, which accepts optical signal 75 and outputs a linearly polarized optical signal, which is split by a splitter 158 into first and second channels carrying first and second optical signals 75a, 75b, respectively. To recover information from a particular pulse stream of optical signal 75a, this signal is recombined with at least a portion of optical signal 75b. The recombined signals are delayed relative to one another so that the portion of optical signal 75b is synchronized with the optical pulse stream of optical signal 75b.

A delay element 160 delays optical signal 75b relative to optical signal 75a by a time sufficient to synchronize the framing pulses 85' of optical signal 75b with the bit periods of one of the optical pulse streams of optical signal 75a. In FIG. 16b, for example, optical signal 75b is shown as being delayed such that framing pulses 85' are synchronized with pulses 81' of optical stream 75a. The delay of channel 75b is preferably imparted by a delay element 160, such as by a length of optical fiber. Depending upon which of the N optical pulse streams is to be demodulated, a different length of optical fiber is chosen. In general, if information from the jth optical pulse stream of optical signal 75 is to be recovered, channel 75b is delayed by a time jτ relative to channel 75a. It should be understood, of course, that the delay is relative between the channels. Thus, in an alternative embodiment, channel 75a is delayed relative to channel 75b.

Referring to FIGS. 17a and 17b, delay element 160 can include a tuneable delay element 200 that provides a tuneable delay. Tuneable delay element 200 allows the synchronization of any two pulse streams such as first and second pulse streams 202, 204. In FIG. 17a, pulse stream 202 is ahead of pulse stream 204 by a time ΔT. Thus, to achieve synchronization, stream 202 must be delayed by ΔT relative to stream 204.

Tuneable delay element 200 allows a pulse stream to be delayed by any amount from 0 to T-$2^{-k}$, in steps of $2^{-k}$, where T is the pulse period. Delay element 200 includes k−1 fixed delays, such as optical fiber lengths 206. The fixed delays preferably have values of T/2, T/4, ..., T/$2^{k-1}$. Fiber lengths 206 are interconnected by k 2×2 optical switches 207. Each switch 207 includes a control input 208 to allow the output of each switch to be selectively switched between the subsequent fiber length 206 or a fiber 210, which imparts essentially no delay to the pulse stream. Thus, pulse streams 202, 204 can be synchronized by passing pulse stream 204 through a tuneable delay element configured to impart a relative delay of ΔT to pulse stream 204.

Using tuneable delay line 200, two pulse streams can be synchronized to within a time interval of $T/2^k$. Synchronization time interval $T/2^k$ is substantially less than the width of pulses received by receiver 170. By substantially less it is meant that synchronization time interval $T/2^k$ is less than 15% and preferably less than 5% of the width of pulses in the synchronized pulse streams. For example, given a pulse period T of 100 ps and a pulse width of 1 ps, a tuneable filter with k=10 provides a resolution of 100 ps/1024=0.097 ps or less than 10% of the pulse width. Optical pulse streams can also be synchronized by passing one of the pulse streams through a variable air gap delay.

Returning to FIG. 16a, receiver 170 preferably includes a threshold filter 162, which accepts optical signal 75b and outputs an optical pulse stream 154, which is essentially free of pulses other than framing pulses 85'. By essentially free, it is meant that light intensity present within non-framing pulse bit periods of optical signal 154 is insufficient to increase the bit error rate of the information that is recovered from optical signal 75a. The threshold operation can be performed before or after imparting the relative delay to channels 75a and 75b.

Threshold filter 162 has a response time that is shorter than the bit period of optical signal 75b. Thus, upon passing a framing pulse, threshold filter 162 changes state sufficiently rapidly to prevent a following non-framing pulse from passing through the threshold filter. One type of error avoided by virtue of pulse stream 154 being essentially free of intensity at non-framing pulse bit periods is the reduction of spurious output signals that do not correspond to logical values of the pulse stream to be demodulated.

Pulse stream 154 is coherently mixed with optical pulse stream 75a by an optical hybrid 252. The mixed output from optical hybrid 252 impinges upon a photodetector 260, which includes at least one photodiode. In a preferred embodiment, photodetector 260 includes at two photodiodes, which receive a respective output of hybrid 252. The output of photodetector 260 is a time varying current 156. Current 156 includes temporal features that correspond to the logic values of the data stream used to modulate pulse stream 81. Current 156 is preferably in the baseband such that further demodulation is not required to recover the information that was present in the jth pulse stream of channel 152.

The amplitude of pulses 85' of pulse stream 154 is preferably larger than the pulses of optical pulse stream 75a to be demodulated, so that the dominant noise in the receiver is due to quantum noise. An optional amplifier, preferably positioned prior to hybrid 252, can be used to increase the amplitude of the pulses 85' prior to detection.

An electronic block 258 receives the photodiode output. A first feedback output 262 of electronic block 258 is input to polarization controller 250. If delay element 160 comprises a tuneable delay, a second feedback output 266 is sent to control the amount of delay imparted by the delay element to maintain the framing pulse stream 154 in synchronization with the pulse stream to be demodulated.

Figure 19A:
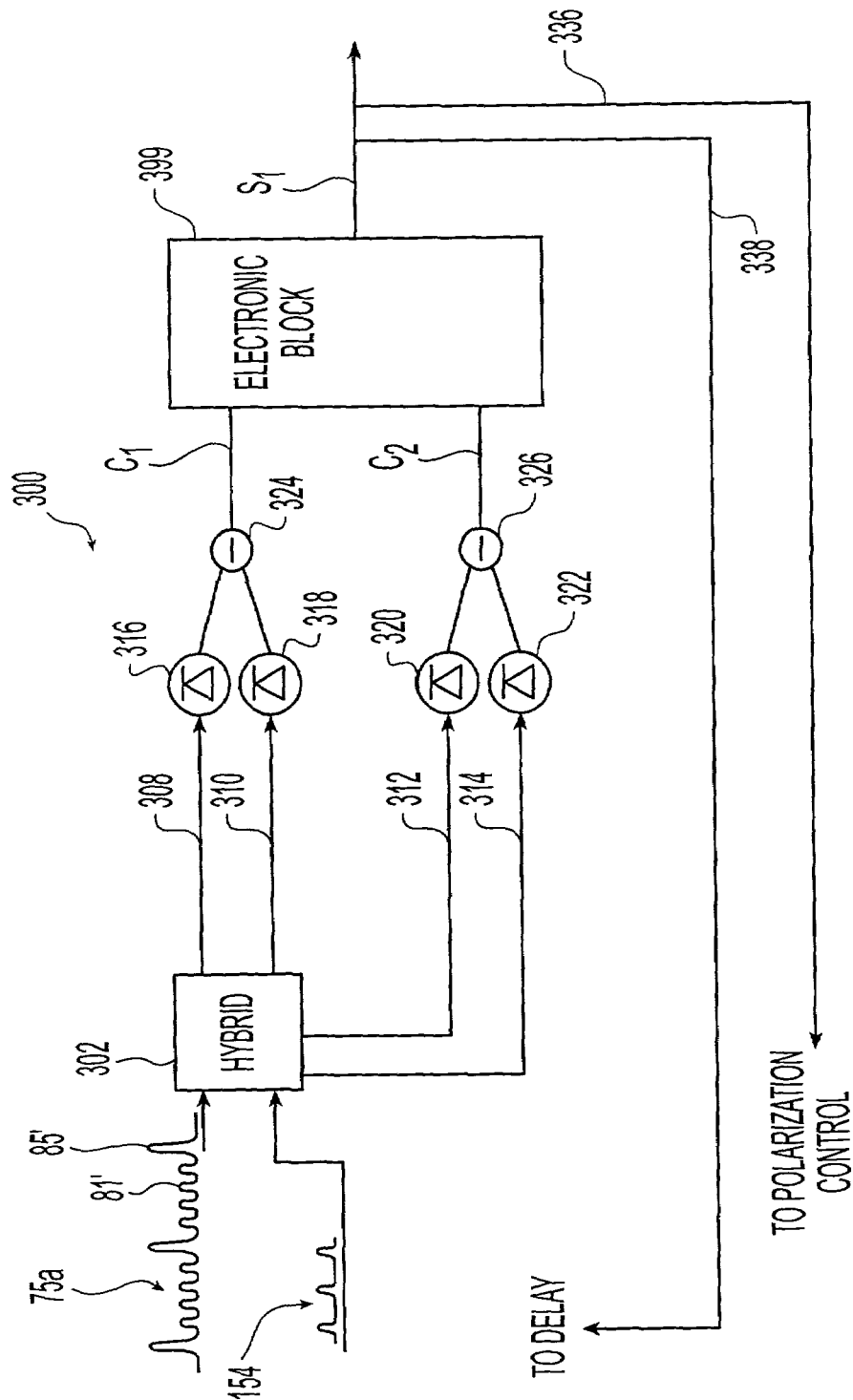
FIG. 19a illustrates a second embodiment of a receiver according to the invention.

As shown in FIG. 19a, photodetector 260 is a balanced receiver. Optical signal 75a and framing pulse stream 154 are input to hybrid 252. The two outputs of optical hybrid 252 are converted into first and second electrical signals (currents) 282, 284 using two, preferably matched, photodiodes 280. Electrical signals 282, 284 are operated on by combiner 286, which takes the difference between the two signals. The output of combiner 286 is received by electronic block 258, as discussed above. An example of a balanced photodetector suitable for use with the present invention is the model DSC R405 balanced photoreceiver available from Discovery Semiconductors, Inc., Princeton Junction, N.J.

Receiver 170 is preferably configured for coherent detection of OTDM signals as follows. An optical pulse stream containing only a framing pulse stream is transmitted to receiver 170. Splitter 158 splits this framing pulse stream signal into first and second channels, as discussed above. One of the channels is input to delay element 160, which outputs an optical signal delayed relative to the other channel. The delayed optical signal passes through the threshold filter. The delayed optical signal and un-delayed optical signal are mixed at hybrid 252 and impinge upon photodetector 260, as described above. Because the delayed and undelayed optical signals contain only framing pulses, the photodetector 260 will output a non-zero signal only when the two optical signals output by splitter 158 are synchronized. Once the two optical signals output by the splitter 158 are synchronized, information can be recovered from any pulse stream present in an optical signal received by receiver 170 by adjusting the relative delay imparted by delay element 160 to a time jτ, which depends on the particular pulse stream to be demodulated.

Referring to FIG. 19a, a second embodiment of a photodetector 300 is shown. In this embodiment, the receiver is a phase-diversity receiver. A 90° optical hybrid 302, accepts optical signal 75a and framing pulse stream 154, both of which are formed from optical signal 75 as described above in relation to receiver 170. Hybrid 302 coherently mixes optical signal 75a and framing pulse stream 154 forming 4 output pulse streams 308, 310, 312, 314. First and second output pulse streams 308, 310 have a phase state of 0 and 180, respectively. Third and fourth output pulse streams 312, 314 have a phase state of 90 and 270, respectively. The four outputs 308, 310, 312, and 314 impinge upon respective photodetectors, such as photodiodes 316, 318, 320, 322, which produce an electrical signal as described above. Combiner 324 takes the difference between the outputs of photodiodes 316, 318 to produce an output current $C_1$ and combiner 326 takes the difference between the outputs of photodiodes 320, 322 to produce an output current $C_2$. The output currents $C_1$, $C_2$ are input to an electronic block 399 for processing. The processing functions depend upon the type of modulation scheme and whether analog or digital processing is used.

It should be understood that receivers of the invention, for example, receiver 300 of FIG. 19a, may be operated as homodyne receivers rather than self homodyne receivers. During homodyne operation, a framing pulse stream or continuous wave (CW) optical beam, for example framing pulse stream 154, is supplied by a local oscillator or other light source rather than being obtained from the received optical signal. For homodyne detection of an optical signal of the invention, the local oscillator or cw light beam preferably has the same wavelength as the optical signal. Homodyne receivers are discussed in more detail below.

Figure 19B:
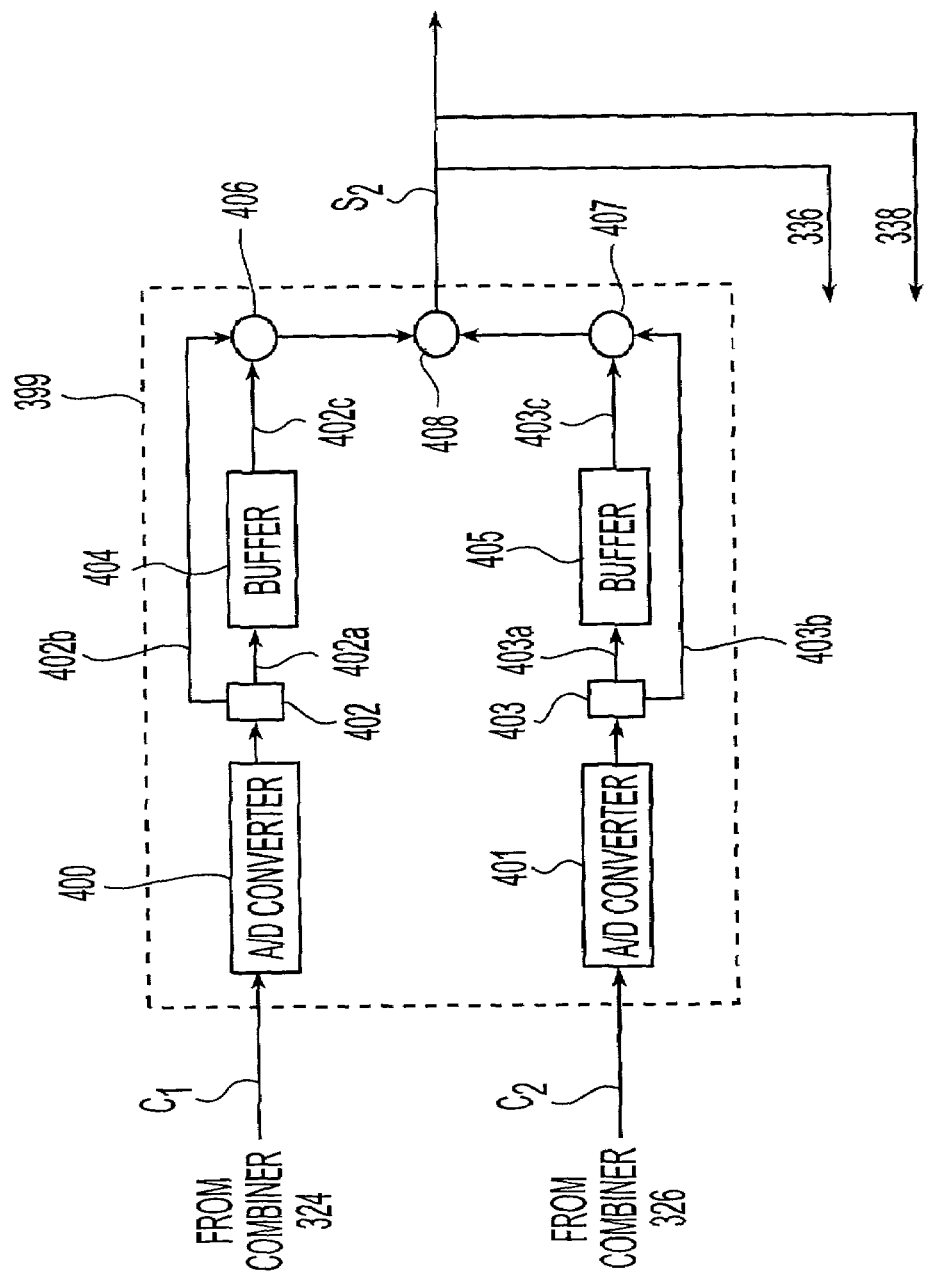

Referring to FIG. 19b, components of electronic block 399 are shown. The output currents $C_1$, $C_2$ are respectively squared 328, 330 to provide squared currents $C_1^2$, $C_2^2$, respectively, and the squared currents summed 332 to form the final output signal $S_1$. The output of photodetector 300 includes feedback loops 336, 338, which are used to control the polarization control, and tuneable delay, if present, as discussed above.

The operation of receiver 300 and electronic block 399 can be expressed mathematically. The four outputs 308, 310, 312, and 314 of the hybrid are given by:

$$E_1(t) = \frac{1}{\sqrt{2}}\{E_S(t)\exp(i\varphi_S(t)) + jE_L(t)\exp(i\varphi_L(t))\} \quad (1)$$

$$E_2(t) = \frac{1}{\sqrt{2}}\{E_S(t)\exp(i\varphi_S(t)) - jE_L(t)\exp(i\varphi_L(t))\} \quad (2)$$

$$E_3(t) = \frac{1}{\sqrt{2}}\{E_S(t)\exp(i\varphi_S(t)) - E_L(t)\exp(i\varphi_L(t))\} \quad (3)$$

$$E_4(t) = \frac{1}{\sqrt{2}}\{E_S(t)\exp(i\varphi_S(t)) + E_L(t)\exp(i\varphi_L(t))\} \quad (4)$$

where the input signal to be demodulated is $E_S$, the local oscillator signal is $E_L$. Signals $E_S$ and $E_L$ have respective phases $\phi_S$ and $\phi_L$. Signals $E_1(t)$, $E_2(t)$, $E_3(t)$, and $E_4(t)$ correspond to optical pulse streams 308, 310, 312, and 314.

The corresponding current signals, $P_i(t)$, output by photodiodes 316, 318, 320, and 322 are proportional to the square of light signals $E_1(t)$, $E_2(t)$, $E_3(t)$, and $E_4(t)$:

$$P_1(t) = \frac{1}{2}\int_0^{\Delta T} [E_S^2(t) + E_L^2(t) + 2E_SE_L\sin(\Delta\varphi(t)]dt \quad (5)$$

$$P_2(t) = \frac{1}{2}\int_0^{\Delta T} [E_S^2(t) + E_L^2(t) - 2E_SE_L\sin(\Delta\varphi(t)]dt \quad (6)$$

$$P_3(t) = \frac{1}{2}\int_0^{\Delta T} [E_S^2(t) + E_L^2(t) + 2E_SE_L\cos(\Delta\varphi(t)]dt \quad (7)$$

$$P_4(t) = \frac{1}{2}\int_0^{\Delta T} [E_S^2(t) + E_L^2(t) - 2E_SE_L\cos(\Delta\varphi(t)]dt \quad (8)$$

Combiner 324 subtracts $P_1$ from $P_2$ to produce output current $C_1$:

$$C_1 = E_SE_L\sin(\Delta\phi) \quad (9)$$

Combiner 326 subtracts $P_3$ from $P_4$ to produce output current $C_2$:

$$C_2 = E_SE_L\cos(\Delta\phi) \quad (10)$$

The treatment of output currents $C_1$, $C_2$ depends upon the technique that was used to modulate the optical signals at the transmitter.

Referring to FIG. 19b, an electronic block 399 is preferably used where information is to be recovered from DPSK modulated optical pulse streams. Currents $C_1$, $C_2$ are converted to digital signals by respective high speed analog to digital (A/D) converters 400, 401. The CompuScope 82G PC card available from Gage Applied Science, Inc, Montreal, Canada provides a suitable A/D converter.

Signals output by A/D converters 400, 401 are split 402, 403 into pairs of channels 402a, 402b and 403a, 403b. A buffer 404 accepts channel 402a and produces a delayed output 402c. A combiner 406 outputs the product of channels 402b and 402c. A combiner 407 operates similarly to output the product of channel 403b and a delayed channel 403c output by a buffer 405. The outputs of combiners 406, 407 are subtracted 408 to produce an output $S_2$.

As an example of the comparison process, assume that the values of $<C'_1>$ and $<C'_2>$ for the next pulse are given by:

$$C'_1 = E_SE_L\sin(\Delta\delta) \quad (12)$$

$$C'_2 = E_SE_L\cos(\Delta\delta) \quad (13)$$

where $\Delta\delta$ is the relative phase difference. The output of combiner 408 is given by:

$$S_2 = C_1 \cdot C'_1 - C_2 \cdot C'_2 \quad (14)$$

The differential phase signal $S_2$ can be expressed as:

$$S_2 = E_SE_L(\cos(\Delta\phi)\cdot\cos(\Delta\delta) + \sin(\Delta\phi)\cdot\sin(\Delta\delta)) = E_SE_L\cos(\Delta\phi - \Delta\delta) \quad (15)$$

For BPSK (binary phase shift keying) the unchanged phase corresponds to the signal 1, and the change of phase will appear as (−1).

For QPSK (quarternery phase shift keying) modulation the signal processing consists in obtaining two signals:

$$<C_1> \cdot <C'_1> + <C_2> \cdot <C'_2> = E_SE_L\cos(\Delta\varphi - \Delta\delta) \quad (16)$$

$$<C_1> \cdot <C'_2> - <C_2> \cdot <C'_1> = E_SE_L\sin(\Delta\varphi - \Delta\delta)$$

The combination of values of these two signals (11, 1−1, −11, −1−1) allows one to perform the unique decoding of the phase change.

Figure 20A:
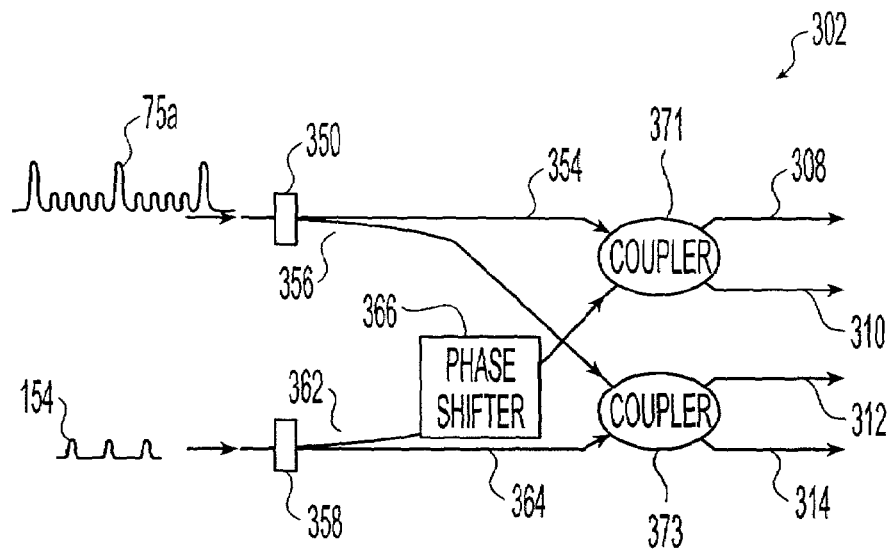
FIGS. 20a and 20b illustrate optical hybrids according to the invention.

One embodiment of a hybrid 302 is shown in FIG. 20a. A splitter 350 splits pulse stream 75a to be demodulated into first and second channels 354, 356. A second splitter 358 splits framing pulse stream 154 into third and fourth channels 362, 364. A phase shifter 366 introduces a phase shift into one of the channels output by one of splitters 350, 358, such as channel 362. Channels 354 and 362 are combined by a first 3 dB coupler 371 to form output pulse streams 308 and 310. Channels 356 and 364 are combined by a second 3 dB coupler 373 to form output pulse streams 312 and 314. The outputs of the couplers are detected by photodiodes 316, 318, 320, 322, as described above.

Figure 20B:
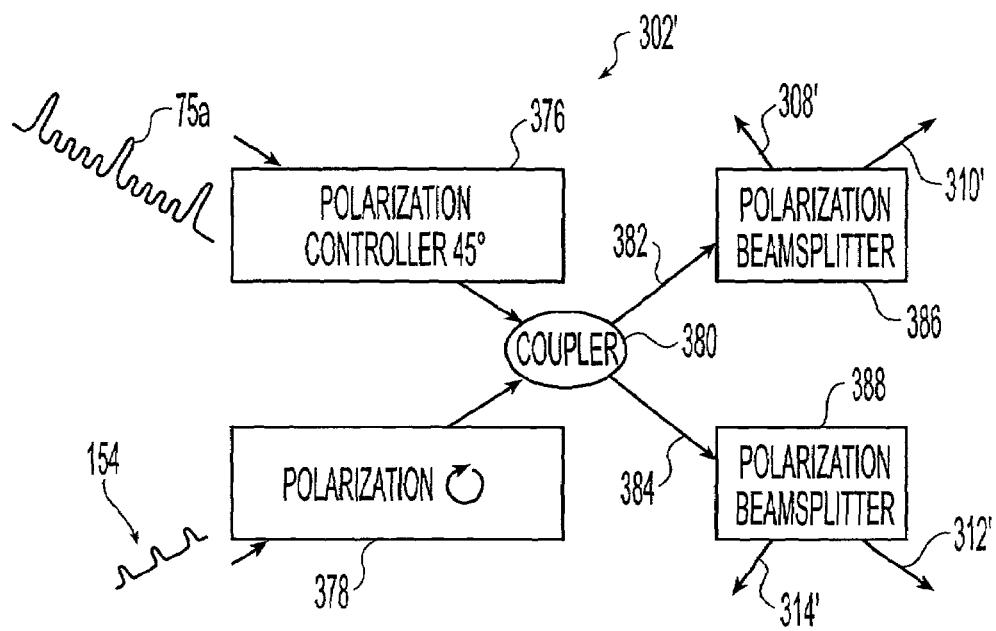

A second embodiment of a hybrid 302' is shown in FIG. 20b. Optical signal 75a and pulse stream 154 are acted upon by first and second polarization controllers 376 and 378, respectively. One of the polarization controllers forms the 45° state of the signal it receives and the other forms the circularly polarized state of the received signal. In FIG. 20b, controller 378 is shown as forming the circularly polarized state of pulse stream 154. The outputs of controllers 376 and 378 are combined by a 3 dB coupler 380, which produces first and second output pulse streams 382 and 384. Output pulse stream 382 is received by a polarization beam (PB) splitter 386, which produces outputs 308' and 310'. Output pulse stream 384 is received by a polarization beam splitter 388, which produces outputs 312' and 314'. The outputs 308', 310', 312', 314' are detected by photodiodes 316, 318, 320, 322, as described above for outputs 308, 310, 312, 314.

Figure 21:
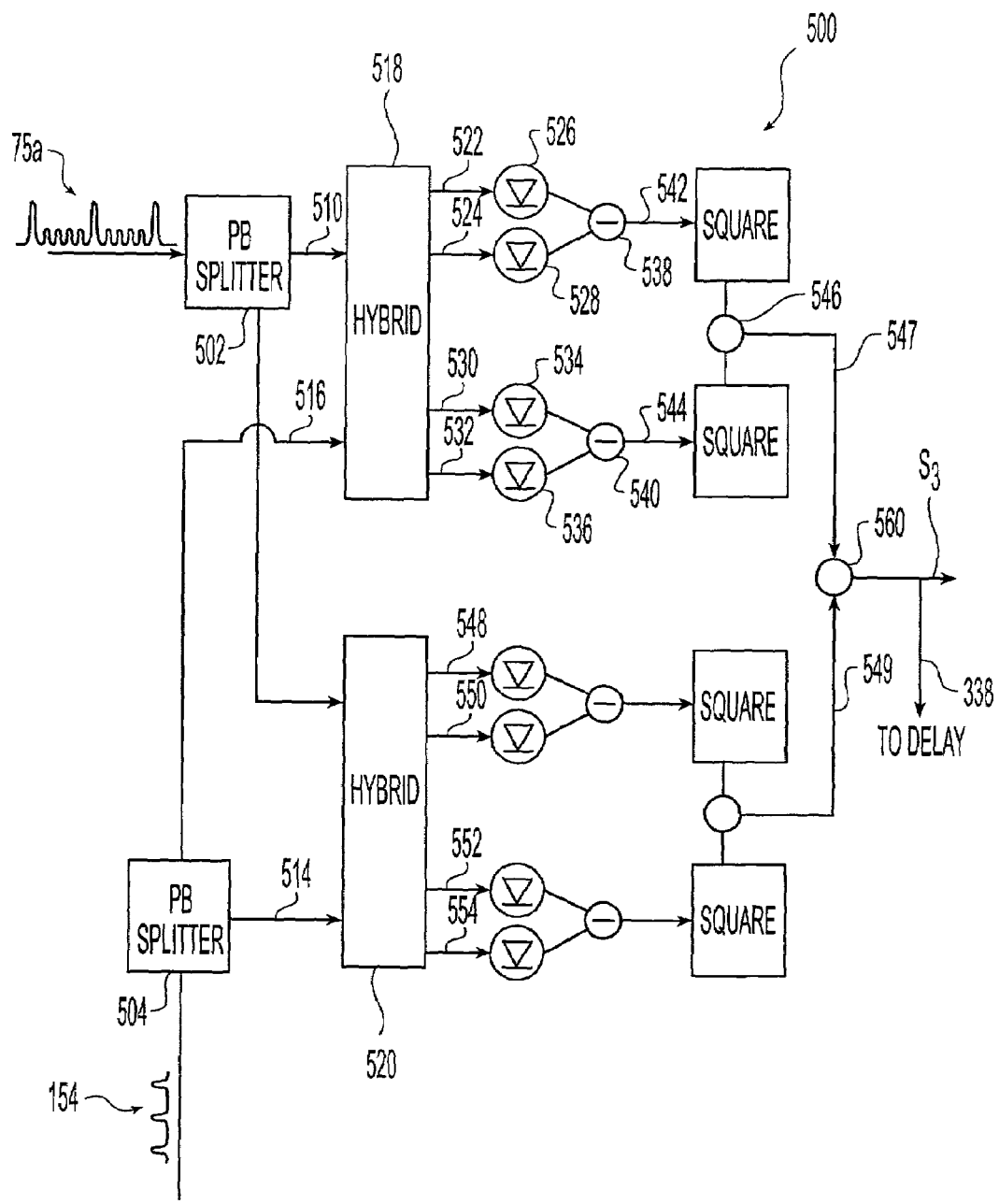
FIG. 21 shows a polarization diversity receiver according to the invention.

Referring to FIG. 21, another receiver of the present invention is a polarization diversity receiver 500, which is configured to separately detect components of the received optical signal that have different linear polarizations. Receiver 500 includes first and second polarization splitters 502 and 504. Splitter 502 splits optical signal 75a into a first channel 510, having a first polarization, and a second channel, 512 having a second, different polarization. Preferably, the two polarizations are orthogonal to one another. Second splitter 504 splits optical pulse stream 154 into a third channel 514, having the first polarization, and a fourth channel, 516 having the second, different polarization.

Channels 510 and 516 having the same polarization state are received and coherently mixed by an optical hybrid 518. Channels 512 and 514 having the same polarization state are received and combined by an optical hybrid 520. Optical hybrids 518 and 520 operate in a similar manner to optical hybrid 302, discussed above. Thus, for example, optical hybrid 518 outputs optical pulse streams 522, 524, 530, and 532, which have phase states of 0, 180, 90, and 270, respectively. The outputs of hybrids 518, 520 impinge upon respective photodetectors, such as photodiodes 526, 528, 534, 536, which produce an electrical signal as described above.

Combiner 538 takes the difference between the outputs of photodiodes 526 and 528 and combiner 540 takes the difference between the outputs of photodiodes 534 and 536. The subtraction operation cancels any errors that would otherwise be introduced by a change in the phase of signal 506 with respect to the phase of the local oscillator output. A combiner 538 takes the difference between the outputs of diodes 526 and 528 to produce an output 542 and a combiner 540 takes the difference between the outputs of diodes 534 and 536 to produce an output 544. For ASK modulated signals, outputs 542 and 544 are squared and summed to produce a first summed output 547. Optical hybrid 520 outputs optical pulse streams 548, 550, 552, and 554, which are received and processed similarly to the outputs of hybrid 518 to produce a second summed output 549. Summed outputs 547 and 549 are summed 560 to produce a final signal $S_3$.

The output of photodetector includes a feedback 338, which is used to control tuneable delay, if present, as discussed above. Preferably, a feedback controlled polarization device is not used because the receiver output is independent of fiber induced polarization fluctuations that affect the polarization of optical signal 506.

A preferred optical hybrid can be fabricated as an integrated structure from an optical crystal, such as $LiNbO_3$. For example, Hoffmann et al. Journal of Lightwave Technology, vol. 7, No. 5, May 1989, which is incorporated herein to the extent necessary to understand the present invention, discloses an integrated hybrid having four 3-dB directional couplers and two phase shifters for adjusting the phase relationship of the output signals. The integrated hybrid uses waveguides rather than fiber optics to direct the optic signals. Because the waveguides and associated structures can be fabricated using photolithographic techniques, such integrated hybrids can be produced at lower cost and within higher tolerances with less functional variation than conventionally produced optical hybrids. A preferred coherent photoreceiver includes an integrated hybrid packaged with a balanced detector and amplifiers on a single, compact optical board.

Decoding of DWDM Signals Having PSK Optical Signals Comprising RZ Pulses

Figure 22:
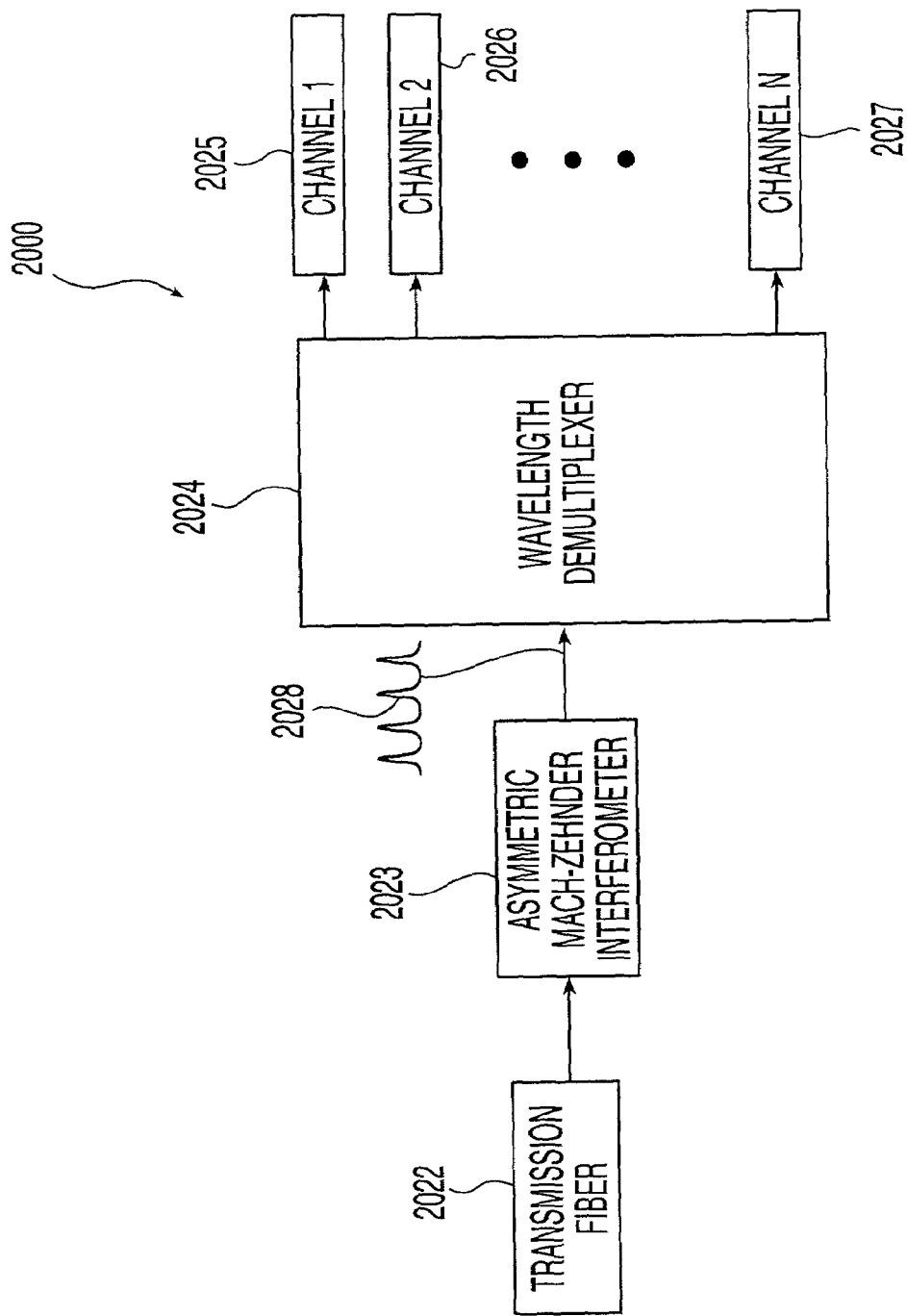
FIG. 22 illustrates a first embodiment of a receiver for receiving WDM multiplexed optical signals according to the invention.

Referring to FIG. 22, a receiver 2000 receives DWDM optical signals, such as an optical signal transmitted by transmitters 1621 or 1650. Receiver 2000 includes a single AMZ interferometer 2023, which maybe identical to AMZ 1932, to simultaneously demodulate all the PSK modulated channels of the received DWDM optical signal. The AMZ operates identically to AMZ interferometer 1932 to prepare a DWDM optical signal 2028 comprising a plurality of amplitude modulated pulse streams each similar to one of outputs 1929 and 1930 of AMZ interferometer 1932. Thus, receiver 2000 is a self-homodyne receiver.

Preferably, the channel spacing is an integer multiple of the bit rate or the free spectral range (FSR) of the AMZ. The channel spacing is the frequency spacing between different PSK modulated pulse streams of the DWDM optical signal. For example, an AMZ with a FSR of 12.5 GHz can be used to simultaneously demodulate all the channels at 12.5 Gb/s for a channel spacing of 25 GHz or about 0.2 nm at a central wavelength of 1550 nm.

A wavelength demultiplexer 2024 or optical bandpass filter placed after AMZ interferometer 2023 separates individual amplitude modulated channels (the demodulated PSK channels) into respective channels 2025–2027 for photodetection and electronic post-processing. Channels 2025–2027 preferably comprise a square-law detector configured to detect the respective amplitude modulated optical pulse streams and convert the optical information to electrical signals as understood in the art. For a wavelength demultiplexer based on silica PLC such as an arrayed waveguide grating, the AMZ and wavelength demultiplexer are preferably integrated upon the same substrate.

For DWDM systems with tight channel spacing, the shape of the optical bandpass filter as well as the spectral shape of the PSK pulse has a direct impact on the quality of the received signal. For example, if the filter is too narrow a significant portion the signal spectrum may be attenuated causing excessive broadening of the pulse leading to severe inter-symbol interference. Also the dispersion of the filter may cause severe distortion of the pulse. On the other hand, if the filter is too wide substantial amount of power from the neighboring channels will be picked up causing severe adjacent channel interference or crosstalk. Careful shaping of the pulse to achieve the narrowest spectral shape without significant compromise of the pulse temporal profile is important. This also reduces the constraints on design of the optical filter. The same is also applicable for OOK format.

Figure 23:
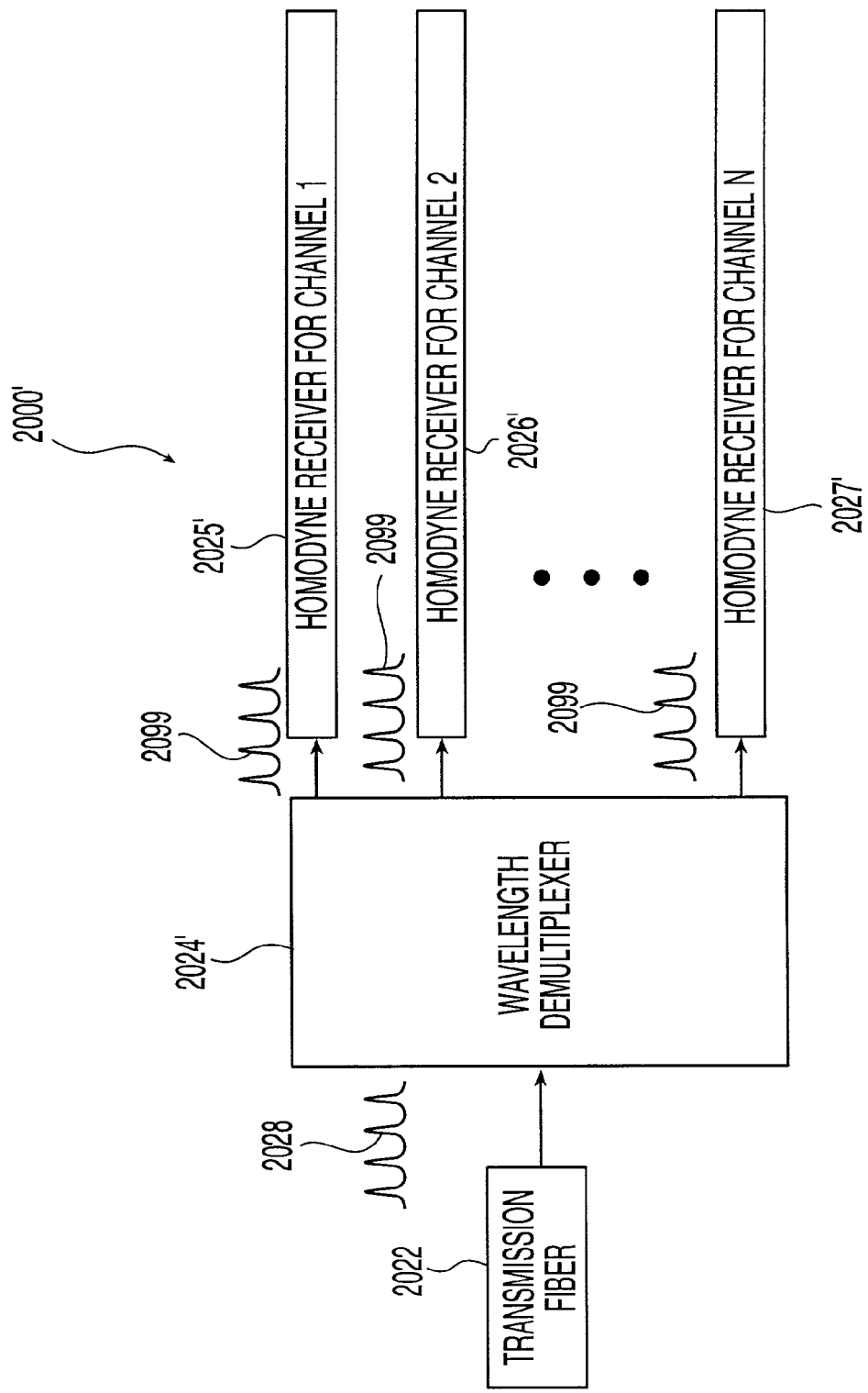
FIG. 23 illustrates a second embodiment of a receiver for receiving WDM multiplexed optical signals according to the invention.

Referring to FIG. 23, a receiver 2000' is a homodyne receiver for DWDM optical signals comprising return-to-zero optical pulses, such as optical signals transmitted by transmitters 1621 or 1650. Received signals, such as signals accepted from fiber 2022, are accepted by a wavelength demultiplexer 2024', which may be identical to demultiplexer 2024. Demultiplexer 2024' separates the received DWDM optical signal into individual PSK optical pulse streams 2099, which are launched into respective channels 2025', 2026', and 2027' for homodyne detection and electronic post-processing.

As an alternative to the demultiplexer 2024' a 1/N optical splitter may be used to split the received optical signal into N channels each having a power 1/Nth as great as the received optical signal. Preferably, no separation based on wavelength is performed. The optical signal of each channel is detected by combining the optical signal with a light beam from a local light source. The light beam has a wavelength identical to a particular one of the pulse streams present in the optical signal. Only the optical pulse stream that matches the wavelength of the optical pulse stream is homodyne demodulated and detected.

Figure 24:
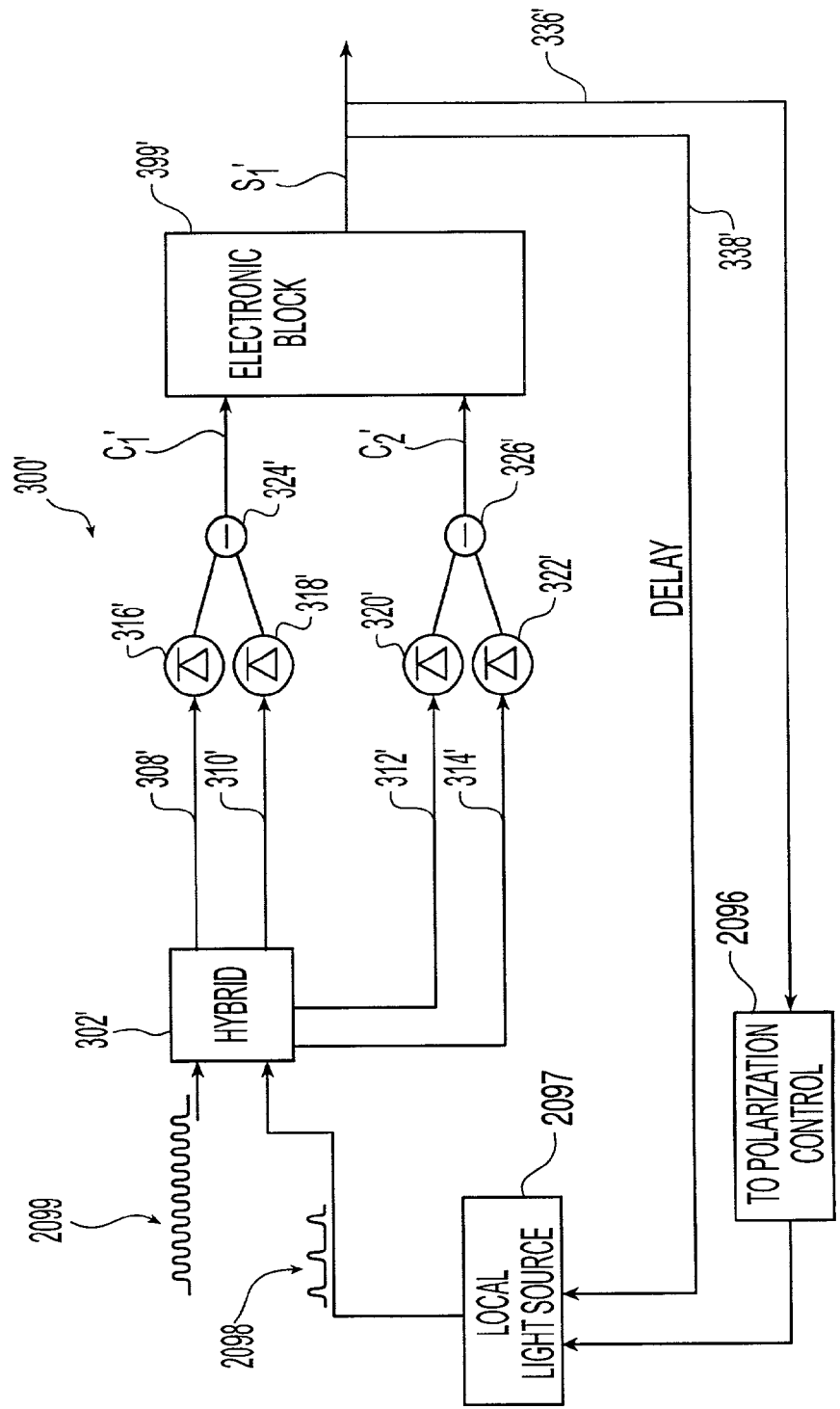
FIG. 24 shows a homodyne detector for detecting optical signals comprising return-to-zero phase modulated optical pulses according to the invention.

Referring to FIG. 24 a homodyne detector 300' may be used for detection of an optical pulse stream comprising return-to-zero optical pulses. In FIG. 24, for example, homodyne detection of optical pulse stream 2099 demultiplexed from a DWDM optical signal and launched into a respective channel of receiver 2000' is shown. Detector 300' includes a 90° optical hybrid 302', which may be identical to optical hybrid 302 discussed above. Optical hybrid 302', accepts optical signal 2099 and a light beam 2098 from a local light source 2097, which may be, for example, a pulsed laser or CW light laser. Where local light source 2097 is a pulsed source, it is preferred that light beam 2098 have essentially the same repetition rate as optical pulse stream 2099. Whether light source is a pulsed or a CW source, it is preferred that light beam 2098 have essentially the same wavelength as pulse stream 2099 to cause light beam 2098 and pulse stream 2099 to interfere upon mixing.

Hybrid 302 coherently mixes optical signal 2099 and light beam 2098 and forms 4 output pulse streams 308', 310', 312', 314'. First and second output pulse streams 308', 310' have a phase state of 0 and 180, respectively. Third and fourth output pulse streams 312', 314' have a phase state of 90 and 270, respectively. The four outputs 308', 310', 312', 314' impinge upon respective photodetectors, such as photodiodes 316', 318', 320', 322', which produce an electrical signal as described for photodiodes 316, 318, 320, 322. Combiner 324', which may be identical to combiner 324, takes the difference between the outputs of photodiodes 316', 318' to produce an output current $C_{1'}$ and combiner 326' which may be identical to combiner 326, takes the difference between the outputs of photodiodes 320', 322' to produce an output current $C_{2'}$. The output currents $C_{1'}$, $C_{2'}$ are input to an electronic block 399' and processed as are currents $C_1$, $C_2$.

Electronic block includes a delay output 338', which may be used to synchronize local light source 2097 and optical pulse stream 2099. An output 336' may be used to provide polarization control to maintain polarization between light beam 2098 and optical pulse stream 2099. The polarization control may be applied to either or both light beam 2098 or optical pulse stream 2099.

As discussed above, local light source 2097 may be a CW light source and light beam 2098 a CW light beam. In this embodiment, delay output 338' is not needed. Otherwise, the receiver operates identically to the receiver 300' discussed above.

Homodyne detector 300' may be used with single optical signals or with multiplexed optical signals including both TDM and WDM optical signals. For example, a preferred receiver of the invention is a homodyne receiver configured to demodulate an optical pulse stream comprising return-to-zero optical pulses, such as an optical pulse stream that has been demultiplexed from a WDM optical signal. The homodyne demodulation is preferably performed by combining the optical pulse stream with a cw optical beam obtained from a local light source.

As an alternative to receivers 2000 or 2000', the PSK pulse wavelength channels may be separated using optical bandpass filters or wavelength demultiplexer positioned before the AMZ which demodulates the PSK optical pulse streams. For a N-channel system, such a receiver would require N AMZ demodulators as opposed to the single AMZ interferometer of receiver 2000.

Experimental Results

Figure 25:
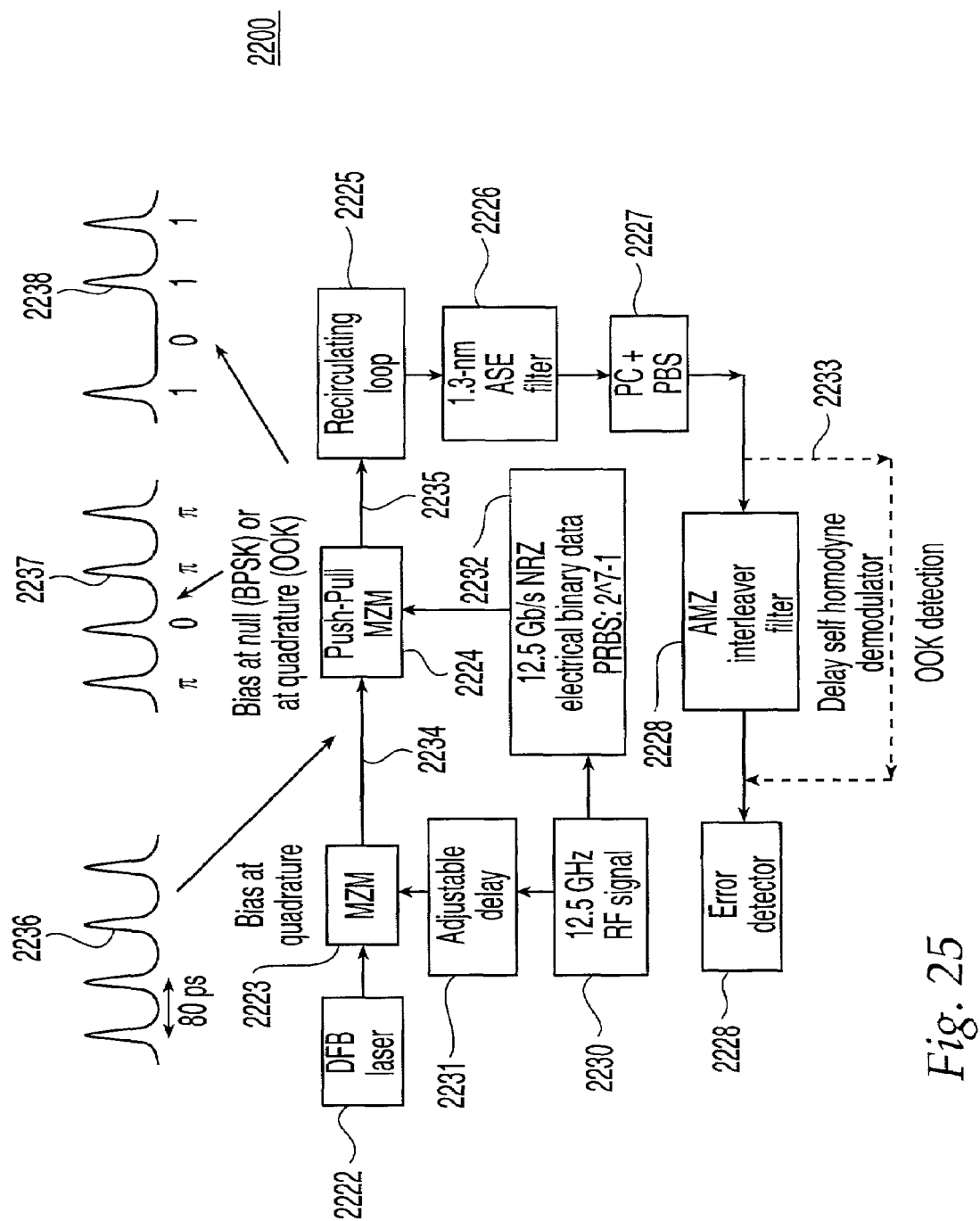
FIG. 25 shows a transmission test setup for comparing RZ-BPSK and RZ-OOK signals.

Referring to FIG. 25, a transmission test setup 2200 for comparing the single channel performance of RZ-BPSK and RZ-OOK signals is shown. The transmission test setup was configured to generate either a RZ-BPSK optical pulse stream or a RZ-OOK optical pulse stream. A Mach-Zehnder (MZ) modulator 2223 accepted a CW laser beam from a distributed feedback laser 2222, which was a JDS Uniphase, model CQF935/508. MZ interferometer 2223, which Sumitomo Osaka Cement, model: T.MZ1.5–20, was biased at its quadrature point using a DC voltage source, not shown. The output of MZ interferometer 2223 was an optical pulse stream 2236 having a bit period T of 80 ps. Optical pulse stream 2236 was received by a push-pull MZ interferometer 2224, which was biased at the null point to prepare a BPSK optical pulse stream 2237 or biased at the quadrature point to prepare an OOK optical pulse stream 2238. The push-pull interferometer 2224 was a JDS Uniphase, model: 10020427. MZ interferometer 2224 is an example of an interferometer suitable for use with PSK modulator 1126 and other PSK modulators discussed above.

Push-pull MZ interferometer 2224 encoded output streams 2237 and 2238 with pseudo random binary data from a data source 2232, which was driven at 12.5 GHz by a clock 2230. Clock 2230 also drove MZ interferometer 2223. A delay generator 2231 was used to maintain the phase modulation imparted by MZ interferometer 2224 in phase with incoming optical pulse stream 2236 output by MZ interferometer 2223.

The BPSK or RZ-OOK signals were then launched to a recirculating loop 2225 to simulate long distance propagation by recirculating the transmitted signal through the same and similar fibers. This transmission test is well known to those of ordinary skill in the art. Circulating loop 2225 includes 82.4 km of transmission fiber of standard single-mode fiber (G.652) having an about +17 ps/nm/km dispersion around 1550 nm. Circulating loop 2225 includes a dispersion compensation module, not shown, to compensate for fiber dispersion. Optical amplifiers with lumped erbium-doped fiber amplifiers and a backward-pumped distributedRaman pre-amplifier were included to compensate for fiber losses and the loop losses.

For detection, BPSK optical signals were filtered 2226 and sent to the AMZ demodulator 2228 for demodulation and detected at the receiver 2229. AMZ demodulator 2228 was an NTT Electronics, model: M0013NPMFP-DPXA.

Due to the polarization sensitivity of AMZ demodulator 2228, a polarization controller (PC) 2227 and a polarization beam splitter (PBS) 2227 was used to ensure that the proper polarization state of the signal was launched to the AMZ device. An improved polarization insensitive AMZ demodulator, NTT model M0013NPMFS, is preferable for use in receivers of the present invention. For RZ-OOK signals, AMZ demodulator 2228 was bypassed.

Figure 26:
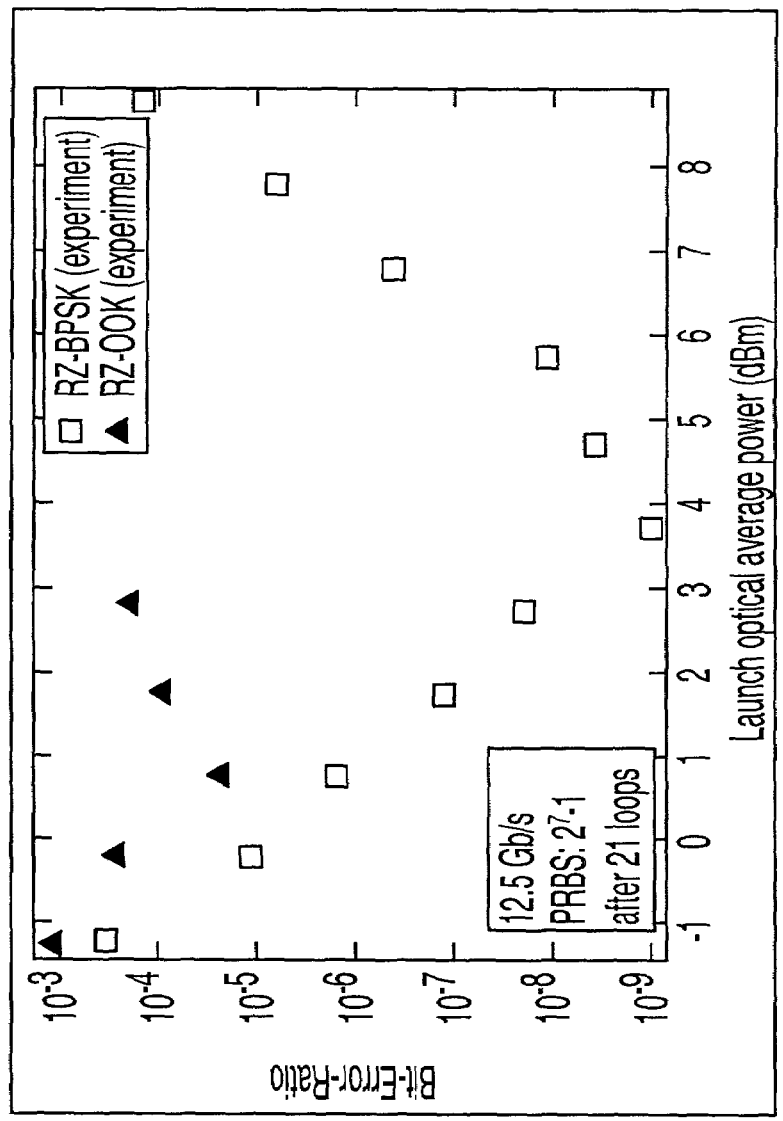
FIG. 26 is a plot of bit-error-rate of BPSK and RZ-OOK signals versus launched optical average power using data obtained from the test setup of FIG. 25.

Upon detection, the bit-error-rate (BER) was measured for different launched optical average powers to the transmission fiber. The measured results for both BPSK and RZ-OOK signals after a transmission of 21 loops or 1730.4 km of fiber are shown in FIG. 26. It is clear that the BPSK performance is superior to RZ-OOK formats. The optimal launched power for BPSK is 3 dB higher than the optimal power for the RZ-OOK format. For example, for an average launched power of about 3.7 dBm, the bit error ratio of an RZ BPSK optical signal was more than 4 orders of magnitude lower than the minimum bit error ratio for RZ-OOK signals, which minimum was observed at about 0.7 dBm. Because the optimal launch power for the RZ-BPSK is 3 dB higher than that for the RZ-OOK signal, an RZ-BPSK optical pulse stream of the present invention achieves a minimum bit error rate at a higher optical power than RZ-OOK optical pulse streams.

Figure 27:
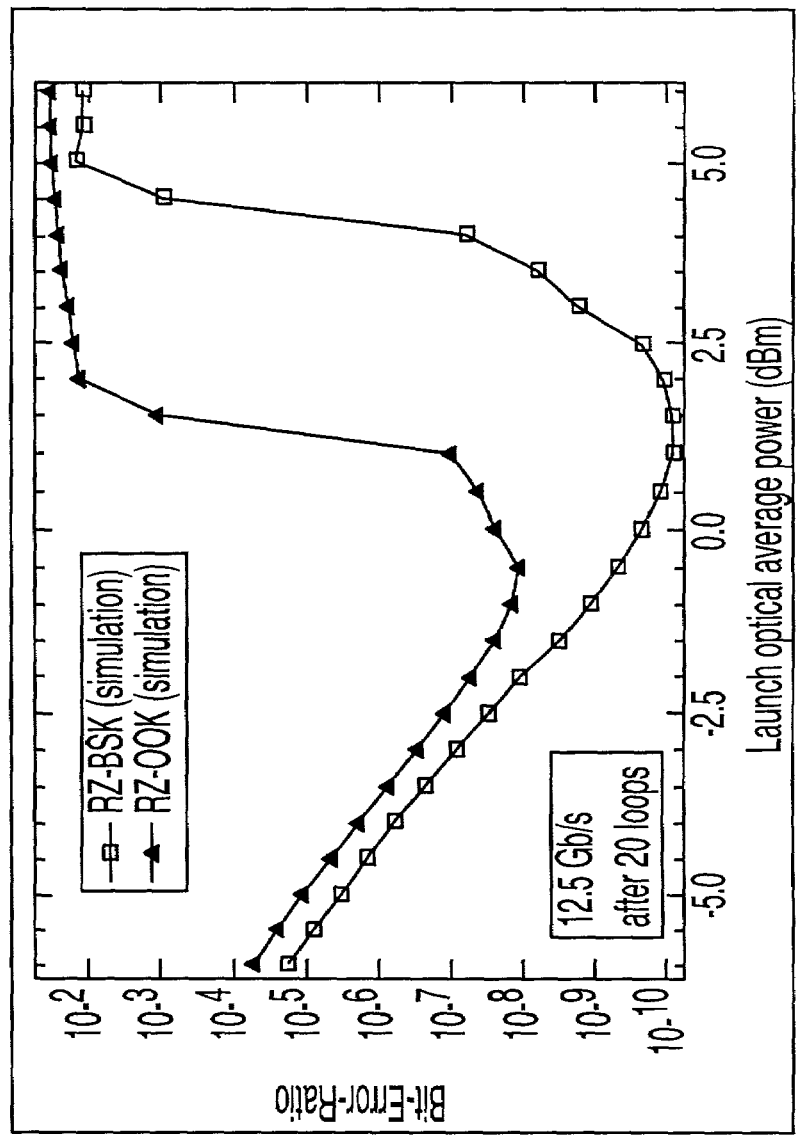
FIG. 27 is a plot of simulation results for the bit-error-rate versus launched optical average power for RZ-OOK signals and of RZ BPSK signals according to the invention.

Referring to FIG. 27, a system simulation model for multi-channel DWDM fiber transmission system was used to predict the performance of the BPSK and RZ-OOK formats in a system similar to that of transmission test setup 2200. For the single channel case, the simulated BER (bit error rate) of the BPSK and RZ-OOK signals after 20 loops or 1648 km versus launched power is shown in FIG. 27. The predicted performance is similar to the actual performance of transmission test setup 2200, as discussed above.

The simulation for a DWDM multi-channel transmission amplified link with 25 GHz channel spacing at 12.5 Gb/s was conducted for 160 wavelength channels. The simulated transmission fiber was standard single-mode fiber with +17 ps/nm/km (picosecond per nanometer per kilometer) of dispersion near 1550 nm. The launched power was 1 mW per channel and the amplifier spacing was 82 km. The optimal pulse shape for best transmission performance was determined for different transmission distance. The simulation predicts that multi-channel RZ BPSK DWDM transmission provides a lower bit error rate than RZ OOK DWDM transmission. Additionally, RZ BPSK DWDM provides the lower bit error rate at a higher power than RZ OOK DWDM transmission.

Figure 28:
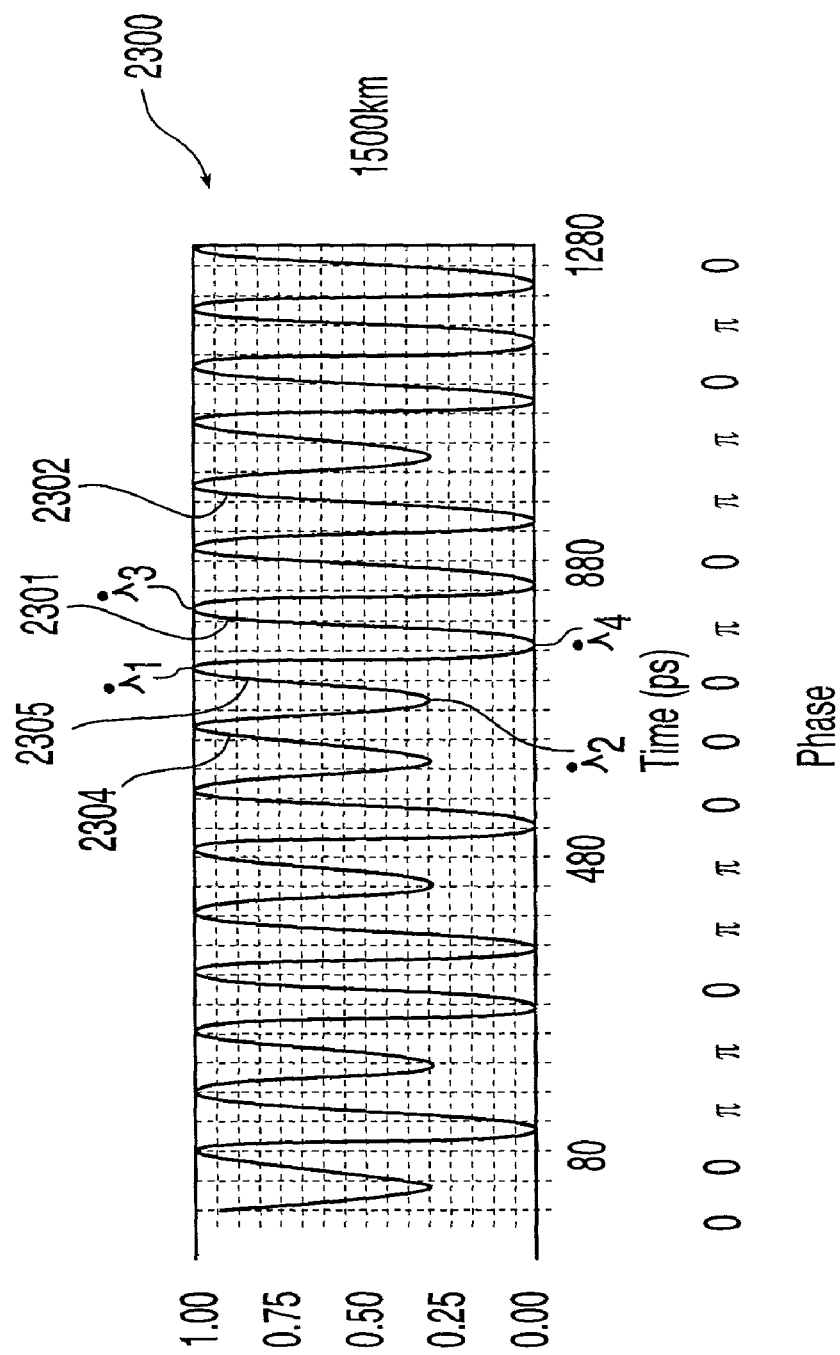
FIG. 28 shows a PSK optical pulse train comprising return-to-zero optical pulses having a preferred pulse shape for fiber transmission over a distance of 1500 km according to the invention.
Figure 29:
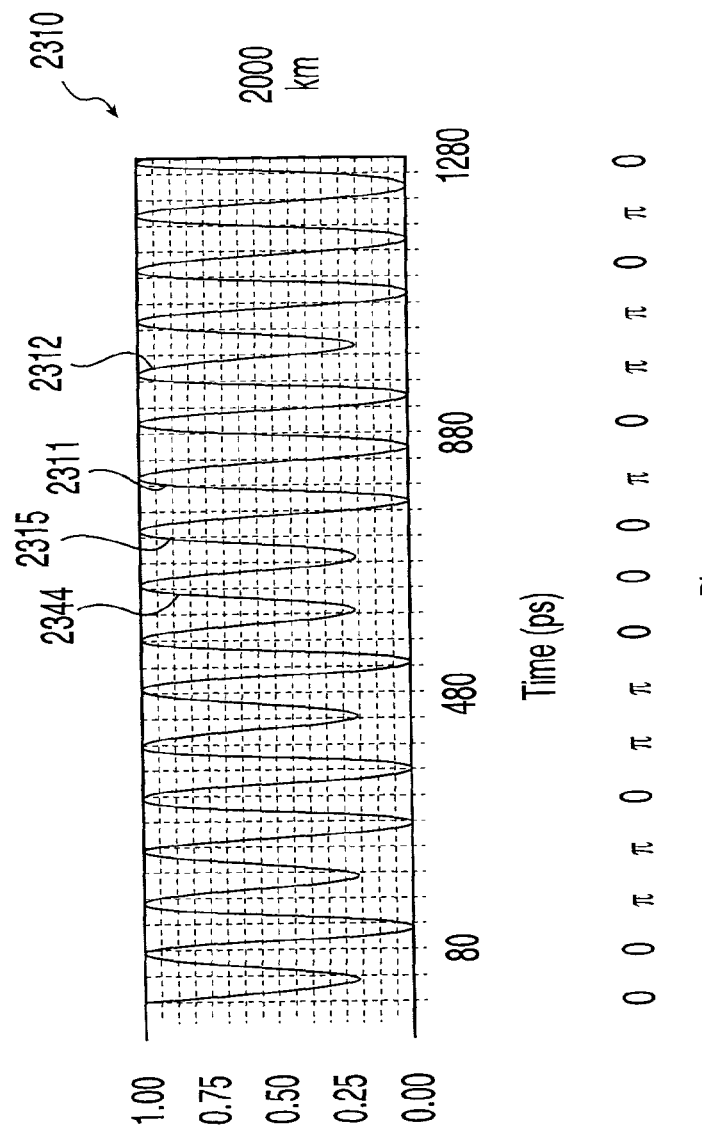
FIG. 29 shows a PSK optical pulse train comprising return-to-zero optical pulses having a preferred pulse shape for fiber transmission over a distance of 2000 km according to the invention.

Referring to FIGS. 28 and 29, PSK optical pulse streams comprising a plurality of return-to-zero pulses having an optimal pulse shape are shown for transmission distances of 1500 km and 2000 km, respectively. The optical pulse shape was determined from the WDM multichannel simulation discussed above. A PSK optical pulse stream 2300 in FIG. 28 comprises optical pulses having different relative phases, such as a first phase $\pi$ and a second phase 0, to represent different logical values of a data source. For example, optical pulses 2301 and 2302 have a phase $\pi$ and represent a first logic value. Optical pulses 2304 and 2305, which represent a logic value different from pulses 2301 and 2302, have a phase 0. A PSK optical pulse stream 2310 in FIG. 29 also comprises optical pulses having a first phase $\pi$ and optical pulses having a second phase 0. For example, optical pulses 2311 and 2312 have a phase $\pi$. Optical pulses 2314 and 2315, which represent a logic value different from pulses 2311 and 2312, have a phase 0.

It should be understood that the absolute values of the phase of pulses of pulse streams of the invention are not limited to particular values, such as 0 and $\pi$ radians. Rather, it is merely preferred that the relative phase of pulses representing a different logic values be sufficiently different to allow their demodulation at a receiver. For example, for a binary PSK optical signal of the invention a logic value of 0 may be represented by pulses having any phase. Pulses representing a logic value of 1 are preferably represented by a phase that is relatively phase shifted by $\pi$ from the phase of the pulses representing the logic value of 0. For quarternary PSK pulses, in which each pulse carries more than 1 channel of information, pulses representing different bit combinations preferably have relative phases that differ by at least about $\pi/N$, where N is the number of information channels per pulse.

Referring back to FIGS. 28 and 29, PSK optical pulse streams 2300 and 2310 show the preferred temporal form of PSK optical pulse streams of the invention. The preferred temporal form is given by: $\sin(\alpha_1 + \alpha_2 \cos(2\pi t/T + \pi))$, where T is the pulse period, and $\alpha_1$ and $\alpha_2$ are the pulse shape parameters that determine the pulse width, pulse shape, and the extinction ratio of the pulse. This function describes the optical transmission of the MZ modulator in the pulse generator, such as pulse modulator 1123 of pulse generator 1001, driven by a sinusoidal signal. A pulse temporal form based on other smooth functions such as a Gaussian function and/or polynominals type functions may also be used. A higher order Gaussian, such as a super Gaussian, may also be used.

The extinction ratio is defined as the ratio of the power of the peak of the pulse and the minimum power in between two pulses. The modulation depth, $\alpha_2$, is defined such that zero corresponds to CW or a pure NRZ shape. A modulation depth, $\alpha_2 = 0.2912\pi$ corresponds to pure RZ or 100% modulation, i.e., there is no essentially power in between the pulses so that the extinction ratio is infinite. For a preferred pulse, $\alpha_1$ is between about $0.1\pi$ and $0.3\pi$, such as about $0.2\pi$. For a preferred pulse, $\alpha_2$ is between about $0.04\pi$ and $0.15\pi$, such as between about $0.06\pi$ and about $0.1\pi$. The preferred ranges of $\alpha_1$ and $\alpha_2$ and 2 are indicated for adjacent pulses having the same relative phase. Such a pulse shape produces the best performance for a typical long-haul transmission system.

The pulse shape parameters for in phase adjacent pulses of optical pulse stream 2300 are $\alpha_1 = 0.2192 \pi$ and $\alpha_2 = 0.07\pi$. Optical pulse stream 2300 is optimal for a fiber transmission distance of about 1500 km. The pulse shape parameters for in phase adjacent pulses of optical pulse stream 2310 are $\alpha_1 = 0.2192\pi$ and $\alpha_2 = 0.085$ $\pi$. Optical pulse stream 2310 is optimal for a fiber transmission distance of about 2000 km. The minimum optical field and optical power between adjacent out-of-phase pulses of optical pulse streams 2300 and 2310 is essentially zero.

An optimal pulse preferably has an extinction ratio of at least 3 dB for in-phase adjacent pulse, a duty cycle of about 50% and a sinusoidal-like shape. The extinction ratio is defined herein as the ratio of the peak power of the pulse to the power in between pulses. For example, pulse 2304 and pulse 2305 have a relative phase difference of essentially zero. Pulses 2304 and 2305 provide an example of adjacent, i.e., sequential pulses. The extinction ratio between adjacent pulses that have a relative phase difference of essentially zero preferably is at least about 3 dB and less than about 8 dB. For example, expressed in dB, the extinction ratio between pulses 2304 and 2305 is given by 10 log10(i1/i2) =10 log10(1/.3125)=5 dB. The extinction ratio between adjacent pulses that have a relative phase difference of about $\pi$ preferably is at least about 10. For example, pulse 2305 and pulse 2301 have a relative phase difference of $\pi$. The extinction ratio between pulses 2305 and 2301 is given by 10 $\log_{10}(i3/i4) \geq 10$ dB. Note that as the transmission distance increases, the optimal pulse shape approaches a RZ shape with increasing modulation depth.

It is preferred that pulses of optical signals of the invention have substantially the same amplitude. Thus, it is preferable that the amplitude of pulses of pulse streams of the present invention is not modulated to encode information.

Figure 30:
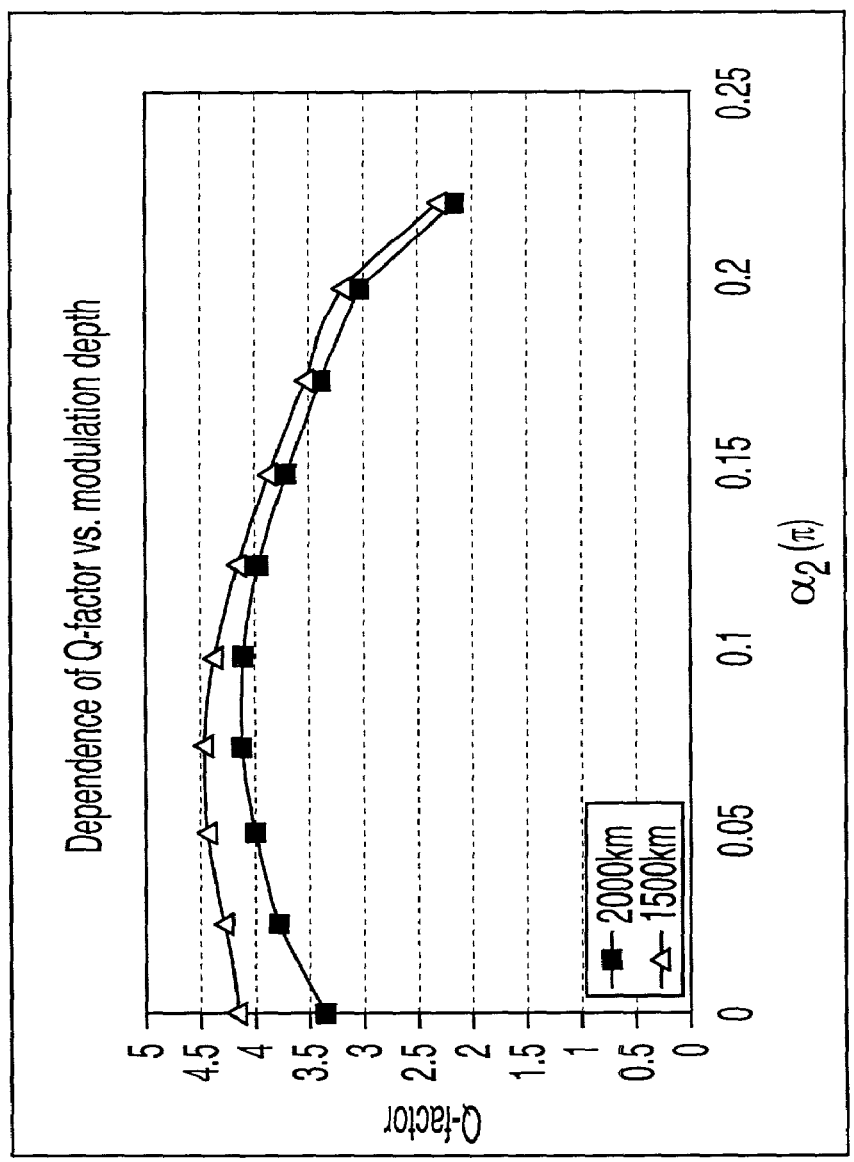
FIG. 30 is a plot of simulation results for Q-factor versus pulse shape parameter, according to the invention.

Referring to FIG. 30, transmission performance was determined by measuring the Q-factor of the transmitted channels which is related to the BER as BER=exp($-Q^2/2$)/ (Q($2\pi$)½). A high Q-factor gives low BER and vice versa. A Q-factor of 6 corresponds to a BER of $10^{-9}$. The Q-factor of the transmitted BPSK signal versus the modulation depth of the pulse is shown in FIG. 30 for transmission distances of 1500 and 2000 km. Th dependence of the Q-factor on modulation depth can be used to determine an optimal modulation depth $\alpha_2$ for a particular transmission distance. For example, for the simulation conditions considered in FIG. 30 and a 1500 km transmission distance, a modulation depth, $\alpha_2$=about 0.075 provides a maximum Q-factor and hence a minimum bit error rate. A graph similar to that of FIG. 30 may be generated based on the parameters of any given transmission system to determine the optimal pulse shape for that system and transmission distance. "Parameters of a transmission system may include but not limited to the transmitted laser optical power, network channel spacing, the transmission line length, the transmission line dispersion, and nonlinearities of the transmission network. The desired modulation depth of the optical pulse can be obtained by selecting the bias and the drive voltage of the pulse modulator to produce optical pulses with optimal modulation depth that mitigate non-lineanties of the PSK transmission line and minimize adjacent channel crosstalk wherein the optimal modulation depth is selected according to the parameters of the transmission system which may include but not limited to the transmitted laser optical power, network channel spacing, the transmission line length, the transmission line dispersion, and nonlineanties of the transmission network. The bias of the pulse modulator can be selected, for example, using an adjustable dc voltage source applied to the pulse modulator while monitoring the Q-factor or bit-error-rate of the received optical signal. Similarly, the drive voltage of the pulse modulator can be selected, for example, using a data driver electronic amplifier with an adjustable gain applied to the pulse modulator while monitoring the Q-factor or bit-error-rate of the received optical signal."

While the above invention has been described with reference to certain preferred embodiments, it should be kept in mind that the scope of the present invention is not limited to these. Thus, one skilled in the art may find variations of these preferred embodiments which, nevertheless, fall within the spirit of the present invention, whose scope is defined by the claims set forth below.

What is claimed is:

1. A fiber optic network for carrying optical signals, comprising:
at least one optical fiber for carrying an optical signal comprising return-to-zero phase-shift-keyed (PSK) optical pulses;
at least one laser to generate a cw optical signal;
at least one pulse modulator to transform cw optical signal into a pulsed return-to-zero (RZ) optical signal; the pulse modulator having a bias and the drive voltage to form optical pulses selected to achieve maximal spectral efficiency of PSK transmission, the bias and the drive voltage of the pulse modulator selected to form optical pulses that mitigate non-linearities of the fiber transmission line and minimize adjacent channel crosstalk, the bias and the drive voltage of the pulse modulator are selected according to the characteristics of laser optical power, network channel spacing, the fiber transmission line length, the fiber transmission line dispersion, and non-linearities of the fiber transmission network that minimizes the bit-error-rate of the transmitted signal, the pulse modulator configured to use electro-optics to generate optical pulses using amplitude modulation of a cw optical signal;
at least one PSK modulator connected to the pulse modulator to encode the data producing RZ-PSK signal for transmission in the fiber optic network;
a WDM combiner connected to the PSK modulator to combine the multiple RZ-PSK optical signals corresponding to multiple channels with arbitrary polarization states including at least one of linear, circular, or elliptical.

2. The fiber optic network of claim 1, wherein the optical signal further comprises a plurality of non-return-to-zero PSK optical pulses formed by the pulse modulator
wherein said optical pulses have bell-like shapes;
wherein said non-return-to-zero optical pulses have arbitrary polarization states including at least one of linear, circular, or elliptical.

3. The network of claim 2, wherein an extinction ratio between adjacent pulses in said non-return-to-zero optical signal that have a relative phase difference of essentially zero is at least about 3 dB and less than about 8 dB.

4. The network of claim 1, wherein the optical fiber has a zero dispersion wavelength of less than about 1500 nanometers.

5. The network of claim 4, wherein the optical signal has a wavelength of between about 1500 nanometers and about 1625 nanometers.

6. The network of claim 1, wherein a dispersion of the optical fiber is at least about +2 picoseconds per nanometer per kilometer at or near a wavelength of the optical signal.

7. The network of claim 1, wherein a dispersion of the optical fiber is less than about −2 picoseconds per nanometer per kilometer at or near a waveiength of the optical signal.

8. The network of claim 1, wherein the optical fiber is a non-zero-dispersion shifted fiber.

9. The network of claim 1, wherein a dispersion of the optical fiber is at least about +15 picoseconds per nanometer per kilometer at or near a wavelength of the optical signal.

10. The network of claim 1, wherein a dispersion of the optical fiber is less than about −15 picoseconds per nanometer per kilometer at or near a wavelength of the optical signal.

11. The network of claim 1, wherein the optical fiber is single mode dispersion fiber having a zero dispersion wavelength of about 1310 nanometers.

12. The network of claim 1, wherein the data modulator is a push-pull Mach-Zehnder modulator driven from a single respective data source.

13. The network of claim 1, wherein the data modulator is a quadrature modulator with first and second push-pull Mach-Zehnder modulators driven from a respective pair of data sources.

14. A method for optically transmitting data, comprising:
preparing a plurality of phase-shift-keyed (PSK) optical data streams produced by a plurality of PSK modulators, each PSK optical data stream having a different wavelength and encoding data from at least one respective data source;
combining the PSK optical data streams to prepare a wavelength division multiplexed (WDM) optical signal corresponding to multiple channels with arbitrary polarization state selected from at least one at linear, circular, or elliptical;
modulating an amplitude of the WDM optical signal to prepare a return-to-zero phase shift keyed wavelength division multiplex (RZ-PSKWDM) optical signal comprising a plurality of return-to-zero optical pulses produced by pulse modulator with arbitrary polarization states selected from at least one of, linear, circular, or elliptical; said return-to-zero optical pulse shape selected to achieve maximal spectral efficiency; mitigate transmission line non-linearities and adjacent channel crosstalk; the optical pulse shape selected according to the characteristics of laser optical power, network channel spacing, the transmission line length, the transmissiOn line dispersion, and non-linearities of the transmission network that minimizes the bit-error-rate of the transmitted WDM signals;
transmitting the RZ-PSKWDM optical signal along an optical fiber of an optical fiber network.

15. The method of claim 14, wherein The PSKWDM optical signal further comprises
a plurality of non-return-to-zero optical pulses having bell-like shapes;
said non-return-to-zero optical pulses having arbitrary polarization states selected from at least one of, linear, circular, or elliptical.

16. The method of claim 14, wherein each PSK optical data stream is a binary phase-shift-keyed BPSK optical data stream encoding data using a push-pull Mach-Zehnder modulator driven from a single respective data source.

17. The method of claim 14, wherein each PSK optical data stream is a quaternary phase-shift-keyed QPSK optical data stream encoding data using a quadrature modulator comprising of two push-pull Mach-Zehnder modulators driven from a respective pair of data sources.

18. The method of claim 14, wherein modulating an amplitude is performed after combining the PSK optical data streams of the WDM channels.

19. The method of claim 14, wherein preparing a plurality of PSK optical data streams of the WDM channels comprises modulating a phase of light provided by a cw light source.

20. The method of claim 14, wherein an extinction ratio between adjacent pulses in said non-return-to-zero optical pulse streams within the WDM transmission link has a relative phase difference of essentially zero is at least about 3 dB and less than about 8 dB.

21. The method of claim 20, wherein an extinction ratio between adjacent pulses in said non-return-to-zero optical pulse streams within the WDM transmission link has a relative phase difference of at least about $\pi/2$ is at least about 10 dB.

22. The method of claim 21, wherein an extinction ratio between adjacent pulses in said non-return-to-zero optical pulse streams within the WDM transmission link has a relative phase difference of essentially zero is at least about 5 dB and less than about 8 dB.

23. The method of claim 22, wherein an extinction ratio between adjacent pulses in said non-return-to-zero optical pulse streams within the WOM transmission link has a relative phase difference of at least about $\pi/2$ is at least about 20 dB.

\* \* \* \* \*